United States Patent
Inagaki et al.

(10) Patent No.: US 12,183,891 B2
(45) Date of Patent: Dec. 31, 2024

(54) LAYERED ELECTRODE BODY AND BONDING DEVICE FOR LAYERED ELECTRODE BODY

(71) Applicants: Panasonic Corporation, Kadoma (JP); SANYO Electric Co., Ltd., Daito (JP)

(72) Inventors: Kenji Inagaki, Hyogo (JP); Tatsuya Masada, Hyogo (JP); Masahide Maruyama, Nara (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 637 days.

(21) Appl. No.: 17/442,166

(22) PCT Filed: Mar. 11, 2020

(86) PCT No.: PCT/JP2020/010494
§ 371 (c)(1),
(2) Date: Sep. 23, 2021

(87) PCT Pub. No.: WO2020/203113
PCT Pub. Date: Oct. 8, 2020

(65) Prior Publication Data
US 2022/0181699 A1 Jun. 9, 2022

(30) Foreign Application Priority Data
Mar. 29, 2019 (JP) .................. 2019-067840

(51) Int. Cl.
*H01M 10/0585* (2010.01)
*H01M 50/449* (2021.01)
(52) U.S. Cl.
CPC ..... *H01M 10/0585* (2013.01); *H01M 50/449* (2021.01)

(58) Field of Classification Search
CPC ......... H01M 10/0404; H01M 10/0585; H01M 50/449; H01M 50/461; Y02E 60/10; Y02P 70/50
See application file for complete search history.

(56) References Cited

U.S. PATENT DOCUMENTS

| 2004/0017131 A1 | 1/2004 | Sawada et al. |
| 2011/0129722 A1* | 6/2011 | Yoneda ............... H01M 50/417 29/623.2 |

(Continued)

FOREIGN PATENT DOCUMENTS

| CN | 109478677 A | 3/2019 |
| JP | 2011-086508 A | 4/2011 |

(Continued)

OTHER PUBLICATIONS

English Translation of Chinese Search Report dated Feb. 8, 2024, issued in counterpart CN Patent Application No. 202080024730.9. (4 pages).

(Continued)

*Primary Examiner* — Victoria H Lynch
(74) *Attorney, Agent, or Firm* — WHDA, LLP

(57) ABSTRACT

A layered electrode body manufacturing device comprising: a negative electrode cut drum cuts a negative electrode single plate at a first width, generates a negative electrode plate, and conveys same; a negative electrode heat drum heats the negative electrode plate; a positive electrode cut drum cuts a positive electrode single plate at a second width, generates a positive electrode plate, and conveys same; a positive electrode heat drum heats the positive electrode plate; and a bonding drum which positions the negative electrode plate on a first separator single plate, positions a second separator single plate thereon, and positions and bonds the positive electrode plate thereon. The pressing forces between the bonding drum, and the negative and (Continued)

positive electrode heat drums are adjusted. At least a portion of two sides from the outer edge part of the electrode plate is bonded to a separator, and the other two sides are not.

15 Claims, 53 Drawing Sheets

(56) References Cited

U.S. PATENT DOCUMENTS

| | | | | |
|---|---|---|---|---|
| 2014/0234679 A1* | 8/2014 | Kim | ......................... | H01M 6/40 29/623.2 |
| 2019/0036149 A1 | 1/2019 | Sakurai et al. | | |
| 2019/0165424 A1 | 5/2019 | Aritomo et al. | | |
| 2020/0153027 A1* | 5/2020 | Sumita | .................. | H01M 4/043 |

FOREIGN PATENT DOCUMENTS

| | | |
|---|---|---|
| JP | 2012-199211 A | 10/2012 |
| JP | 2015-72786 A | 4/2015 |
| JP | 2015-162337 A | 9/2015 |
| JP | 2018-174146 A | 11/2018 |
| JP | 2019-29267 A | 2/2019 |
| WO | 2017/131027 A1 | 8/2017 |

OTHER PUBLICATIONS

International Search Report dated May 26, 2020, issued in counterpart application No. PCT/JP2020/010494 (2 pages).

* cited by examiner

LAYERED ELECTRODE BODY AND BONDING DEVICE FOR LAYERED ELECTRODE BODY

TECHNICAL FIELD

The present disclosure relates to a layered electrode assembly, and to an adhesion device for the layered electrode assembly.

BACKGROUND ART

For example, in lithium ion secondary batteries for equipment onto a vehicle or the like, a large capacity, a low internal resistance, and a high heat discharge performance are demanded, and, thus, a layered, laminate-type batteries are being developed which can satisfy these demands. The battery has a form in which a positive electrode, a separator, and a negative electrode are alternately layered, each electrode is connected to a metal terminal which is called a tab, the layered structure is inserted into a container formed from an aluminum laminated film, an electrolyte solution is injected, and the container is sealed.

Patent Literature 1 discloses an apparatus having: an electrode support that receives an electrode supplied by a transport device, and that supports the electrode; a circulating member that forms a loop shape extending in an up-and-down direction, and on an outer peripheral surface of which the electrode support is attached; a layering unit that is placed at an opposite side of the transport device with the circulating member therebetween, and having a layering portion of a plurality of stages in which the electrodes are layered; a pushing portion that simultaneously pushes a plurality of electrodes supported by the electrode support toward the layering portion of the plurality of stages; and a controller that controls circulation and upward and downward movements of the circulating member, and an operation of the pushing portion, wherein the controller controls the operation of the pushing portion such that the electrodes are pushed toward the layering portion with a slower velocity than a transport velocity of the electrodes by the transport device.

Patent Literature 2 discloses an apparatus for producing a layered electrode assembly in which positive electrodes and negative electrodes are alternately layered with a separator therebetween, the apparatus including a winding drum having an outer peripheral surface on which a separator sheet which is continuously supplied can be wound; and an electrode supply unit that sequentially supplies with an interval electrodes to a valley formed between a separator sheet SS wound on the outer peripheral surface and a separator sheet to be wound around the outer peripheral surface in a manner to allow switching between the positive electrode and the negative electrode.

Patent Literature 3 discloses an apparatus including a winding means of an approximate circular cylindrical shape on which a series battery member is wound, the series battery member being formed using, as materials, a series positive electrode member, a series negative electrode member, and a series separator member, in which positive electrodes, negative electrodes, and separators are respectively continuously formed with rupturing lines therebetween, wherein the rupturing lines can be easily separated, and overlapping the materials in the order of the series separator member, the series positive electrode member, the series separator member, and the series negative electrode member, or in the order of the series separator member, the series negative electrode member, the series separator member, and the series positive electrode member with the rupturing lines coinciding with each other; a pressurizing means that pressurizes the wound series battery member on a side circumferential surface of the winding means; and a cutting means that cuts the series battery member at each rupturing line after the series battery member is wound around the winding means for a necessary number of layers, wherein, in the cutting means, a part of the side circumferential surface, in the circumferential direction, of the winding means protrudes in a radial direction.

CITATION LIST

Patent Literature

PATENT LITERATURE 1: International Publication No. WO 2017/131027
PATENT LITERATURE 2: Japanese Unexamined Patent Application Publication No. 2012-199211
PATENT LITERATURE 3: Japanese Unexamined Patent Application Publication No. 2011-86508

SUMMARY

In order to effectively produce a layered electrode assembly in which the positive electrode, the separator, and the negative electrode are alternately layered, it is necessary to supply a positive electrode assembly of a band shape and a negative electrode assembly of a band shape to a drum, to cut the positive electrode assembly and the negative electrode assembly of the band shape respectively to desired sizes to obtain a positive electrode plate and a negative electrode plate, respectively, and to sequentially layer these electrode plates at desired positions. In addition, when damages are caused by the pressing during the adhesion of the electrode plate and the separator, there may be cases where the electrode assembly is degraded.

An advantage of the present disclosure lies in provision of a technique in which damages when an electrode plate and a separator are adhered to each other during production of a layered electrode assembly can be suppressed.

According to one aspect of the present disclosure, there is provided a layered electrode assembly in which an electrode plate of a quadrangular shape and a separator of a quadrangular shape are layered, wherein at least a part of two side among four sides of an outer edge portion of the electrode plate is adhered to the separator, and the other two sides among the four sides of the outer edge portion of the electrode plate are not adhered to the separator.

According to another aspect of the present disclosure, there is provided a layered electrode assembly in which a positive electrode of a quadrangular shape and a negative electrode of a quadrangular shape are layered with a separator of a quadrangular shape therebetween, wherein at least a part of two sides among four sides of an outer edge portion of the negative electrode is adhered to the separator, the other two sides among the four sides of the outer edge portion of the negative electrode are not adhered to the separator, at least a part of two sides among four sides of an outer edge portion of the positive electrode is adhered to the separator, and the other two sides among the four sides of the outer edge portion of the positive electrode are not adhered to the separator.

According to another aspect of the present disclosure, the positive electrode is placed at an inner side of a region of presence of the negative electrode.

According to another aspect of the present disclosure, the separator has thermoplastic layers over respective surfaces of a base member layer.

According to another aspect of the present disclosure, there is provided an adhesion device for a layered electrode assembly, the adhesion device including: a holding unit that holds a separator single plate and that rotates; and an electrode plate adhesion unit that sequentially presses and adheres an electrode plate of a quadrangular shape over the separator single plate, wherein the electrode plate adhesion unit presses the electrode plate of the quadrangular shape over the separator single plate while compensating for a distance variation caused between the electrode plate adhesion unit and the holding unit.

According to another aspect of the present disclosure, the holding unit is a first rotational drum, the electrode plate adhesion unit is a second rotational drum, one of a support of the first rotational drum or a support of the second rotational drum has a coil spring, a drum rotation pivot, and a motor, and flexure of the coil spring caused by swinging around the drum rotation pivot due to a rotation of the first rotational drum or of the second rotational drum is suppressed by driving of the motor.

According to another aspect of the present disclosure, the electrode plate adhesion unit reduces or interrupts the pressing at respective ends of the electrode plate of the quadrangular shape along a longitudinal direction of the separator single plate, so as to not adhere the respective ends of the electrode plate of the quadrangular shape to the separator single plate.

According to another aspect of the present disclosure, the holding unit is a first rotational drum, the electrode plate adhesion unit is a second rotational drum, a cam mechanism is provided on a support of one of the first rotational drum and the second rotational drum, an arm which engages with the cam mechanism is provided on a support of the other of the first rotational drum and the second rotational drum, and a surface shape of the cam mechanism is a polygon or a shape with a projection at a predetermined interval.

According to another aspect of the present disclosure, an inclination member which can move upward and downward independently with respect to the other support is provided on the other support, the arm is a swing arm, and the swing arm moves upward and downward on an inclined surface of the inclination member.

According to another aspect of the present disclosure, the electrode plate adhesion unit has a heating unit which heats the electrode plate of the quadrangular shape.

According to an aspect of the present disclosure, damages when an electrode plate and a separator are adhered to each other during production of a layered electrode assembly can be suppressed.

DESCRIPTION OF EMBODIMENTS

A production apparatus and a production method of a layered electrode assembly according to an embodiment of the present disclosure will now be described. The embodiment(s) described below is/are merely exemplary, and the present disclosure is not limited to the embodiment(s).

Figure 1:
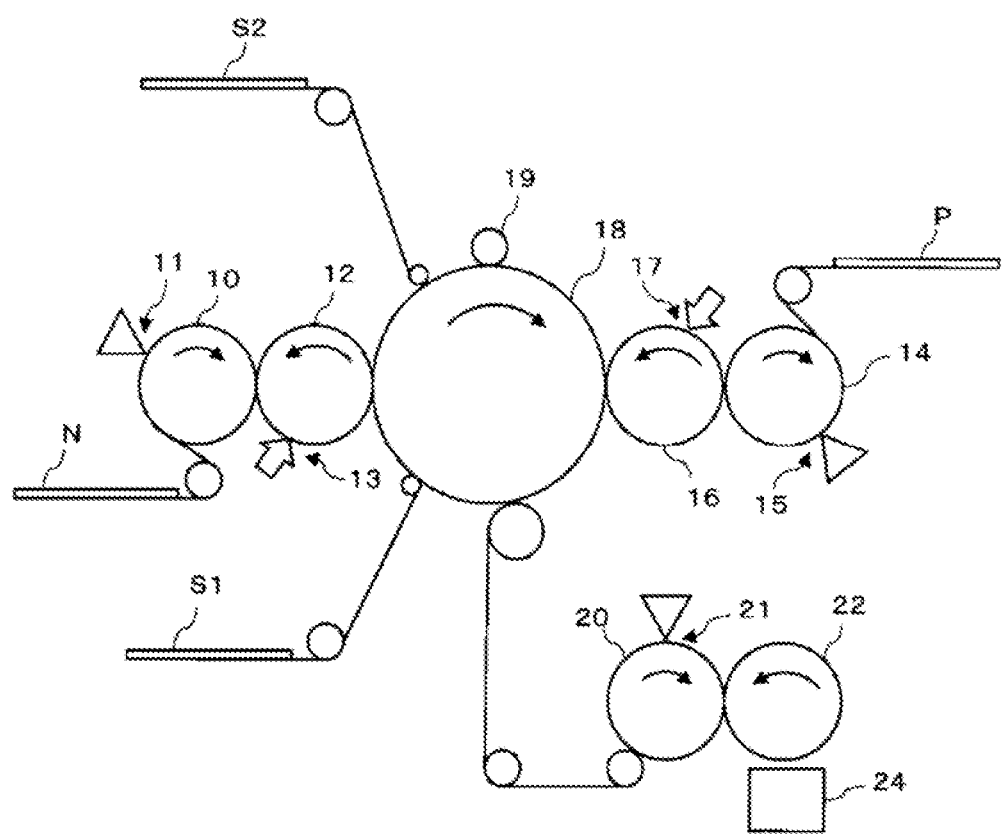
FIG. 1 is a conceptual structural diagram of a production apparatus according to an embodiment of the present disclosure.

FIG. 1 is a conceptual diagram of a production apparatus of a layered electrode assembly according to an embodiment of the present disclosure. A production apparatus in the present embodiment is a production apparatus of a series drum type in which a plurality of drums are combined, and comprises a negative electrode cutting drum 10, a negative electrode heating drum 12, a positive electrode cutting drum 14, a positive electrode heating drum 16, a bonding drum 18, a separator cutting drum 20, and a laminating drum 22.

The negative electrode cutting drum 10 is a first electrode cutting drum, has a first radius, and rotates around a center axis with a first angular velocity. To the negative electrode cutting drum 10, a negative electrode single plate N of a band shape is supplied as a first electrode single plate. The negative electrode single plate N is a negative electrode. The negative electrode single plate N is formed from a negative electrode electricity collector and a negative electrode active material layer formed over the negative electrode electricity collector. The negative electrode active material layer may be formed over one surface of the negative electrode electricity collector, or over both surfaces of the negative electrode electricity collector. In the following description, a structure will be described in which the negative electrode active material layers are formed over both surfaces of the negative electrode electricity collector. The negative electrode active material layer includes a negative electrode active material and a binder material.

For the negative electrode electricity collector and the negative electrode active material layer, known materials may be used. For lithium ion secondary batteries, the following materials may be exemplified.

For the negative electrode electricity collector, a foil of a metal which is stable within a potential range of the negative electrode, a film on a surface layer of which the metal is placed, or the like may be employed. As the negative electrode electricity collector, a mesh element, a punching sheet, and a porous element such as an expand metal of the metal may be employed. As the material of the negative electrode electricity collector, copper, a copper alloy, aluminum, an aluminum alloy, stainless steel, nickel, or the like may be employed. A thickness of the negative electrode electricity collector is desirably, for example, greater than or equal to 3 μm and less than or equal to 50 μm, from the viewpoint of electricity collecting properties, the mechanical strength, or the like. The negative electrode single plate N may be produced by, for example, applying a negative electrode mixture slurry including the negative electrode active material, the binder material, and a dispersion medium over the negative electrode electricity collector, drying the applied film, and rolling the dried film to thereby form the negative electrode active material layer over one surface or over both surfaces of the negative electrode electricity collector. The negative electrode active material layer may further include optional components such as an electrically conductive agent as necessary. No particular limitation is imposed on a thickness of the negative electrode active material layer, and the thickness is, for example, greater than or equal to 10 µm and less than or equal to 100 µm.

No particular limitation is imposed on the negative electrode active material, so long as, in the case of the lithium ion secondary batteries, the material can occlude and release lithium ions. The material of the negative electrode active material may be a non-carbon-based material, a carbon material, or a combination of these. As the non-carbon-based material, there may be exemplified the lithium metal, an alloy containing the lithium element, and a metal compound such as metal oxides, metal sulfides, and metal nitrides containing lithium. As the alloy containing the lithium element, there may be exemplified, for example, a lithium-aluminum alloy, a lithium-tin alloy, a lithium-lead alloy, a lithium-silicon alloy, or the like. As the metal oxide containing lithium, there may be exemplified, for example, metal oxides containing lithium and titanium, tantalum, or niobium, or the like, and desirably, lithium titanate ($Li_4Ti_5O_{12}$ or the like) is employed. As the carbon material used as the negative electrode active material, there may be exemplified, for example, graphite, hard carbon, or the like. Of these, graphite is desirable due to its high capacity and small irreversible capacity. The graphite is a collective name of carbon materials having a graphite structure, and includes natural graphite, artificial graphite, expandable graphite, graphitized mesophase carbon particles, and the like. When the graphite is employed as the negative electrode active material, in order to reduce the activity with regard to reduction decomposition of a water-based electrolyte solution, desirably, a surface of the negative electrode active material layer is covered with a coating. One of these negative electrode active materials may be used as a single entity, or two or more of these may be used in combination. As the binder material included in the negative electrode active material layer, there may be employed a fluorine-based polymer, a rubber-based polymer, or the like, or a copolymer of styrene-butadiene (SBR) or a modified product thereof.

The negative electrode cutting drum 10 has a plurality of electrode cutting heads placed in a circumferential direction of the drum. Each of the plurality of electrode cutting heads has an outer peripheral surface for suctioning and holding the negative electrode single plate N, and a cutting means. The cutting means is, for example, a blade which moves in a direction approximately orthogonal to a circumferential direction of the outer peripheral surface. The supplied negative electrode single plate N is suctioned and held on the outer peripheral surface, and is rotated. The electrode cutting head is also called a holding head because the electrode cutting head suctions and holds the negative electrode single plate N. Between the plurality of electrode cutting heads, a gap is formed, and, in this gap, the blade equipped on the electrode cutting head moves in the direction approximately orthogonal to the circumferential direction, to cut the negative electrode single plate N suctioned and held on the outer peripheral surface, in a predetermined width (first width).

Each of the plurality of electrode cutting heads rotates around a common center axis of the negative electrode cutting drum 10, and each individual electrode cutting head is driven by a motor in the circumferential direction of the drum independently from the other electrode cutting heads. For example, when two electrode cutting heads adjacent in the circumferential direction are an electrode cutting head a and an electrode cutting head b, the electrode cutting head a and the electrode cutting head b rotate at a constant velocity around the common center axis of the drum, and a relative velocity therebetween is changed each time a predetermined section is reached on the circumference of the negative electrode cutting drum 10. For example, at a certain timing, the electrode cutting head a and the electrode cutting head b may rotate at a constant velocity and the relative velocity therebetween may be zero, but at another timing, a velocity of the electrode cutting head a may be increased in a direction away from the subsequent electrode cutting head b, and the relative velocity may be a finite velocity. With such an independent driving of the electrode cutting heads, a cutting position of the negative electrode single plate N by the blade equipped on the electrode cutting head may be adjusted, and a position of the negative electrode plate produced by the cutting may be adjusted. The movement velocity of the electrode cutting head may be achieved by using a motor corresponding to each electrode cutting head or the like.

The negative electrode cutting drum 10 may further comprise various cameras. With these cameras, a position of the negative electrode single plate N before cutting may be monitored, and positions of the plurality of negative electrode plates produced by the cutting may be monitored. The negative electrode cutting drum 10 suctions and holds the supplied negative electrode single plate N, rotates and transports the negative electrode single plate N, and cuts the negative electrode single plate N at a position 11 shown in FIG. 1, to produce the negative electrode plate. The electrode cutting head which suctions, holds, and rotates the negative electrode single plate N rotates the negative electrode single plate N to the position 11 while suctioning and holding the negative electrode single plate N, and cuts the negative electrode single plate N with the blade equipped on the cutting head when the position 11 is reached. The negative electrode plate of the first width produced by the cutting is rotated and transported while continuing to be suctioned and held on the outer peripheral surface of the electrode cutting head.

The negative electrode heating drum 12 is a first electrode heating drum, and is placed adjacent to the negative electrode cutting drum 10 so as to be proximate to the negative electrode cutting drum 10. The negative electrode heating drum 12 has a second radius, and rotates around a center axis with a second angular velocity. The second radius of the negative electrode heating drum 12 may be the same as or different from the first radius of the negative electrode cutting drum 10. The second angular velocity of the negative electrode heating drum 12 differs from the first angular velocity of the negative electrode cutting drum 10. More specifically, the second angular velocity of the negative electrode heating drum 12 is set such that a linear velocity thereof is approximately identical to a linear velocity of the bonding drum 18 to be described below. As an example, the second radius and the first radius may be set to the same radius, and the second angular velocity and the first angular velocity may be set such that the second angular velocity>the first angular velocity. In this case, the linear velocities of the negative electrode cutting drum 10 and the negative electrode heating drum 12 differ from each other, in a relationship of the linear velocity of the negative electrode heating drum 12 >the linear velocity of the negative electrode cutting drum 10. Because of this, the velocity of the electrode cutting head of the negative electrode cutting drum 10 is temporarily increased at a position before a proximate position with the negative electrode heating drum 12 to a velocity to approximately match the linear velocity of the negative electrode heating drum 12, so that the relative velocity with the negative electrode heating drum 12 is approximately zero. The electrode cutting head of the negative electrode cutting drum 10 releases the negative electrode plate which has been suctioned and held to the side of the negative electrode heating drum 12 at the time when the relative velocity becomes approximately zero. The electrode cutting head of the negative electrode cutting drum 10 is switched to the velocity before the velocity increase after the suctioned and held negative electrode plate is released.

The negative electrode heating drum 12 suctions and holds the negative electrode plate released from the negative electrode cutting drum 10, and heats (preliminary heating) the negative electrode plate with a built-in heater. In the figure, a configuration is shown in which the negative electrode plate is heated at a position 13. The heating (preliminary heating) step is for thermally adhering a separator and the negative electrode plate at a later, adhesion step. A location of heating of the negative electrode heating drum 12 is not limited to a particular position (for example, the position 13). Alternatively, the negative electrode heating drum 12 may be in a state of being heated at all times while the drum is rotating.

The positive electrode cutting drum 14 is a second electrode cutting drum, has a third radius, and rotates around a center axis with a third angular velocity. To the positive electrode cutting drum 14, a positive electrode single plate P of a band shape is supplied as a second electrode single plate. The positive electrode single plate P is a quadrangular electrode assembly. The positive electrode single plate P is formed from a positive electrode current collector and a positive electrode active material layer formed over the positive electrode current collector. The positive electrode active material layer may be formed over one surface of the positive electrode current collector, or over both surfaces of the positive electrode current collector. In the following description, a configuration will be described in which the positive electrode active material layers are formed over both surfaces of the positive electrode current collector. The positive electrode active material layer includes a positive electrode active material and a binder material.

For the positive electrode current collector and the positive electrode active material layer, known materials may be used, and the following materials may be exemplified.

For the positive electrode current collector, there may be employed a foil of a metal which is stable within a potential range of the positive electrode and a film on a surface layer of which the metal is placed, or the like. Alternatively, as the positive electrode current collector, a mesh element, a punching sheet, or a porous element such as an expand metal of the metal may be used. As the material of the positive electrode current collector, there may be employed stainless steel, aluminum, an aluminum alloy, titanium, or the like. A thickness of the positive electrode current collector is desirably, for example, greater than or equal to 3 μm and less than or equal to 50 μm, from the viewpoint of electricity collecting properties, the mechanical strength, or the like. The positive electrode single plate may be obtained, for example, by applying a positive electrode mixture slurry including the positive electrode active material, an electrically conductive material, the binder material, or the like over the positive electrode current collector, drying the applied film, to form the positive electrode active material layer over the positive electrode current collector, and rolling the positive electrode active material layer. No particular limitation is imposed on a thickness of the positive electrode active material layer, and the thickness is, for example, greater than or equal to 10 μm and less than or equal to 100 μm.

The positive electrode active material is a lithium-transition metal oxide containing lithium (Li) and a transition metal element such as cobalt (Co), manganese (Mn), nickel (Ni), or the like. As the electrically conductive material included in the positive electrode active material layer, for example, there may be exemplified carbon powders such as carbon black, acetylene black, Ketjen black, graphite, or the like. One of these materials may be employed as a single entity or two or more of these materials may be combined. As the binder material included in the positive electrode active material layer, for example, there may be exemplified a fluorine-based polymer, a rubber-based polymer, or the like. As the fluorine-based polymer, for example, there may be exemplified polytetrafluoroethylene (PTFE), polyvinylidene fluoride (PVDF), or a modified product of these. As the rubber-based polymer, for example, there may be exemplified a copolymer of ethylene-propylene-isoprene, a copolymer of ethylene-propylene-butadiene, or the like. One of these materials may be employed as a single entity or two or more of these materials may be combined.

The positive electrode cutting drum 14 comprises a plurality of electrode cutting heads placed in a circumferential direction of the drum. The electrode cutting head comprises an outer peripheral surface on which the positive electrode single plate P is suctioned and held, and a cutting means. The cutting means is, for example, a blade which moves in a direction approximately orthogonal to a circumferential direction of the outer peripheral surface. The positive electrode single plate P which is supplied is suctioned and held on the outer peripheral surface, and is rotated. The electrode cutting head is also called a holding head because the electrode cutting head suctions and holds the positive electrode single plate P. A gap is formed in the circumferential direction between the plurality of electrode cutting heads, and the blade equipped on the electrode cutting head moves in the gap in the direction approximately orthogonal to the circumferential direction, to cut the positive electrode single plate P which is suctioned and held on the outer peripheral surface, in a predetermined width (second width). Similar to the electrode cutting head of the negative electrode cutting drum 10, each of the plurality of electrode cutting beads rotates around a common center axis of the positive electrode cutting drum 14, and each individual electrode cutting head is driven by a motor in the circumferential direction of the drum independently from the other electrode cutting heads. For example, when two electrode cutting heads adjacent in the circumferential direction are an electrode cutting head a and an electrode cutting head b, the electrode cutting head a and the electrode cutting head b rotate at a constant velocity around the common center axis of the drum, and a relative velocity therebetween is changed each time a predetermined section is reached on the circumference of the positive electrode cutting drum 14. For example, at a certain timing, the electrode cutting head a and the electrode cutting head b may rotate at a constant velocity and the relative velocity is zero, but at another timing, a velocity of the electrode cutting head a may be increased in a direction away from the subsequent electrode cutting head b, so that the relative velocity becomes a finite velocity. With such an independent driving of the electrode cutting heads, a cutting position of the positive electrode single plate P by a round blade equipped on the electrode cutting head can be adjusted, and a position of the positive electrode plate which is produced by the cutting can be adjusted. The movement velocities of the electrode cutting heads can be achieved using a motor corresponding to each electrode cutting head or the like.

The positive electrode cutting drum 14 may further comprise various cameras. With these cameras, a position of the positive electrode single plate P before cutting may be monitored, or positions of the plurality of positive electrode plates produced by the cutting may be monitored. The positive electrode cutting drum 14 suctions and holds the positive electrode single plate P which is supplied, rotates and transports the held positive electrode single plate P, and cuts the positive electrode single plate P at a position 15 shown in FIG. 1, to produce the positive electrode plate. The electrode cutting head which suctions, holds, and rotates the positive electrode single plate P rotates the positive electrode single plate P while suctioning and holding the positive electrode single plate P to the position 15, and cuts the positive electrode single plate P with the equipped blade when the position 15 is reached. The positive electrode plate produced by the cutting is rotated and transported while continuing to be suctioned and held on the outer peripheral surface of the electrode cutting head.

The positive electrode heating drum 16 is a second heating drum, and is placed adjacent to the positive electrode cutting drum 14, so as to be proximate to the positive electrode cutting drum 14. The positive electrode heating drum 16 has a fourth radius, and rotates around a center axis with a fourth angular velocity. The fourth radius of the positive electrode heating drum 16 may be the same as or different from the third radius of the positive electrode cutting drum 14. The fourth angular velocity of the positive electrode heating drum 16 differs from the third angular velocity of the positive electrode cutting drum 14. More specifically, the fourth angular velocity of the positive electrode heating drum 16 is set such that a linear velocity thereof is approximately the same as a linear velocity of the bonding drum 18 to be described below. As an example, the fourth radius and the third radius may be the same, and the fourth angular velocity and the third angular velocity may be set such that the fourth angular velocity>the third angular velocity. In this case, linear velocities of the positive electrode cutting drum 14 and the positive electrode heating drum 16 differ from each other, in a relationship of the linear velocity of the positive electrode heating drum 16 >the linear velocity of the positive electrode cutting drum 14. Because of this, a velocity of the electrode cutting head of the positive electrode cutting drum 14 is temporarily increased at a position before a proximate position with the positive electrode heating drum 16 until the linear velocity is approximately the same as the linear velocity of the positive electrode heating drum 16, so that the relative velocity with the positive electrode heating drum 16 is approximately zero. The electrode cutting head of the positive electrode cutting drum 14 releases the suctioned and held positive electrode plate to the side of the positive electrode heating drum 16 at the time when the relative velocity becomes approximately zero. The electrode cutting head of the positive electrode cutting drum 14 is switched to the rotational velocity before the velocity increase after the suctioned and held positive electrode plate is released.

The positive electrode heating drum 16 suctions and holds the positive electrode plate which is released from the positive electrode cutting drum 14, and heats (preliminary heating) the positive electrode plate with a built-in heater. The figure shows that the positive electrode plate is heated at a position 17. The heating (preliminary heating) step is for thermally adhering the separator and the positive electrode plate at the later adhesion step. A location to be heated by the positive electrode heating drum 16 is not limited to a particular position (for example, the position 17). Alternatively, the positive electrode heating drum 16 may be in a state of being heated at all times while the drum rotates.

The bonding drum 18 is placed between the negative electrode heating drum 12 and the positive electrode heating drum 16, in proximity to both the negative electrode heating drum 12 and the positive electrode heating drum 16. The bonding drum 18 has a fifth radius, and rotates around a center axis with a fifth angular velocity. To the bonding drum 18, a separator S1 of a band shape is supplied as a first separator single plate, and a separator S2 of a band shape is supplied as a second separator single plate. In addition, the negative electrode plate heated at the negative electrode heating drum 12 is supplied, and the positive electrode plate heated at the positive electrode heating drum 16 is supplied.

In relation to the negative electrode plate, the linear velocity of the negative electrode heating drum 12 and the linear velocity of the bonding drum 18 are approximately the same, and the heated negative electrode which is suctioned and held on the negative electrode heating drum 12 is released to the side of the bonding drum 18 at a proximate position with the bonding drum 18. Similarly, in relation to the positive electrode plate, the linear velocity of the positive electrode heating drum 16 and the linear velocity of the bonding drum 18 are approximately the same, and the heated positive electrode plate which is suctioned and held on the positive electrode heating drum 16 is released to the side of the bonding drum 18 at a proximate position with the bonding drum 18.

Because the linear velocity of the negative electrode heating drum 12 and the linear velocity of the bonding drum 18 are approximately the same, the linear velocity of the electrode cutting head of the negative electrode cutting drum 10 at a position before the proximate position with the negative electrode heating drum 12 is approximately the same as the linear velocity of the bonding drum 18. Similarly, because the linear velocity of the positive electrode heating drum 16 and the linear velocity of the bonding drum 18 are approximately the same, the linear velocity of the electrode cutting head of the positive electrode cutting drum 14 at a position before the proximate position with the positive electrode heating drum 16 is approximately the same as the linear velocity of the bonding drum 18. Therefore, the electrode cutting head releases the negative electrode plate or the positive electrode plate which has been suctioned and held, at a timing when the linear velocity becomes approximately the same as the bonding drum 18.

The separator S1 of the band shape is suctioned and held on the bonding drum 18 at a predetermined position. Then, at a proximate position with the negative electrode heating drum 12 located at a downstream side in the rotational direction, the heated negative electrode released from the negative electrode heating drum 12 is placed over the separator S1. Then, at a predetermined position at a further downstream side in the rotational direction, the separator S2 of the band shape is placed over the negative electrode plate. Then, the structure is pressed by a thermocompression bonding roller 19 so that the separator S1, the negative electrode plate, and the separator S2 are adhered to each other. Then, at the proximate position with the positive electrode heating drum 16 located at a further downstream side in the rotational direction, the heated positive electrode plate released from the positive electrode heating drum 16 is placed over the separator S2, and the positive electrode plate is adhered by a pressurization force of the positive electrode heating drum 16. Over surfaces of the separator S1 and the separator S2, a thermal adhesion layer is formed which does not exhibit an adhesion property at the room temperature, but which exhibits the adhesion property when heated. The thermal adhesion layer is, for example, a thermoplastic layer including a thermoplastic polymer, and the band-shape separator S1 and the negative electrode plate are adhered to each other, the negative electrode plate and the band-shape separator S2 are adhered to each other, and the band-shape separator S2 and the positive electrode plate are adhered to each other through a plastic deformation of the thermoplastic polymer due to the heating. With this process, a 4-layer laminated body of the structure of (the band-shape separator S1)/(the negative electrode plate)/(the band-shape separator S2)/(the positive electrode plate) is produced at the bonding drum 18. The 4-layer laminated body is transported from the bonding drum 18 to the separator cutting drum 20.

On the other hand, for every certain number of supplied plates, the positive electrode plate is not supplied from the positive electrode cutting drum 14, and the positive electrode plate is thus not supplied from the positive electrode heating drum 16. Because of this, at every certain number of supplied plates, the positive electrode plate is not supplied to the bonding drum 18, and a 3-layer laminated body of the structure of (the band-shape separator S1)/(the negative electrode plate)/(the band-shape separator S2) is produced at the bonding drum 18. Similar to the 4-layer laminated body, the 3-layer laminated body is transported from the bonding drum 18 to the separator cutting drum 20.

The separator cutting drum 20 has a sixth radius, and rotates around a center axis with a sixth angular velocity. The separator cutting drum 20 comprises a plurality of separator cutting heads placed in a circumferential direction of the drum. The separator cutting head comprises an outer peripheral surface on which the 4-layer laminated body or the 3-layer laminated body is suctioned and held, and a cutting means. The cutting means is, for example, a blade which moves in a direction approximately orthogonal to a circumferential direction of the outer peripheral surface. The 4-layer laminated body or the 3-layer laminated body which is transported is suctioned and held on the outer peripheral surface, and is rotated. The separator cutting head is also called a holding head because the separator cutting head suctions and holds the 4-layer laminated body or the 3-layer laminated body. Between the plurality of separator cutting heads, a gap is formed in the circumferential direction, and, in the gap, the blade equipped on the separator cutting head moves in the direction approximately orthogonal to the circumferential direction, to cut the 4-layer laminated body or the 3-layer laminated bodiesuctioned and held on the outer peripheral surface in a predetermined width (third width). Specifically, the band-shape separator S1 and the band-shape separator S2 are cut between adjacent negative electrode plates placed with a predetermined interval between the 4-layer laminated bodies of the structure of (the band-shape separator S1)/(the negative electrode plate)/(the band-shape separator S2)/(the positive electrode plate), between adjacent negative electrode plates placed with a predetermined interval between the 3-layer laminated bodies of the structure of (the band-shape separator S1)/(the negative electrode plate)/(the band-shape separator S2), or between adjacent negative electrode plates placed with a predetermined interval between the 4-layer laminated body and the 3-layer laminated body. The figure shows that the separator is cut at a position 21.

The laminating drum 22 has a seventh radius, and rotates around a center axis with a seventh angular velocity. A linear velocity of the laminating drum is adjusted to be approximately the same as the linear velocity of the separator cutting drum 20. The laminating drum 22 comprises a plurality of laminating heads placed in a circumferential direction of the drum. The laminating head comprises an outer peripheral surface for suctioning and holding the 4-layer laminated body or the 3-layer laminated body which has been cut. Each of the plurality of laminating heads rotates around a common center axis of the laminating drum 22, and each individual laminating head is driven by a cam in the circumferential direction of the drum independently from the other laminating heads. For example, when two laminating heads adjacent in the circumferential direction are a laminating head a and a laminating head b, the laminating head a and the laminating head b rotate at a constant velocity around the common center axis of the drum, and a relative velocity therebetween is changed each time a predetermined section is reached on the circumference of the laminating drum 22. For example, at a certain timing, the laminating head a and the laminating head b may rotate with a constant velocity, and the relative velocity is thus zero, but at another timing, a velocity of the laminating head a may be increased in a direction away from the subsequent laminating head b, so that the relative velocity becomes a finite velocity. With such an independent driving of the laminating heads, it becomes possible to realize a stopped state of a particular laminating head at a layering position while maintaining a rotation with a constant angular velocity for the laminating drum 22 as a whole, and to release, in the stopped state, the 4-layer laminated body or the 3-layer laminated body which has been cut and which is suctioned and held on the outer peripheral surface, and to place the released laminated body over a laminating stage 24.

The laminating stage 24 is placed immediately below the laminating drum 22. Over the laminating stage 24, the 4-layer laminated bodies and the 3-layer laminated bodies which have been cut and which are released from the laminating drum 22 are sequentially layered, to form a layered electrode assembly. The laminating stage 24 can be driven in two axial directions (X-axis and Y-axis) orthogonal to each other, and also an inclination angle (θ) on an X-Y plane can be adjusted. With this configuration, a position (XY position) and an inclination angle (θ) of the 4-layer laminated body or the 3-layer laminated body which has been cut and which is released from the laminating drum 22 are adjusted for positioning, and the cut 4-layer laminated bodies and the cut 3-layer laminated bodies are sequentially layered, to produce the layered electrode assembly. The laminating stage 24 has claws at four corners thereof, and pressurizes and fixes with these claws the 4-layer laminated bodies and the 3-layer laminated bodies which are layered. The 3-layer laminated bodies and the 4-layer laminated bodies which are layered are pressed and/or heated, and are adhered to each other.

The production process of the layered electrode assembly can be summarized as follows:
(1) the negative electrode single plate is cut on a drum, to produce the negative electrode plate;
(2) the negative electrode plate is heated on a drum;
(3) the positive electrode single plate is cut on a drum, to produce the positive electrode plate;
(4) the positive electrode plate is heated on a drum:
(5) the band-shape separator and the negative electrode plate are adhered on a drum, the band-shape separator is further adhered on the drum, and the positive electrode plate is further adhered on the drum;
(6) the band-shape separator is cut on a drum to produce the 3-layer laminated body and the 4-layer laminated body;

(7) the 3-layer laminated body and the 4-layer laminated body are layered on a drum; and (8) the 3-layer laminated body and the 4-layer laminated body which are layered are pressed and/or heated in order to adhere the laminated bodies to each other.

In this manner, by executing the processes of cutting, heating, adhering, and layering on the drums, a high-speed and continuous process can be realized.

Figure 2:
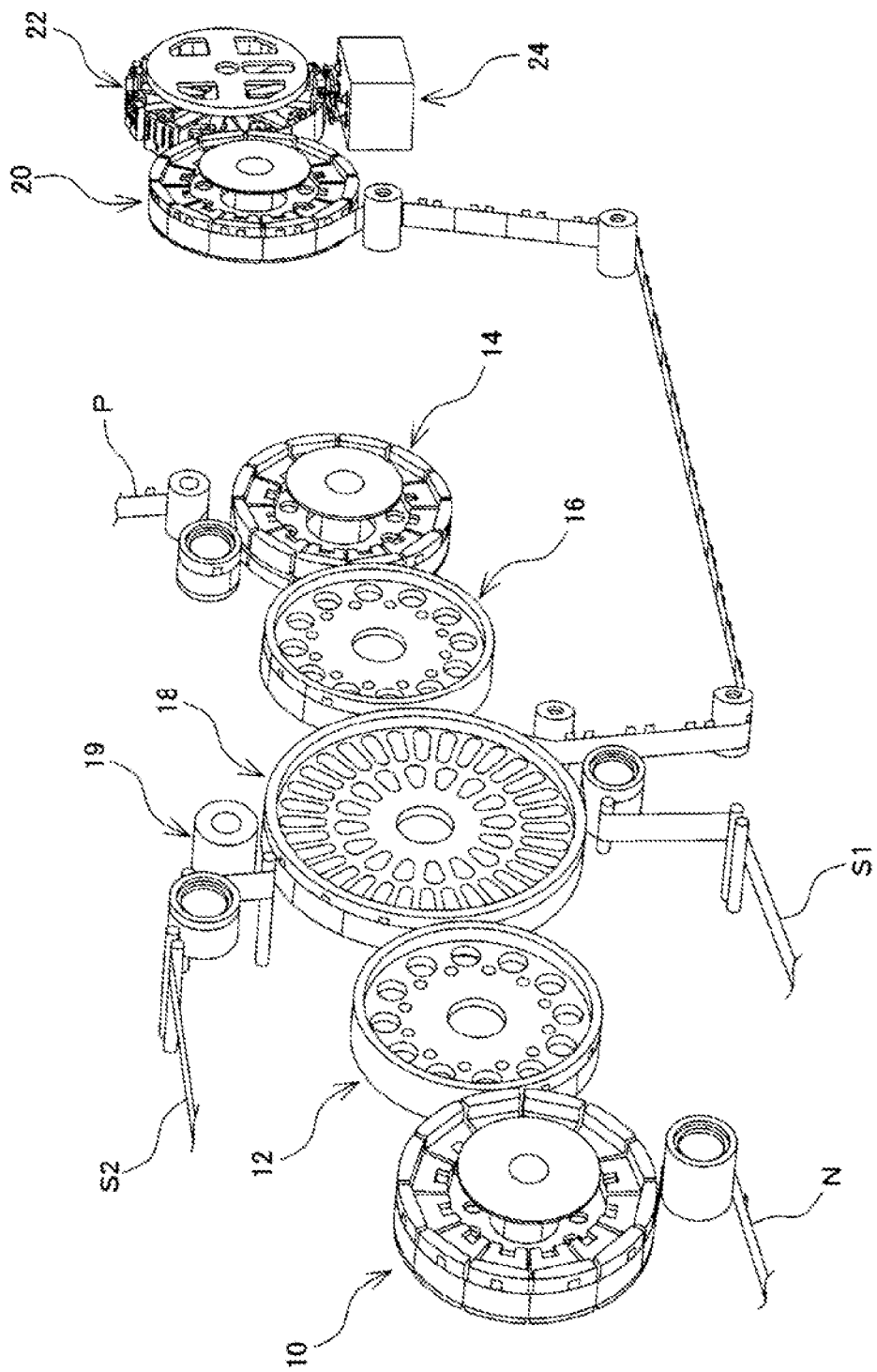
FIG. 2 is a perspective diagram of a structure of a production apparatus according to an embodiment of the present disclosure.

FIG. 2 is a perspective diagram of a specific structure of the production apparatus according to the present embodiment.

The negative electrode cutting drum 10, the negative electrode heating drum 12, the bonding drum 18, the positive electrode heating drum 16, and the positive electrode cutting drum 14 are placed in proximity to each other, in this order from the left side of the figure. The negative electrode cutting drum 10 and the negative electrode heating drum 12 are placed in proximity to each other, the negative electrode heating drum 12 and the bonding drum 18 are placed in proximity to each other, the positive electrode cutting drum 14 and the positive electrode heating drum 16 are placed in proximity to each other, and the positive electrode heating drum 16 and the bonding drum 18 are placed in proximity to each other. The negative electrode cutting drum 10, the negative electrode heating drum 12, the bonding drum 18, the positive electrode heating drum 16, and the positive electrode cutting drum 14 rotate around respective center axes, which are approximately parallel to each other.

The negative electrode single plate N of the band shape whose tension is adjusted by a tension roller is supplied to the negative electrode cutting drum 10. The negative electrode cutting drum 10 comprises the plurality of cutting heads which rotate around the center axis, for example, 12 electrode cutting heads placed in the circumferential direction, and the negative electrode single plate N of the band shape is suctioned and held on the outer peripheral surface of the electrode cutting head, and rotates with the electrode cutting head.

On each of the plurality of electrode cutting heads, a blade is provided which moves in a direction approximately orthogonal to the circumferential direction; that is, a width direction of the negative electrode cutting drum, and the blade moves in the width direction of the drum at a certain range in the rotational direction, to cut the negative electrode single plate N. After the negative electrode single plate N is cut, the electrode cutting head moves in the circumferential direction independently from the other electrode cutting heads to adjust an interval between the negative electrode plates, and the relative velocity is set to approximately zero at the proximate position with the negative electrode heating drum 12.

The negative electrode plate suctioned and held on the electrode cutting head of the negative electrode cutting drum 10 is supplied to the negative electrode heating drum 12 at the proximate position with the negative electrode heating drum 12. More specifically, on the outer peripheral surface of the electrode cutting head (holding head), a suction holes for suctioning and holding the negative electrode plate is formed, and a groove extending in the circumferential direction is formed. With respect to the groove formed on the holding head, between the holding head and a drum of a next stage, a supply means is placed which engages with the groove, frees the negative electrode plate which is an electrode assembly from the suctioning surface of the holding head, and supplies the negative electrode plate to the drum of the next stage. As the supply means, for example, a belt conveyer is inserted in the groove at the proximate position with the negative electrode heating drum 12, the negative electrode plate suctioned and held on the electrode cutting head is moved onto the belt conveyer, and the negative electrode plate is supplied to the side of the negative electrode heating drum 12 via the belt conveyer. The belt conveyer will be described later. The negative electrode cutting drum 10 rotates and transports the negative electrode plates with a predetermined interval.

The negative electrode plates which are cut at the negative electrode cutting drum 10 are sequentially supplied to the negative electrode heating drum 12. The negative electrode heating drum 12 rotates with approximately the same linear velocity with the bonding drum 18, heats the negative electrode plate, and rotates and transports the heated negative electrode plate to the proximate position with the bonding drum 18.

The positive electrode single plate P of the band shape whose tension is adjusted by a plurality of tension rollers is supplied to the positive electrode cutting drum 14. The positive electrode cutting drum 14 comprises a plurality of the cutting heads which rotate around the center axis, for example, 12 electrode cutting heads placed in the circumferential direction, and the positive electrode plate P of the band shape is suctioned and held on the outer peripheral surface of the electrode cutting head, and rotates with the electrode cutting head.

On each of the plurality of electrode cutting heads, a blade which moves in the direction approximately orthogonal to the circumferential direction; that is, a width direction of the positive electrode cutting drum, is provided, and the blade moves in the width direction of the drum in a certain range of the rotational direction, to cut the positive electrode single plate P. After the positive electrode single plate P is cut, the electrode cutting head moves in the circumferential direction independently from the other electrode cutting heads, and adjusts an interval between the positive electrode plates, and the relative velocity is set to approximately zero at the proximate position with the positive electrode heating drum 16.

The positive electrode plate suctioned and held on the electrode cutting head of the positive electrode cutting drum 14 is supplied to the positive electrode heating drum 16 at the proximate position with the positive electrode heating drum 16. More specifically, on the outer peripheral surface of the electrode cutting head (holding head), a suction holes for suctioning and holding the positive electrode plate is formed, and a groove which extends in the circumferential direction is formed. With respect to the groove formed on the holding head, a supply means is placed between the holding head and the drum of the next stage, which engages with the groove, frees the positive electrode plate which is an electrode assembly from the suctioning surface of the holding head, and supplies the positive electrode plate to the drum of the next stage. As the supply means, for example, a belt conveyer is inserted in the groove at the proximate position with the positive electrode heating drum 16, the positive electrode plate suctioned and held on the electrode cutting head is moved onto the belt conveyer, and the positive electrode plate is supplied to the side of the positive electrode heating drum 16 via the belt conveyer.

The positive electrode cutting drum 14 rotates and transports the positive electrode plates at a predetermined interval.

The positive electrode plates which are cut at the positive electrode cutting drum 14 are sequentially supplied to the positive electrode heating drum 16. The positive electrode heating drum 16 rotates with approximately the same linear velocity with the bonding drum 18, heats the positive electrode plate, and rotates and transports the heated positive electrode plate to the proximate position with the bonding drum 18.

The separators S1 and S2 of the band shape whose tensions are adjusted by a plurality of tension rollers are supplied to the bonding drum 18. In addition, at the proximate position with the negative electrode heating drum 12, the heated negative electrode plate is supplied, and, at the proximate position with the positive electrode heating drum 16, the heated positive electrode plate is supplied. The bonding drum 18 rotates in a same direction as the linear velocity of the negative electrode heating drum 12 and the linear velocity of the positive electrode heating drum 16. From an upstream side to a downstream side of the rotational direction of the bonding drum 18, a supply position of the separator S1, a supply position of the negative electrode plate, a supply position of the separator S2, and a supply position of the positive electrode plate are placed in this order. The thermocompression bonding roller 19 is placed between the supply position of the separator S2 and the supply position of the positive electrode plate.

The bonding drum 18 suctions and holds the separator S1 of the band shape on an outer peripheral surface thereof, and rotates and transports the separator S1. At the proximate position with the negative electrode heating drum 12, the heated negative electrode plates are placed over the separator S1 at a predetermined interval, and are pressed by an inter-drum pressure. The bonding drum 18 holds the negative electrode plates placed over the separator S1 with the predetermined interval, and rotates and transports the negative electrode plate, the separator S2 of the band shape is placed over the negative electrode plate at the supply position of the separator S2, and a 3-layer laminated body of the structure of (the separator S1)/(the negative electrode plate)/(the separator S2) is compression-bonded by a pressurization force by the thermocompression bonding roller 19.

The 3-layer laminated body thermally compression-bonded by the thermocompression bonding roller 19 is further rotated and transported to the proximate position with the positive electrode heating drum 16, and the positive electrode plates are placed over the separator S2 at a predetermined interval at the proximate position with the positive electrode heating drum 16, and are pressed by an inter-drum pressure. The positive electrode plate is thermally compression-bonded to the separator S2 by the inter-drum pressure. In addition, at every certain number of the electrode plates, the rotations of the positive electrode cutting drum 14 and the positive electrode heating drum 16 are stopped, to thereby stop the supply of the positive electrode plate from the positive electrode heating drum 16 to the bonding drum 18. With this configuration, the positive electrode plate is not placed over the separator S2, and the structure of the 3-layer laminated body is maintained. The 3-layer laminated body of the structure of (the band-shape separator S1)/(the negative electrode plate)/(the band-shape separator S2), and the 4-layer laminated body of the structure of (the band-shape separator S1)/(the negative electrode plate)/(the band-shape separator S2)/(the positive electrode plate) are transported to the separator cutting drum 20 via a plurality of tension rollers. Alternatively, in place of the configuration to stop the rotations of the positive electrode cutting drum 14 and the positive electrode heating drum 16 at the timing when the 3-layer laminated body is to be obtained, a configuration may be employed in which the 3-layer laminated body is separately created and prepared, and is introduced through a different path from an introduction path of the 4-layer laminated body.

The 3-layer laminated body and the 4-layer laminated body are thermally compression-bonded by the inter-drum pressure between the negative electrode heating drum 12 and the bonding drum 18, the inter-drum pressure between the positive electrode heating drum 16 and the bonding drum 18, and the pressurization force by the thermocompression bonding roller 19. However, when an end of the negative electrode plate which is cut at the negative electrode cutting drum 10, and an end of the positive electrode plate which is cut at the positive electrode cutting drum 14 are pressurized by the drum or the roller, damages may be caused at the end of the negative electrode plate and the end of the positive electrode plate. Thus, the pressurization by the inter-drum pressure and the thermocompression bonding roller 19 may be temporarily reduced at the end of the negative electrode plate which is cut at the negative electrode cutting drum 10, and at the end of the positive electrode plate which is cut at the positive electrode cutting drum 14, to thereby prevent damages thereto. Further, in addition to the end of the negative electrode plate which is cut at the negative electrode cutting drum 10 and the end of the positive electrode plate which is cut at the positive electrode cutting drum 14, the pressurization may be reduced for ends of four sides of the negative electrode plate and for ends of four sides of the positive electrode plate, to suppress damages to the negative electrode plate and the positive electrode plate. That is, it is further desirable that only an inner side of the negative electrode plate and an inner side of the positive electrode plate are adhered to the separator, in order to suppress damages to the negative electrode plate and the positive electrode plate.

Alternatively, the separator cutting drum 20 may be placed spatially distanced from the negative electrode cutting drum 10, the negative electrode heating drum 12, the bonding drum 18, the positive electrode heating drum 16, and the positive electrode cutting drum 14, which are a group of drums.

The separator cutting drum 20 suctions and holds on its outer peripheral surface the 3-layer laminated body or the 4-layer laminated bodiesupplied via a tension roller, and cuts the separator S1 and the separator S2 of the band shape of the 3-layer laminated body or the 4-layer laminated body with a structure with a plurality of separator cutting heads, similar to that of the negative electrode cutting drum 10. The 3-layer laminated body or the 4-layer laminated body which is cut is rotated and transported to the proximate position with the laminating drum 22 while continuing to be suctioned and held on the separator cutting head. On the outer peripheral surface of the separator cutting head, a suction holes for suctioning and holding the 3-layer laminated body or the 4-layer laminated body is formed.

The separator cutting drum 20 rotates and transports the 3-layer laminated bodies or the 4-layer laminated bodies at a predetermined interval.

The laminating drum 22 is placed in proximity to the separator cutting drum 20, and rotates with a velocity approximately identical to the linear velocity of the separator cutting drum 20. The laminating drum 22 comprises a plurality of laminating heads which rotate around the center of rotation of the drum. The laminating head has a vertical cross sectional shape of an approximate T shape, has a suction holes, for suctioning and holding the 3-layer laminated body or the 4-layer laminated body, formed on an outer peripheral surface thereof, and has a vacuum pad inside the suction holes. The 3-layer laminated body or the 4-layer laminated bodiesuctioned and held on the separator cutting drum 20 is suctioned on the laminating head via the vacuum pad. Each of the plurality of laminating heads rotates around a common center axis of the laminating drum 22, and each individual laminating head is driven in the circumferential direction of the drum and also in a radial direction of the drum, independently from the other laminating heads. Thus, the laminating head rotates and transports the 3-layer laminated body or the 4-layer laminated body to the proximate position with the laminating stage 24 while suctioning and holding the 3-layer laminated body or the 4-layer laminated body. When the laminating head reaches the proximate position with the laminating stage 24, a relative velocity in the circumferential direction of the drum with respect to the laminating stage 24 is set to zero, and the laminating head moves in the radial direction of the drum, in a direction toward the laminating stage 24. The laminating head causes the 3-layer laminated body or the 4-layer laminated body which is suctioned and held to contact the laminating stage 24, or, when the 3-layer laminated body or the 4-layer laminated body is already layered over the laminating stage 24, causes the suctioned and held laminated body to contact the laminated body over the laminating stage 24, and switches OFF the suctioning and holding force, to layer the 3-layer laminated body or the 4-layer laminated body which is suctioned and held. Then, the laminating head moves in the radial direction of the drum, in a direction away from the laminating stage 24, and restarts the rotation.

An overall structure has been described.

For the transfer of the 3-layer laminated body and the 4-layer laminated body from the separator cutting drum 20 to the laminating drum 22, a method via the vacuum pad provided on the laminating head of the laminating drum 22 has been described, but the transfer is not limited to such a method. For example, similar to the positive electrode cutting drum and the negative electrode cutting drum, a method may be employed for transferring the 3-layer laminated body and the 4-layer laminated body to the laminating head 22 by forming a groove on the separator cutting drum and transferring the laminated body via a belt conveyer.

Alternatively, for transfer of the positive electrode plate and the negative electrode plate from the positive electrode cutting drum and the negative electrode cutting drum to the respective heating drums and the bonding drum, the method with the vacuum pad may be employed in place of the belt conveyer. A drum which supplies the electrode assembly such as the positive electrode plate and the negative electrode plate, or the laminated body, to a suctioning pad may be called a first drum, and the drum having the suctioning pad may be called a second drum.

Next, details of a production process of the 3-layer laminated body and the 4-layer laminated body will be described.

Figure 3:
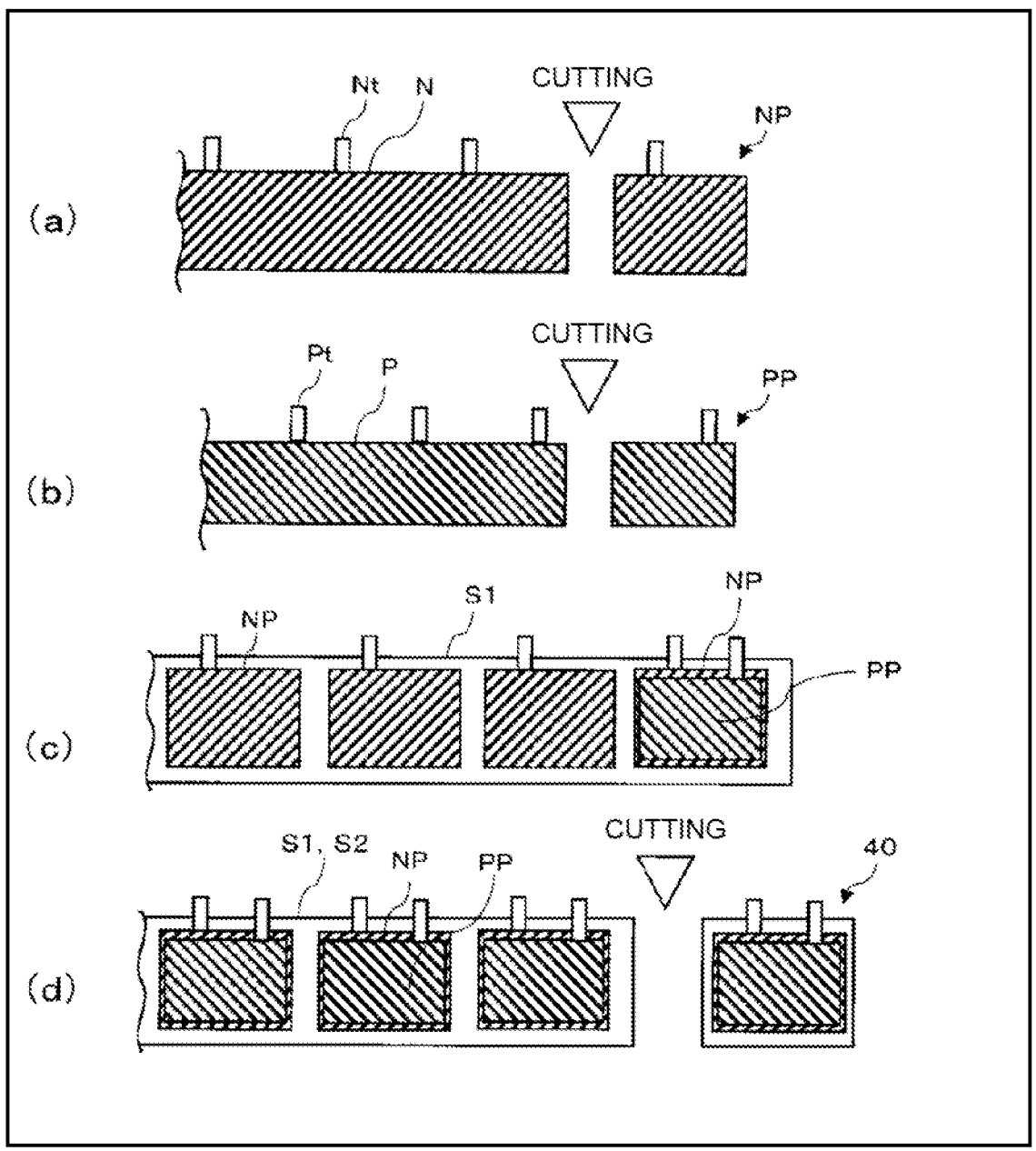
FIG. 3 is an explanatory diagram showing a production method of a 4-layer laminated body according to an embodiment of the present disclosure.
Figure 4:
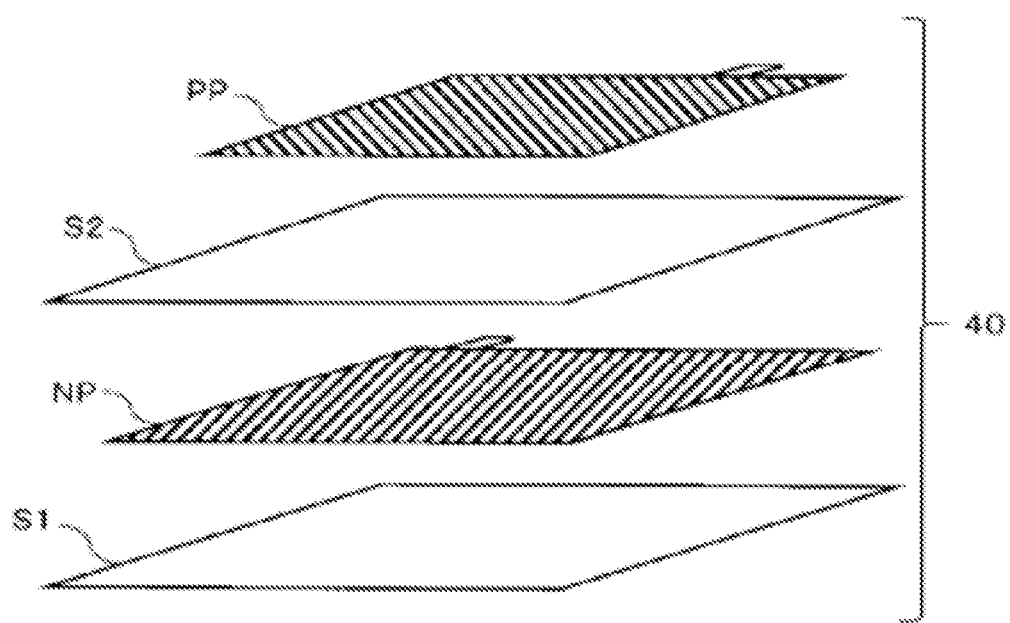
FIG. 4 is a diagram showing a structure of a 4-layer laminated body according to an embodiment of the present disclosure.

FIGS. 3 and 4 schematically show the production process of the 4-layer laminated body, which is a basic process.

FIG. 3(*a*) shows cutting of the negative electrode at the negative electrode cutting drum 10. On the negative electrode single plate N having the negative electrode electricity collector and the negative electrode active material layer, tabs Nt are formed with a constant interval. The tab Nt is formed integrally with the negative electrode electricity collector, and is formed to protrude from one edge of the negative electrode electricity collector (formed to protrude in a direction orthogonal to a direction of extension of the negative electrode single plate N having the band shape). The negative electrode cutting drum 10 cuts the negative electrode single plate N at a constant interval, to produce negative electrode plates NP having a first width. On one edge of the negative electrode plate NP, the tab Nt is formed.

FIG. 3(*b*) shows cutting of the positive electrode at the positive electrode cutting drum 14. On the positive electrode single plate P having the positive electrode current collector and the positive electrode active material layer, tabs Pt are formed at a constant interval. The tab Pt is formed integrally with the positive electrode current collector, and is formed to protrude from one edge of the positive electrode current collector (formed to protrude in a direction orthogonal to a direction of extension of the positive electrode single plate P having the band shape). The positive electrode cutting drum 14 cuts the positive electrode single plate P at a constant interval, to produce positive electrode plates PP having a second width. On one edge of the positive electrode plate PP, the tab Pt is formed. A size of the positive electrode plate PP is smaller than a size of the negative electrode plate NP. In addition, the interval (pitch) of the tab Pt of the positive electrode plate PP is smaller than the interval (pitch) of the tab Nt of the negative electrode plate NP.

FIG. 3(*c*) shows adhesion at the bonding drum 18. The negative electrode plates NP are placed at a constant interval over the separator S1 of the band shape and are adhered thereto, the separator S2 of the band shape is placed over this structure and adhered thereto, and the positive electrode plates PP are placed at a constant interval to overlap above the negative electrode plates NP and are adhered thereto. The positive electrode plate PP is placed at an inner side of a region of presence of the negative electrode plate NP. While the negative electrode plates NP are separated from each other and the positive electrode plates PP are separated from each other, the separators S1 and S2 of the band shape are not cut, and remain in the band shape. Thus, as a whole, the structure is a 4-layer laminated body of a band shape.

FIG. 3(*d*) shows cutting at the separator cutting drum 20. The separator cutting drum 20 cuts the 4-layer laminated body of the band shape at a constant interval; that is, between adjacent negative electrode plates NP, to produce a 4-layer laminated body 40 having a third width and in which the separators S1 and S2 are cut and separated.

FIG. 4 shows a structure of the 4-layer laminated body 40. The separator S1 is placed at a bottommost layer, the negative electrode plate NP is layered thereover, the separator S2 is layered thereover, and the positive electrode plate PP is further layered thereover.

Figure 5:
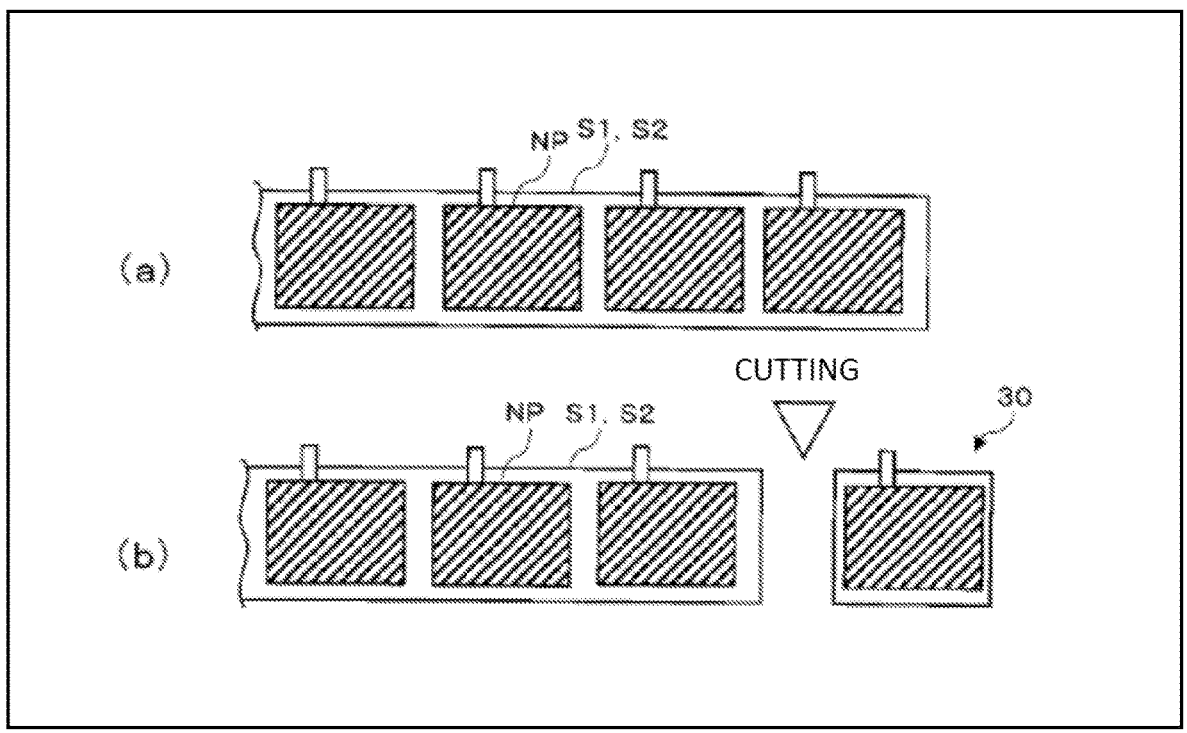
FIG. 5 is an explanatory diagram showing a production method of a 3-layer laminated body according to an embodiment of the present disclosure.
Figure 6:
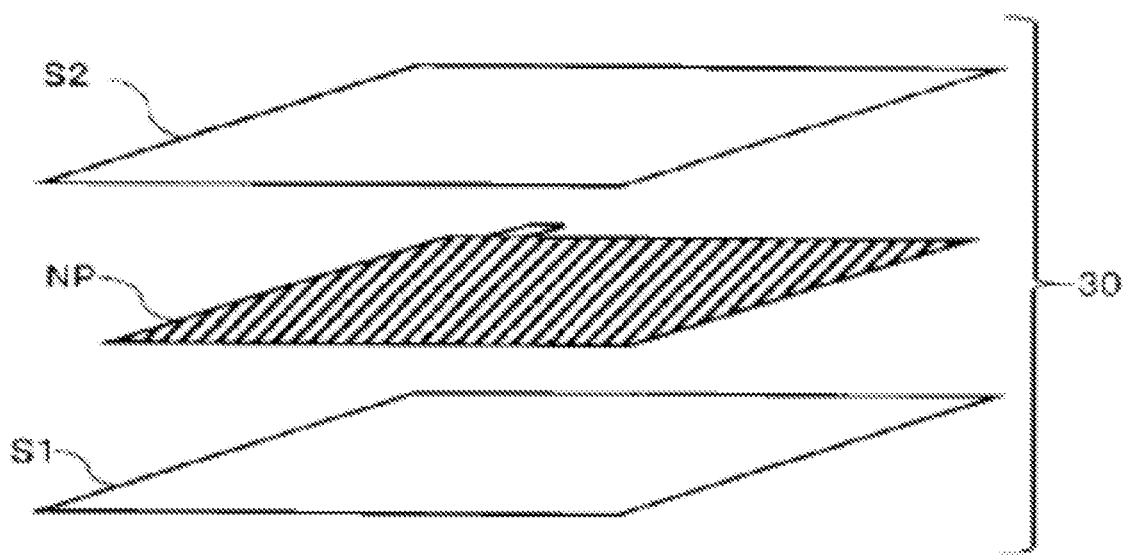
FIG. 6 is a diagram showing a structure of a 3-layer laminated body according to an embodiment of the present disclosure.

FIGS. 5 and 6 schematically show a production process of the 3-layer laminated body.

FIG. 5(*a*) shows the adhesion at the bonding drum 18. The negative electrode plates NP are placed at a constant interval over the separator S1 of the band shape and are adhered thereto, and the separator S2 of the band shape is placed over this structure and is adhered thereto. With regard to the positive electrode plate PP, the positive electrode plate PP is not placed every certain number of electrode plates. Although the negative electrode plates NP are separated from each other, the separators S1 and S2 of the band shape are not cut, and remain in the band shape. Thus, as a whole, the structure is a 3-layer laminated body of a band shape.

FIG. 5(*b*) shows the cutting at the separator cutting drum 20. The separator cutting drum 20 cuts the 3-layer laminated body of the band shape at a constant interval; that is, between adjacent negative electrode plates NP, to produce a 3-layer laminated body 30 having a third width, and in which the separators S1 and S2 are cut and separated. The 3-layer laminated body 30 is produced every certain number of electrode plates. For example, the laminated bodies are produced in the order of the 4-layer laminated body 40, the 4-layer laminated body 40, the 3-layer laminated body 30, the 4-layer laminated body, and so on.

FIG. 6 shows a structure of the 3-layer laminated body 30. The separator S1 is placed at a bottommost layer, the negative electrode plate NP is layered thereover, and the separator S2 is layered thereover.

With the processes described above, the 3-layer laminated body 30 and the 4-layer laminated body 40 are produced, and are supplied from the separator cutting drum 20 to the laminating drum 22.

Figure 7:
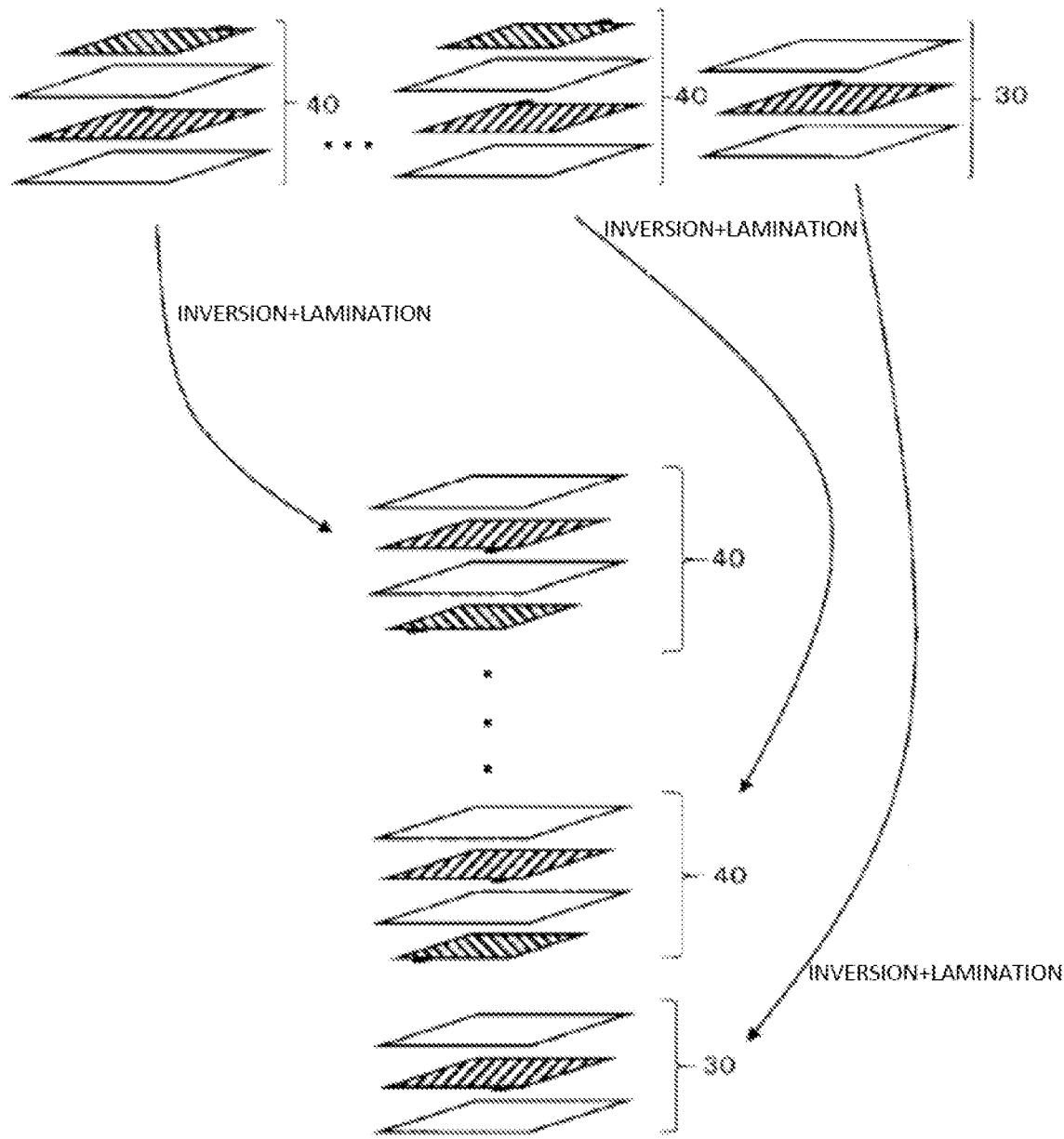
FIG. 7 is an explanatory diagram of layering of a 3-layer laminated body and a 4-layer laminated body according to an embodiment of the present disclosure.

FIG. 7 schematically shows a layering process at the laminating drum 22.

When the laminating drum 22 receives the 3-layer laminated body 30 and the 4-layer laminated body 40 having a quadrangular shape from the separator cutting drum 20, the laminating drum 22 sequentially places and layers these elements over the laminating stage 24. That is, when the laminating drum 22 receives the 3-layer laminated body 30 of the structure of (the separator S1)/(the negative electrode plate NP)/(the separator S2), the laminating drum 22 inverts the element upside down, and places the inverted element of the structure of (the separator S2)/(the negative electrode plate NP)/(the separator S1) over the laminating stage 24.

Next, when the laminating drum 22 receives the 4-layer laminated body 40 of the structure of (the separator S1)/(the negative electrode plate NP)/(the separator S2)/(the positive electrode plate PP), the laminating drum 22 inverts the element upside down, and places and layers the inverted element of the structure of (the positive electrode plate PP)/(the separator S2)/(the negative electrode plate NP)/(the separator S1) over the 3-layer laminated body 30 over the laminating stage 24. With this process, over the laminating stage 24, a structure is layered having the structure of (the separator S2)/(the negative electrode plate NP)/(the separator S1)/(the positive electrode plate PP)/(the separator S2)/(the negative electrode plate NP)/(the separator S1). Then, in a similar manner, the laminating drum 22 receives the 4-layer laminated body 40, inverts the element upside down, and places and layers the inverted element over the 4-layer laminated body 40 over the laminating stage 24. Eventually, a structure is layered having the structure of (the separator S2)/(the negative electrode plate NP)/(the separator S1)/(the positive electrode plate PP)/(the separator S2)/(the negative electrode plate NP)/(the separator S1)/(the positive electrode plate PP)/(the separator S2)/(the negative electrode plate NP)/(the separator S1)/( . . . )/(the positive electrode plate PP)/(the separator S2)/(the negative electrode plate NP)/(the separator S1). The laminating drum 22 sequentially layers one 3-layer laminated body 30 and a predetermined number of the 4-layer laminated bodies 40 over the laminating stage 24, to produce a layered electrode assembly. By layering the elements in a combination of the 3-layer laminated body 30 and the 4-layer laminated body 40, a layered electrode assembly of a quadrangular shape may be obtained, which has the negative electrode plates NP as the electrodes at both ends, at all times.

The configuration for inverting and layering is merely exemplary, and other layering methods may alternatively be employed. For example, the 4-layer laminated body may be first layered without the inversion, and the 3-layer laminated body may be layered without the inversion as the last element.

Figure 8:
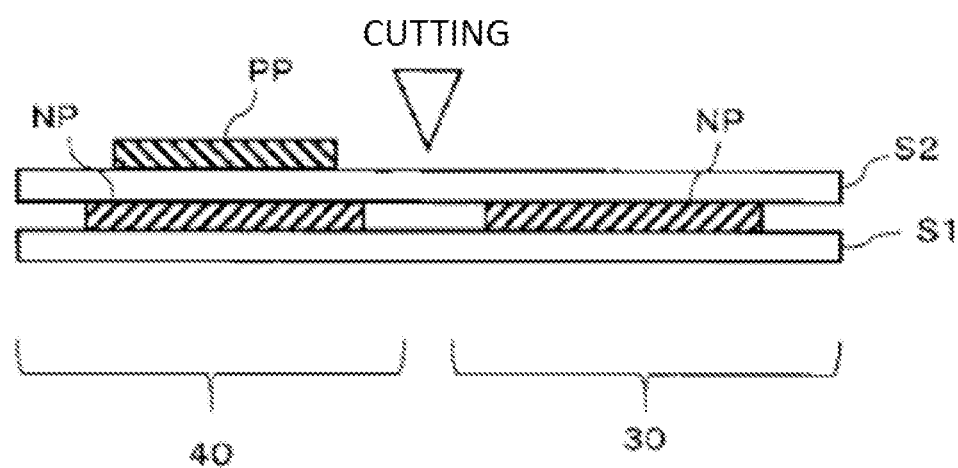
FIG. 8 is an explanatory diagram of cutting of a separator according to an embodiment of the present disclosure.
Figure 9:
FIG. 9 is an explanatory diagram of an order of generation of a 3-layer laminated body and a 4-layer laminated body according to an embodiment of the present disclosure.
Figure 10:
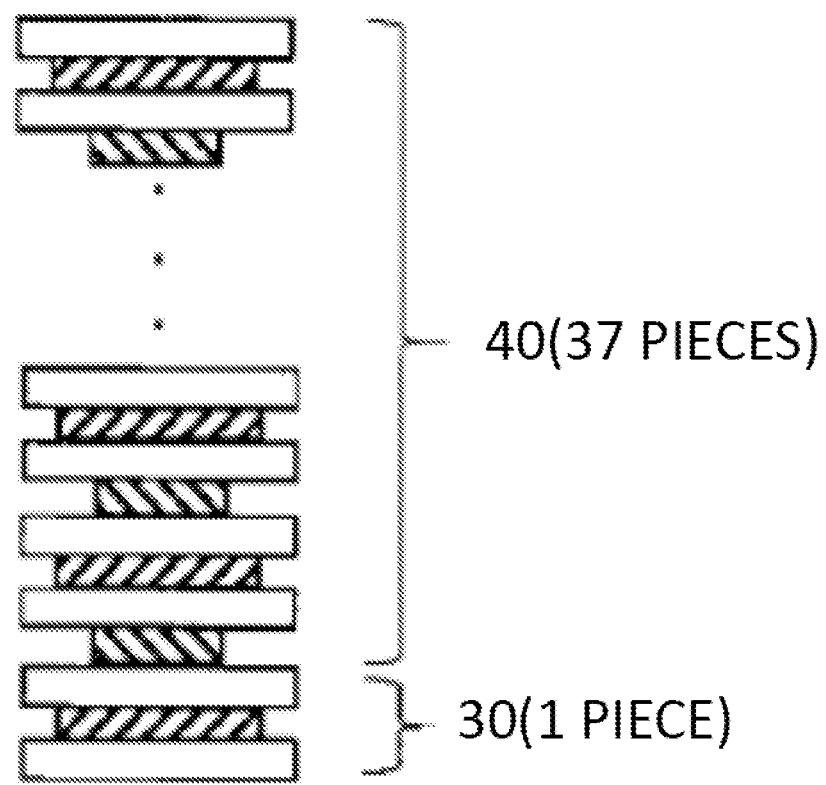
FIG. 10 is a diagram showing a structure of a layered electrode assembly according to an embodiment of the present disclosure.

FIGS. 8 to 10 show specifics of the layering processes of the 3-layer laminated body 30 and the 4-layer laminated body 40.

FIG. 8 shows a separator cutting process at the separator cutting drum 20. The 3-layer laminated body 30 and the 4-layer laminated body 40 of the band shape adhered at the bonding drum 18 are cut and separated at an approximate middle position between adjacent negative electrode plates NP. Similarly, the 4-layer laminated bodies 40 of the band shape are cut and separated from each other at an approximate middle position between the adjacent negative electrode plates NP.

FIG. 9 shows the 3-layer laminated body 30 and the 4-layer laminated body 40 which are cut. When a blank of the positive electrode plate PP appears every 38 positive electrode plates PP, for example, after one 3-layer laminated body 30, 37 4-layer laminated bodies 40 follow, and then, one 3-layer laminated body 30 is again produced, followed by production of 37 4-layer laminated bodies. When N is a counter variable, at N=1, the 3-layer laminated body 30 is produced, at N=2, the 4-layer laminated body 40 is produced, at N=3, the 4-layer laminated body 40 is produced, . . . , at N=38, the 4-layer laminated body 40 is produced, at N=39, the 3-layer laminated body 30 is produced, and at N=40, the 4-layer laminated body 40 is produced.

FIG. 10 shows a structure of the layered electrode assembly in which, first, the 3-layer laminated body 30 is placed over the laminating stage 24, and then the 4-layer laminated bodies 40 are sequentially layered thereover. In the structure, one 3-layer laminated body 30 and 37 4-layer laminated bodies 40 are layered. The electrodes at both ends of the layered electrode assembly are the negative electrode plates NP.

Next, a specific structure of the electrode cutting head will be described in detail.

Figure 11:
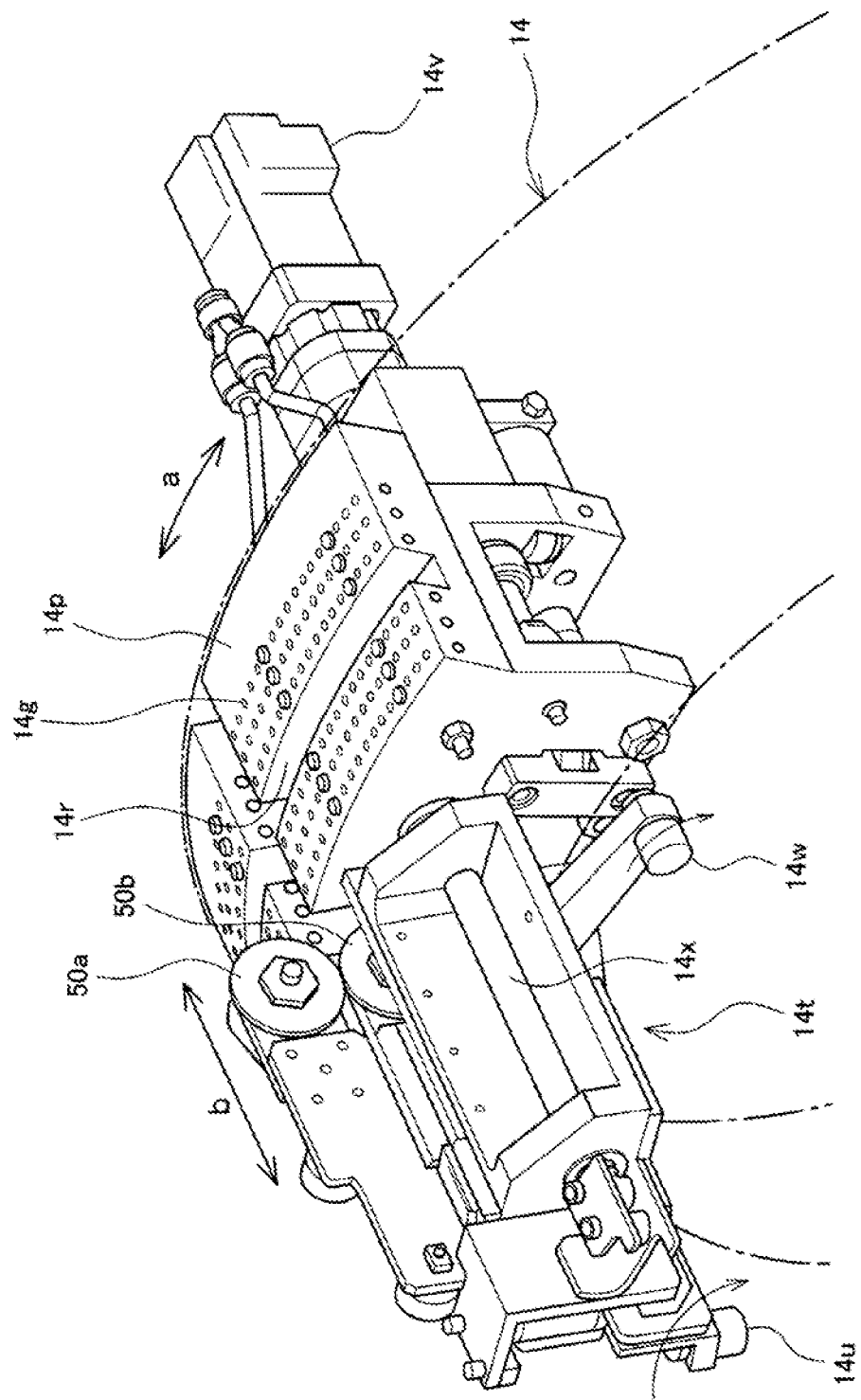
FIG. 11 is a perspective diagram of a structure of a positive electrode cutting head according to an embodiment of the present disclosure.

FIG. 11 is a perspective diagram of a structure of the electrode cutting head of the positive electrode cutting drum 14. The plurality of electrode cutting heads are provided in the circumferential direction at the center of the rotation axis of the positive electrode cutting drum 14. The electrode cutting head is driven, independently from the other electrode cutting heads, in the circumferential direction (in a direction "a" in the figure) by a motor 14v provided for each electrode cutting head. Alternatively, the electrode cutting heads may be independently driven using a linear motor, a planetary gear, a cogged belt, or the like, in place of the motor 14v.

On an outer peripheral surface 14p of the electrode cutting head, a suction holes 14g for suctioning and holding the positive electrode single plate P and the positive electrode plate PP (after the cutting) is formed. At an approximate center in a direction (a direction "b" in the figure) orthogonal to the circumferential direction of the outer peripheral surface 14p, a groove 14r is formed along the circumferential direction, and the suction holes 14g is not formed in the groove 14r. In addition, on the electrode cutting head, a cutting mechanism block 14t having round blades 50a and 50b is provided. The round blades 50a and 50b are a pair of blades. The round blades 50a and 50b are a pair of upper and lower rotational blades, and reciprocate in the direction "b" in the figure while rotating, to cut the positive electrode single plate which is the quadrangular electrode assembly. Specifically, the round blades 50a and 50b forward-move from an initial position retracted from the outer peripheral surface 14p in the direction "b" in the figure, to cut the positive electrode single plate, and then return-move in the direction "b" in the figure, to again return to the initial position. The cutting mechanism block 14t has a cam 14u which engages with a cam groove formed on a fixed shaft of the positive electrode cutting drum 14. The cutting mechanism block 14t causes, via a rack-and-pinion mechanism, the round blades 50a and 50b to reciprocate along a rail in a gap between adjacent electrode cutting heads in the direction (the direction "b" in the figure) orthogonal to the circumferential direction, by the cam 14u moving along the cam groove with a rotation of the electrode cutting head. A reciprocating velocity of the round blades 50a and 50b in the direction "b" in the figure can be suitably adjusted by setting a gear ratio of the rack-and-pinion mechanism.

The cutting mechanism block 14t is further connected to a cam 14w. After the round blades 50a and 50b forward-move in the direction "b" in the figure and cut the positive electrode single plate, and the cutting head which suctions and holds the positive electrode plate moves in a direction away from the cutting head which holds the positive electrode single plate, the cam 14w rotates so that a rotating shaft 14x of the cutting mechanism block 14t rotates. With the rotation of the rotating shaft 14x, the cutting mechanism block 14t and the round blades 50a and 50b move in a direction away from a cutting surface of the positive electrode single plate. Then, the round blades 50a and 50b return-move in the direction "b" in the figure.

Figure 12:
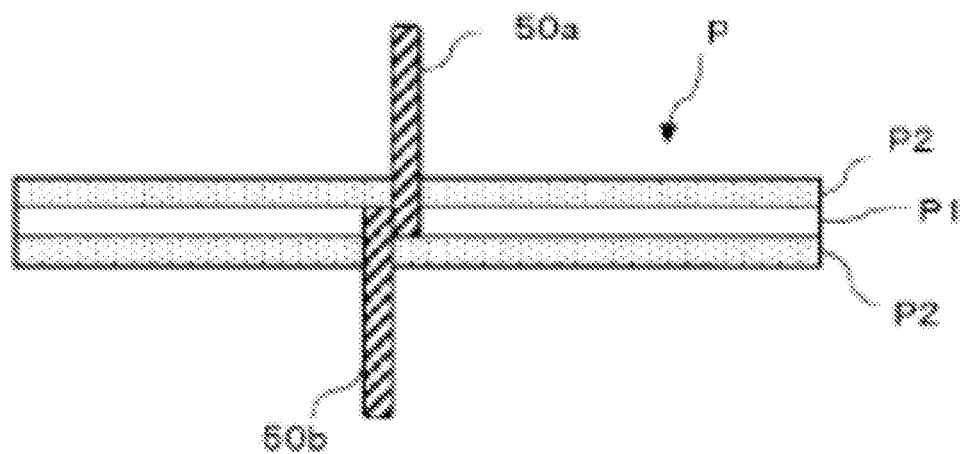
FIG. 12 is an explanatory diagram of cutting of a positive electrode single plate in a comparative example.

FIG. 12 shows a case in which the upper and lower round blades 50a and 50b are placed in an overlapping manner with each other in a thickness direction of the positive electrode single plate P for the cutting. The positive electrode single plate P is formed from a positive electrode current collector P1 and positive electrode active material layers P2. The upper round blade 50a is placed at a depth to penetrate through the upper positive electrode active material layer P2 and the positive electrode current collector P1. In addition, the lower round blade 50b is placed at a depth to penetrate through the lower positive electrode active material layer P2 and the positive electrode current collector P1. The depth of the round blade 50a and the depth of the round blade 50b overlap each other in the thickness direction of the positive electrode single plate P. The positive electrode single plate P may be cut with such a positional placement of the round blades 50a and 50b, but the present inventors have found that this placement of the round blades 50a and 50b may cause an unnecessary projection; that is, a burr, on the cutting surface of the positive electrode single plate P, and may cause degradation of the layered electrode assembly.

Figure 13:
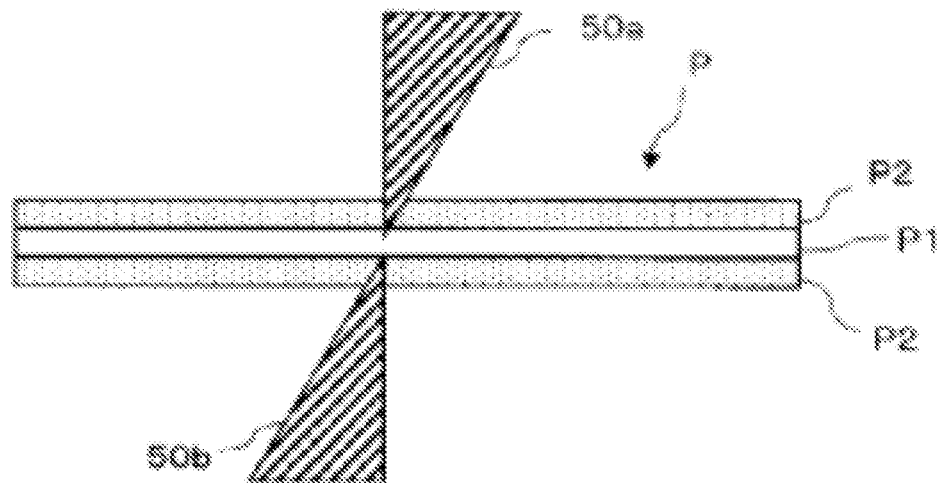
FIG. 13 is an explanatory diagram (part 1) of cutting of a positive electrode single plate according to an embodiment of the present disclosure.

FIG. 13 shows a case in which the upper and lower round blades 50a and 50b are placed without overlapping in the thickness direction of the positive electrode single plate P, for the cutting. The upper round blade 50a is placed at a depth in which the round blade 50a penetrates through the upper positive electrode active material layer P2, but does not penetrate through the positive electrode current collector P1. The lower round blade 50b is placed at a depth in which the round blade 50b penetrates through the lower positive electrode active material layer P2, but does not penetrate through the positive electrode current collector P1, similar to the upper round blade 50a. The upper and lower round blades 50a and 50b are placed with a finite distance from each other in the thickness direction. In the case of such a placement, while the upper and lower positive electrode active material layers P2 of the positive electrode single plate P are cut by the round blades 50a and 50b, the positive electrode current collector P1 is not cut, and the band shape is maintained though a cutout is generated at a part of the positive electrode current collector P1. The positive electrode single plate P is suctioned and held on the outer peripheral surface of the plurality of the electrode cutting heads, and the electrode cutting heads move in the circumferential direction independently from each other to adjust the interval between the positive electrode plates PP, and move with a relative linear velocity with the positive electrode heating drum 16 of approximately zero. When the electrode cutting heads move in the circumferential direction independently from each other, tensile forces in opposite directions act on the cutting part of the positive electrode single plate P. With the tensile forces, the positive electrode current collector P1 ruptures with the cutout as a starting point, and is eventually cut. The present inventors have found that, with the placement of the round blades 50a and 50b as shown in FIG. 13, no burr is generated or almost no burr is generated on the cutting surface of the positive electrode single plate P.

In FIG. 13, the upper and lower round blades 50a and 50b are placed to not overlap in the thickness direction of the positive electrode single plate P, but alternatively, a placement may be employed in which a distance in the thickness direction between the upper and lower round blades 50a and 50b is zero. That is, when a distance in the thickness direction of the positive electrode single plate P between a blade tip of the upper round blade 50a and a blade tip of the lower round blade 50b is L and the thickness of the positive electrode current collector P1 is d, the blades may be placed so that d>L≥0. Here, L<0 means that the upper and lower round blades 50a and 50b overlap each other, and that the upper and lower round blades 50a and 50b cut the upper and lower positive electrode active material layers P2 and the positive electrode current collector P1. The condition of d>L≥0 means that the upper positive electrode active material layer P2 is cut by the upper round blade 50a, the lower positive electrode active material layer P2 is cut by the lower round blade 50b, and the positive electrode current collector P1 is not cut and is ruptured by the tensile forces.

Figure 14:
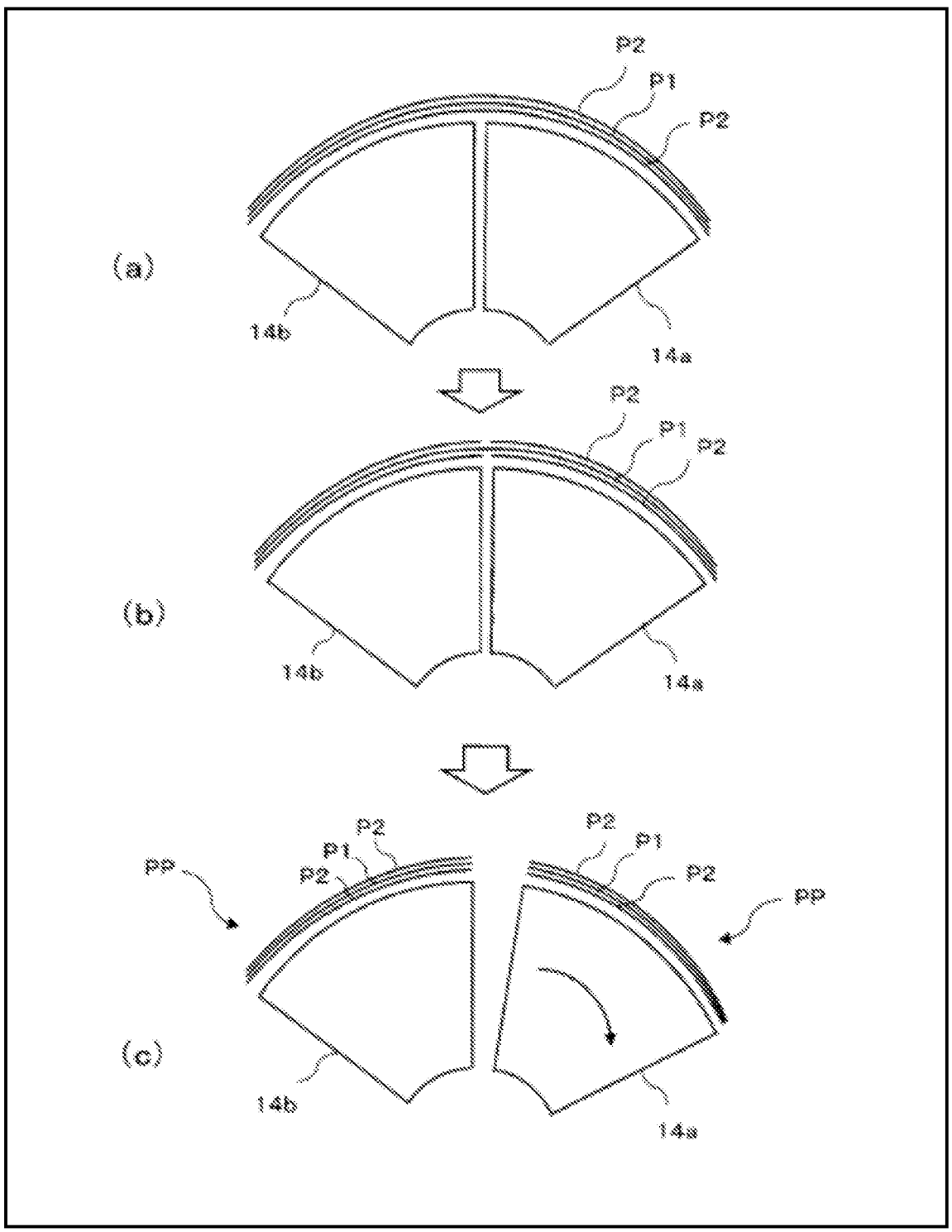
FIG. 14 is an explanatory diagram (part 2) of cutting of a positive electrode single plate according to an embodiment of the present disclosure.

FIG. 14 exemplifies cutting of the positive electrode single plate P at an electrode cutting head 14a and an electrode cutting head 14b shown in FIG. 13.

As shown in FIG. 14(a), the electrode cutting head 14a and the electrode cutting head 14b rotate around the center of the rotating shaft of the drum while suctioning and holding the positive electrode single plate P on the outer peripheral surface thereof. The positive electrode single plate P is formed from the positive electrode current collector P1 and the positive electrode active material layers P2 formed over both surfaces of the positive electrode current collector P1. When the electrode cutting head rotates and moves to a predetermined position, the round blades 50a and 50b forward-move by the cutting mechanism 14t provided on the electrode cutting head 14a, and cut the positive electrode active material layers P2 of the positive electrode single plate P.

FIG. 14(b) shows a structure in which the positive electrode active material layers P2 are cut by the round blades 50a and 50b. At this point, the positive electrode current collector P1 is not cut yet, and the positive electrode single plate P continues to be suctioned and held in the band shape on the outer peripheral surfaces of the electrode cutting head 14a and the electrode cutting head 14b.

Then, as shown in FIG. 14(c), the electrode cutting head 14a moves with an increased velocity in the circumferential direction of the drum independently from the electrode cutting head 14b. With this movement, a tensile force is applied to the positive electrode current collector P1, and the positive electrode current collector P1 of the band shape is cut. Then, the round blades 50a and 50b return-move by the cutting mechanism 14t provided on the electrode cutting head 14a. In this regard, it can be said that, in the present embodiment, the cutting of the positive electrode single plate P is executed by a combination of the movements of the round blades 50*a* and 50*b* and the movement of the electrode cutting head. The details of the reciprocating motions of the round blades 50*a* and 50*b* will be described later with reference to FIG. 15.

In the present embodiment, the positive electrode current collector P1 of the positive electrode single plate P is cut by the tensile force, and the positive electrode active material layers P2 are cut by the round blades 50*a* and 50*b*. Thus, the cutting surface of the positive electrode current collector P1 and the cutting surface of the positive electrode active material layer P2 have cutting forms which differ from each other.

Figure 16:
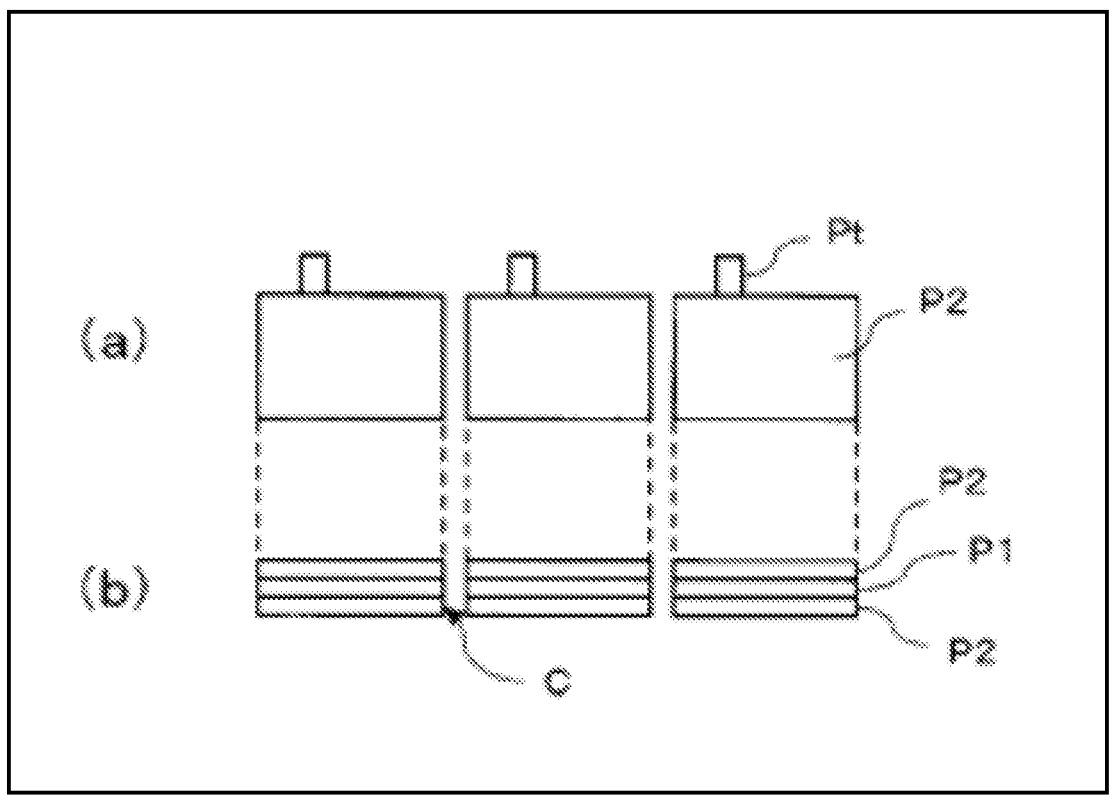
FIG. 16 is a top view and a side view of a positive electrode single plate according to an embodiment of the present disclosure.

FIG. 16 shows a top view and a side view of the positive electrode plate PP after being cut. FIG. 16(*a*) shows the top view. The positive electrode active material layer P2 is present on the surface, and the tab Pt extends from the end. FIG. 16(*b*) shows the side view. Similar to FIG. 14, the positive electrode active material layers P2 are present above and below the positive electrode current collector P1. Here, the cutting surface which is cut by the electrode cutting head is shown with "c" in the figure.

Figure 17:
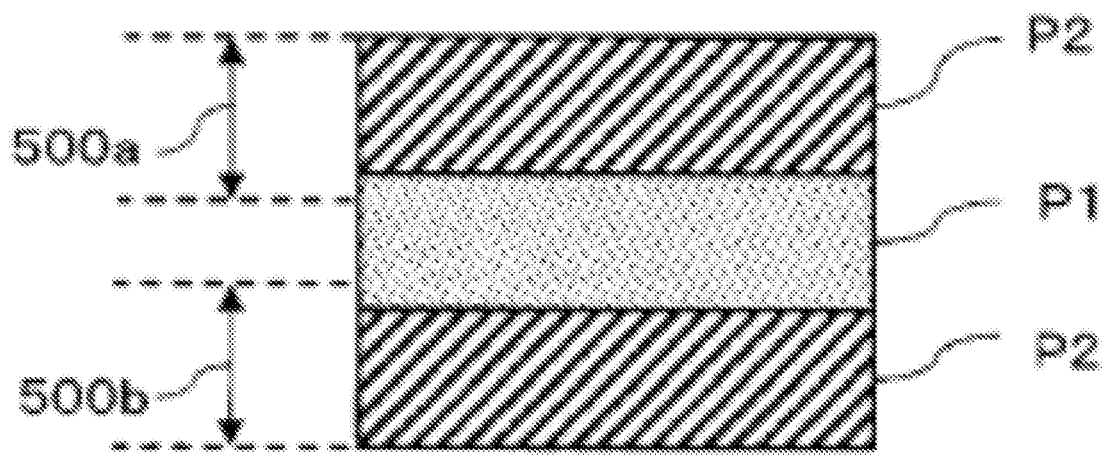
FIG. 17 is an explanatory diagram of a cutting surface of a positive electrode single plate according to an embodiment of the present disclosure.

FIG. 17 shows a cross section of the cutting surface c in FIG. 16(*b*). FIG. 17 shows the cross section of the cutting surface c of the positive electrode single plate P which is cut by the electrode cutting head 14*a* and the electrode cutting head 14*b* shown in FIG. 13. FIG. 17 shows a range 500*a* in which the round blade 50*a* is in contact in the forward movement, and a range 500*b* in which the round blade 50*b* is in contact in the forward movement. Because ranges in which the round blades 50*a* and 50*b* scrub the positive electrode current collector P1 are relatively small, the burr in which an end surface of the positive electrode current collector P1 extends due to the scrubbing of the positive electrode current collector P1 by the round blades 50*a* and 50*b* can be suppressed. In addition, as will be described below, by disengaging the round blades 50*a* and 50*b* from the cutting surface after the cutting, the scrubbing of the cutting surface by the round blades 50*a* and 50*b* in the return movement is prevented, and the damages to the cutting surface can be suppressed also in this regard.

Figure 18:
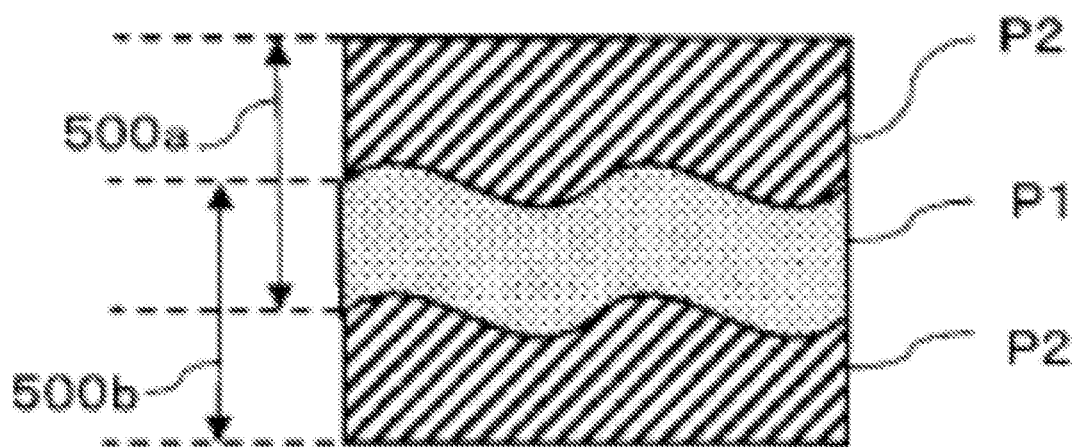
FIG. 18 is an explanatory diagram of a cutting surface of a positive electrode single plate in a comparative example.

FIG. 18 schematically shows, for a comparison purpose, the cutting surface c when the round blades 50*a* and 50*b* are placed to overlap each other in the thickness direction of the positive electrode single plate P, for cutting, as shown in FIG. 12. The reciprocation range 500*a* of the round blade 50*a* and the reciprocation range 500*b* of the round blade 50*b* overlap each other, the round blades 50*a* and 50*b* scrub the positive electrode current collector P1, causing the end surface of the positive electrode current collector P1 to extend, and the burr is caused. The advantage of the placement of the round blades in the present embodiment is apparent from a comparison of FIGS. 17 and 18.

Figure 15:
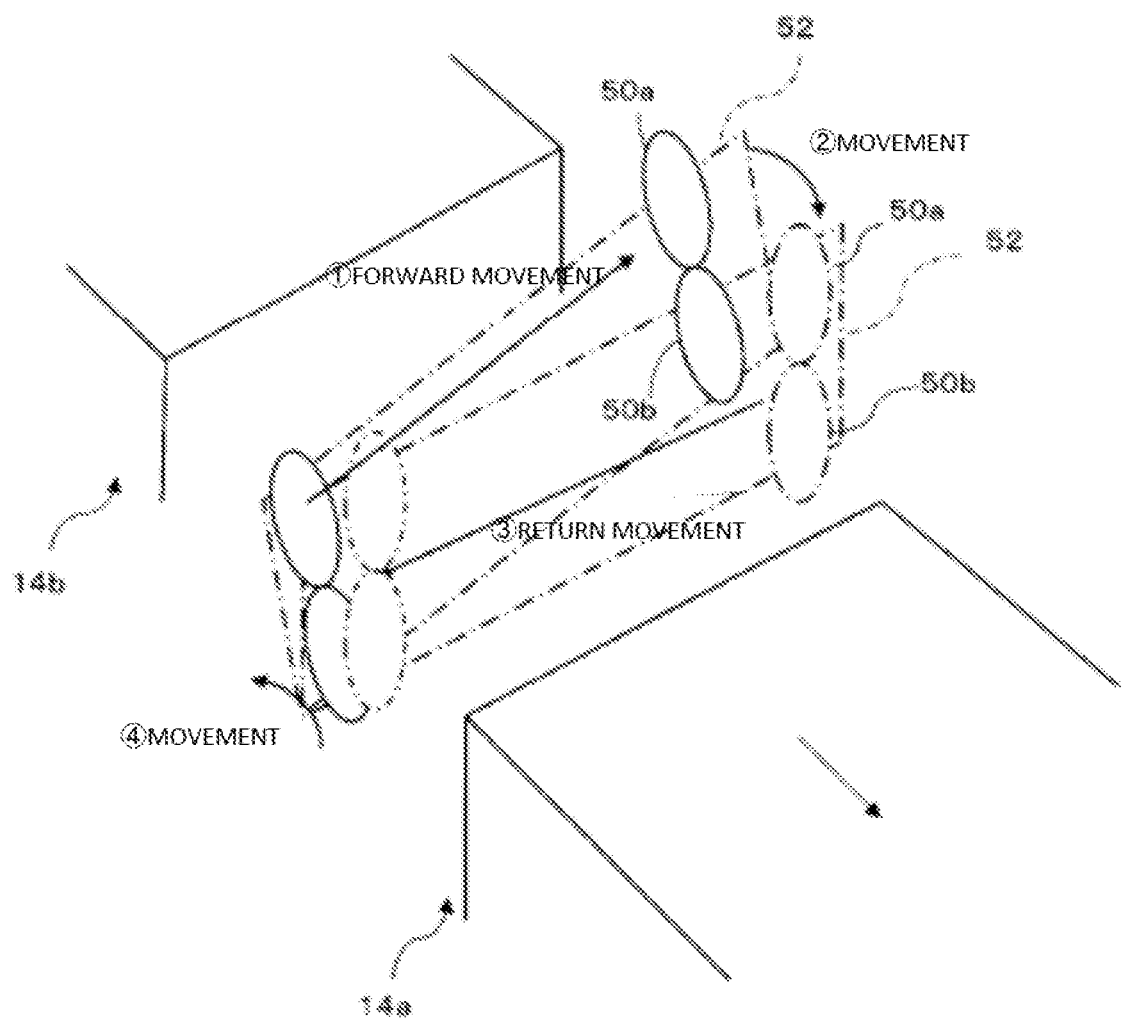
FIG. 15 is an explanatory diagram of a reciprocating motion of a round blade according to an embodiment of the present disclosure.

As already described, the round blades 50*a* and 50*b* cut the positive electrode single plate P by the reciprocating motion. FIG. 15 schematically shows the reciprocating motions of the round blades 50*a* and 50*b*. The round blades 50*a* and 50*b* forward-move from the initial position in the direction orthogonal to the circumferential direction of the drum by the cutting mechanism block 14*t*, and cut the positive electrode active material layers P2. The round blades 50*a* and 50*b* forward-move along a movement plane 52.

Next, the round blades 50*a* and 50*b* return to the initial position by the return movement. First, after the electrode cutting head 14*a* which suctions and holds the positive electrode plate PP moves in a direction away from the electrode cutting head 14*b* which holds the positive electrode single plate P, the cam 14*w* shown in FIG. 11 rotates so that the rotating shaft 14*x* rotates, and, with the rotation of the rotating shaft 14*x*, the cutting mechanism block 14*t* and the round blades 50*a* and 50*b* move in a direction away from the positive electrode single plate P. Then, the round blades 50*a* and 50*b* return-move in the direction orthogonal to the circumferential direction of the drum. After the forward movement, with a rotation of the cam 14*w* in a reverse direction, the cutting mechanism 14*t* and the round blades 50*a* and 50*b* move to the initial position. Because a forward movement trajectory and a return movement trajectory of the round blades 50*a* and 50*b* differ from each other, and the round blades 50*a* and 50*b* do not contact the cutting surfaces of the positive electrode single plate P and the positive electrode single plate PP during the return movement, the damages to the cutting surfaces can be effectively suppressed.

In the present embodiment, the round blades 50*a* and 50*b* are exemplified as the blades of the electrode cutting head, but the shape of the blade is not limited to the round blade. In addition, in the present embodiment, the damages to the cutting surface are suppressed by employing different trajectories for the forward and return movements of the round blades 50*a* and 50*b* of the electrode cutting head, but the structure for suppressing the damages to the cutting surface is not limited to such a structure.

Figure 19:
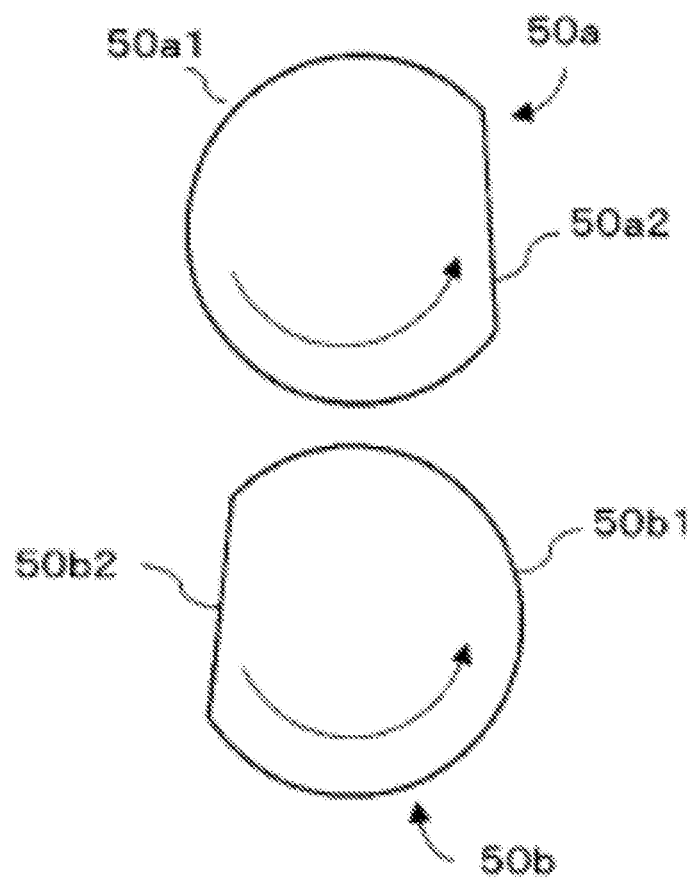
FIG. 19 is an explanatory diagram showing another blade shape according to an embodiment of the present disclosure.

FIG. 19 shows another blade shape for the electrode cutting head. Upper and lower blades 50*a* and 50*b* are round blades as a whole, but have parts which are flat. The blade 50*a* is formed from an arc portion 50*a*1 and a flat portion 50*a*2, a blade is formed on the arc portion 50*al*, and no blade is formed in the flat portion 50*a*2. This is similarly true for the blade 50*b*. Namely, the blade 50*b* is formed from an arc portion 50*b*1 and a flat portion 50*b*2, a blade is formed on the arc portion 50*b*1, and no blade is formed in the flat portion 50*b*2. The blades 50*a* and 50*b* rotate with the rotating shaft as a center, and cut the positive electrode single plate P at the arc portions 50*a*1 and 50*b*1 on which the blade is formed.

Figure 20:
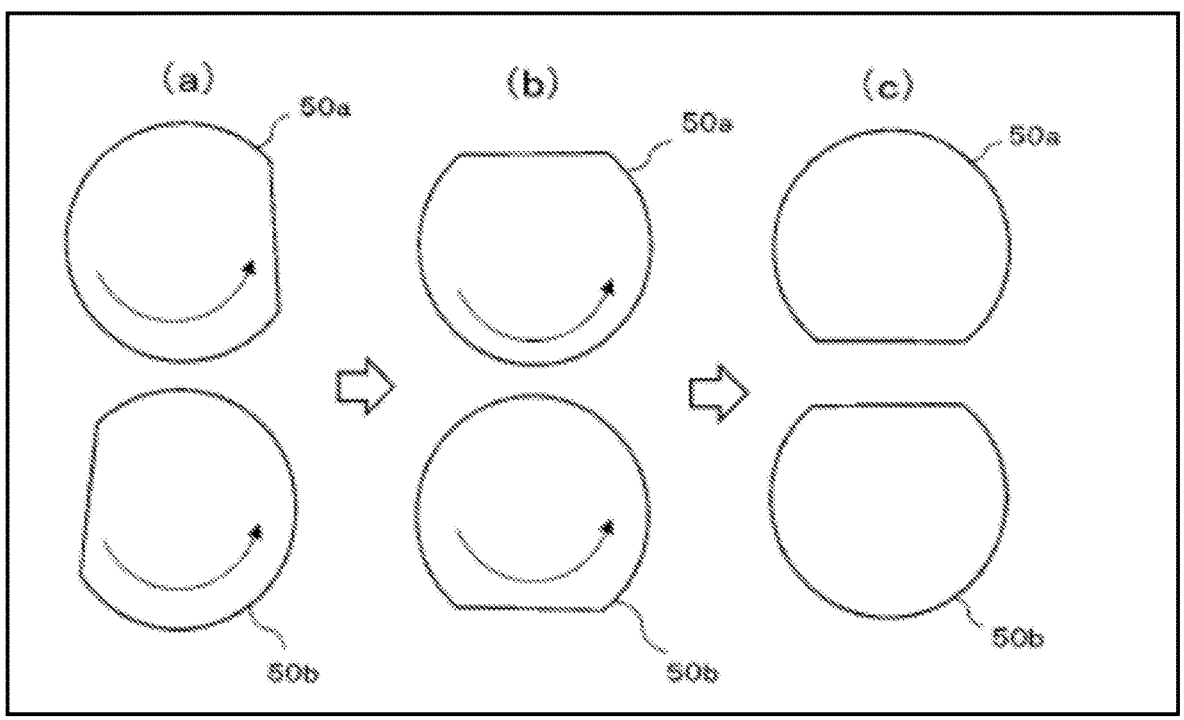
FIG. 20 is an explanatory diagram of a reciprocating motion of another blade according to an embodiment of the present disclosure.

FIG. 20 shows the cutting of the positive electrode single plate P by the rotations of the blades 50*a* and 50*b* shown in FIG. 19. At the initial position, the arc portion 50*a*1 of the blade 50*a* and the arc portion 50*b*1 of the blade 50*b* oppose each other, and, during the forward movement, the blades 50*a* and 50*b* rotate from the initial position, to cut the positive electrode single plate P by the arc portion 50*a*1 and the arc portion 50*b*1, as shown by (a) and (b). When the blades 50*a* and 50*b* further rotate, to a position as shown by (c) in which the flat portion 50*a*2 and the flat portion 50*b*2 oppose each other, the cutting of the positive electrode single plate P is completed, and the forward movement is completed. During the return movement, the blades 50*a* and 50*b* are moved to the initial position while the state of opposition of the flat portion 50*a*2 and the flat portion 50*b*2 is maintained. Because an inter-axial distance between the blades 50*a* and 50*b* is constant, in the state in which the flat portion 50*a*2 and the flat portion 50*b*2 oppose each other, a gap is created between the blades 50*a* and 50*b*. With the return movement while maintaining the gap, the blades 50*a* and 50*b* can be prevented from contacting the cutting surface, and the damages to the cutting surface can thus be suppressed. In this case, the movement (inclination) of the cutting mechanism block 14*t* by the rotation of the cam 14*w* as shown in FIG. 15 can be made unnecessary.

The positive electrode single plate P is cut at the positive electrode cutting drum 14 and the positive electrode plate PP is produced in the manner described above. The produced positive electrode single plate PP is supplied to the positive electrode heating drum 16. The positive electrode plate PP may be supplied from the positive electrode cutting drum 14 to the positive electrode heating drum 16, for example, via a belt conveyer or the like.

Figure 21:
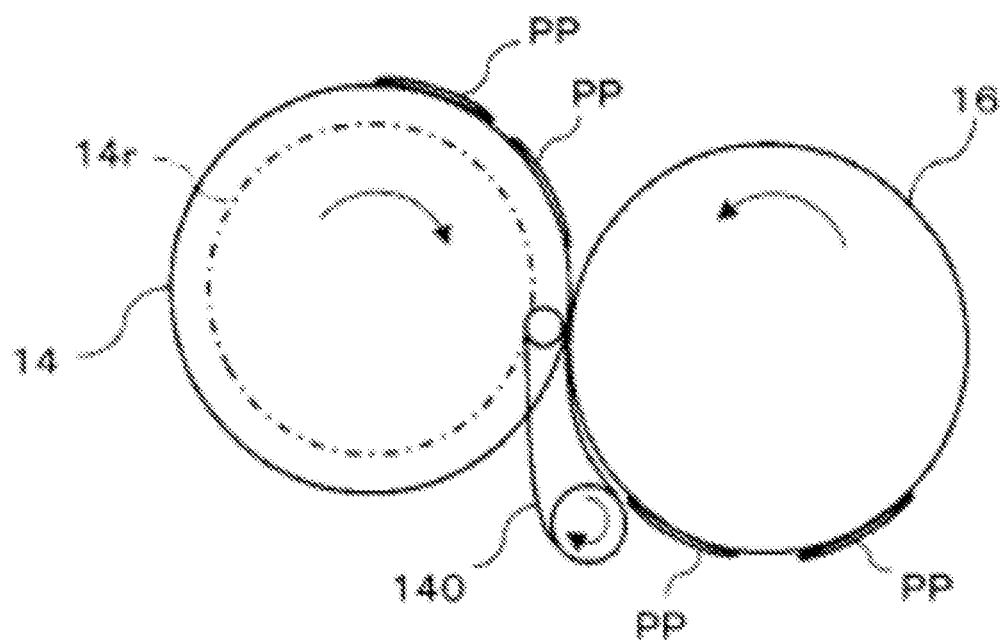
FIG. 21 is an explanatory diagram of supply of a positive electrode single plate according to an embodiment of the present disclosure.
Figure 22:
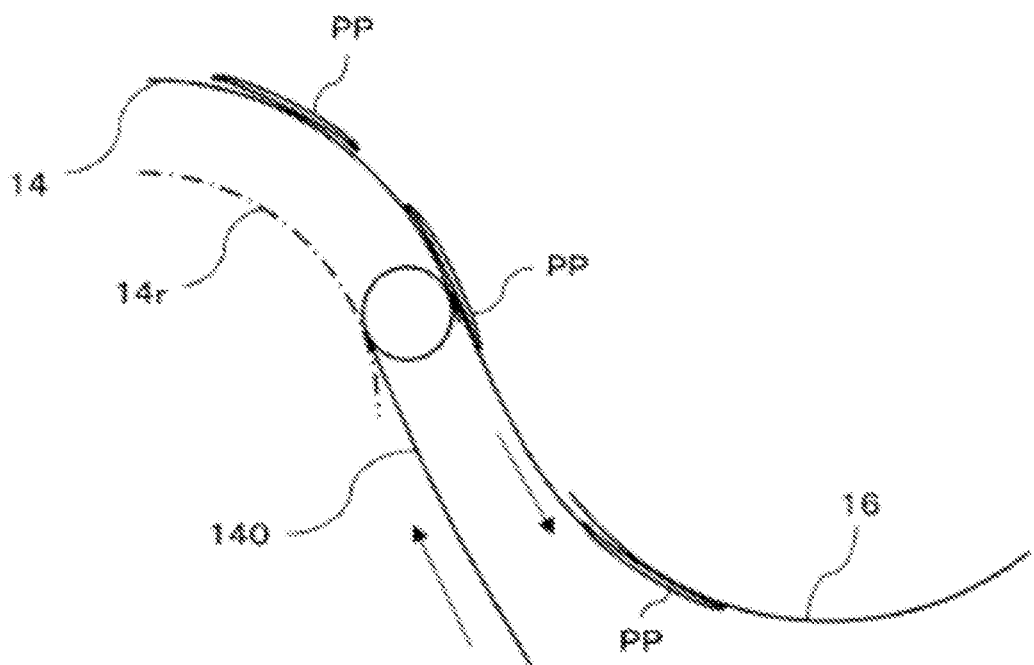
FIG. 22 is a partial enlarged view of FIG. 21.

FIG. 21 schematically shows the supply of the positive electrode plate PP from the positive electrode cutting drum 14 to the positive electrode heating drum 16. FIG. 22 shows a partial enlarged view of FIG. 21, that is, an enlarged view of a contact portion of the positive electrode cutting drum 14 and the positive electrode heating drum 16.

A belt conveyer 140 is placed in proximity to the contact portion of the positive electrode cutting drum 14 and the positive electrode heating drum 16, and one end of the belt conveyer 140 is inserted into the groove 14r (refer to FIG. 11) of the positive electrode cutting drum 14. A width of a pulley at the side of the one end of the belt conveyer 140 inserted in the groove 14r is approximately the same as a width of the groove 14r. A pulley at the side of the other end of the belt conveyer 140 is placed in proximity to the positive electrode heating drum 16. A belt of the belt conveyer 140 extends from the groove 14r of the positive electrode cutting drum 14 to a position near the positive electrode heating drum 16, is folded back by the pulley of the side of the other end of the belt conveyer 140, and again returns to the inside of the groove 14r of the positive electrode cutting drum 14.

The positive electrode single plate PP is cut at the positive electrode cutting drum 14, is suctioned and held on the outer peripheral surface thereof, and is rotated and transported. When the positive electrode plate PP is rotated and transported, and contacts the belt conveyer 140 having the one end inserted into the groove 14r, the positive electrode plate PP moves over onto the belt conveyer 140, is separated from the surface of the positive electrode cutting drum 14, and is placed over the belt conveyer 140. The positive electrode plate PP over the belt conveyer 140 is transported by the belt conveyer 140 to the positive electrode heating drum 16, is suctioned by the suction holes formed on the outer peripheral surface of the positive electrode heating drum 16, moves from the belt conveyer 140 to the outer peripheral surface of the positive electrode heating drum 16, and is suctioned and held thereover. In the above description, the belt conveyer 140 inserted into the groove 14r is held by the pulley on the one end side, but alternatively, a knife edge may be inserted into the groove 14r in place of the pulley, and the belt conveyer 140 inserted into the groove 14r may be held by the knife edge.

In the above, the cutting of the positive electrode single plate P at the positive electrode cutting drum 14 and the supply of the positive electrode plate PP from the positive electrode cutting drum 14 to the positive electrode heating drum 16 have been described. Similar processes are applied for the cutting of the negative electrode single plate N at the negative electrode cutting drum 10 and the supply of the negative electrode plate NP from the negative electrode cutting drum 10 to the negative electrode heating drum 12. In the cutting of the band-shape separator at the separator cutting drum 20 also, the blades 50a and 50b may be return-moved while avoiding the contact with the cutting surface, to thereby suppress the damages to the cutting surface.

Next, a process of supplying the negative electrode plate NP or the positive electrode plate PP from the negative electrode heating drum 12 or the positive electrode heating drum 16 to the bonding drum 18 will be described in detail.

Figure 23A:
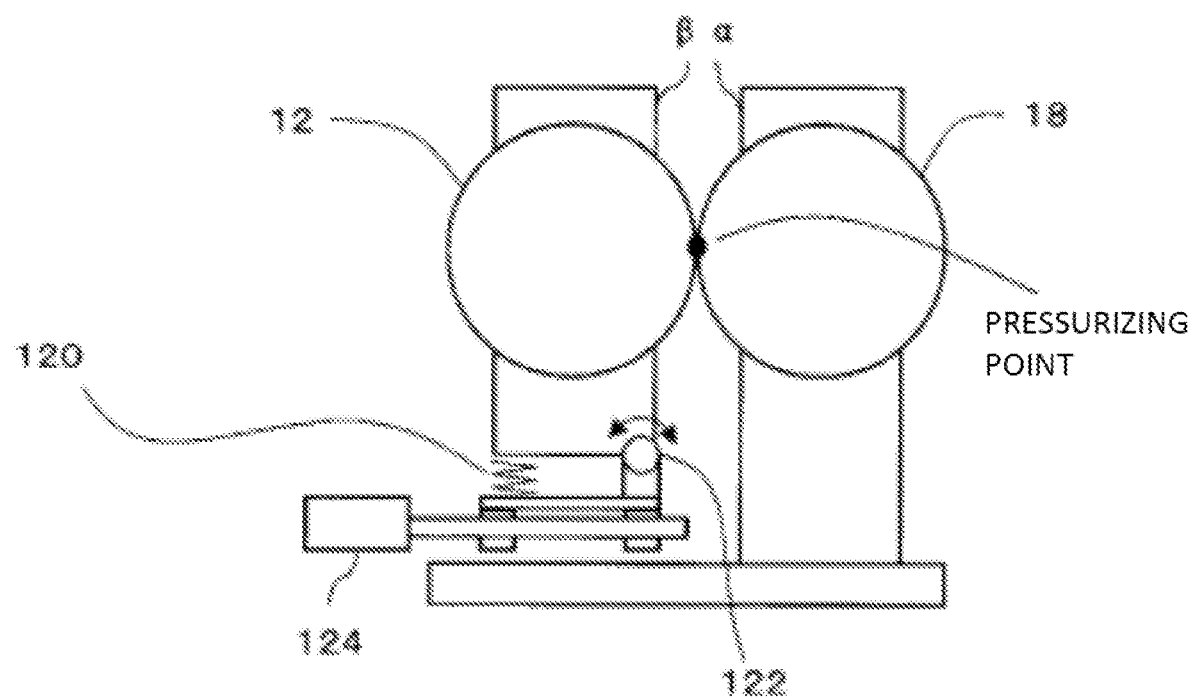
FIG. 23A is an explanatory diagram of a negative electrode heating drum and a bonding drum according to an embodiment of the present disclosure.

FIG. 23A shows the negative electrode heating drum 12 and the bonding drum 18. The negative electrode heating drum 12 receives the negative electrode plate NP which is cut at the negative electrode cutting drum 10, suctions and holds the negative electrode plate NP on the outer peripheral surface thereof, and heats the negative electrode plate NP while rotating and transporting the negative electrode plate NP. At the proximate position with the bonding drum 18, the heated negative electrode plates NP are sequentially adhered with a constant interval over the separator S1 of the band shape which is being suctioned and held on the outer peripheral surface of the bonding drum 18, and which is being rotated and transported.

The negative electrode heating drum 12 is pivotally supported in a manner to allow swinging around a drum rotation pivot 122, and swings around the drum rotation pivot 122 by a motor 124. In addition, in the negative electrode heating drum 12, a coil spring 120 is provided opposing the drum rotation pivot 122. When the negative electrode heating drum 12 swings around the rotation pivot 122, an amount of flexure of the coil spring 120 changes, so that a pressing force at a pressing point which is a contact point between the negative electrode heating drum 12 and the bonding drum 18 is adjusted.

The negative electrode heating drum 12 adheres the negative electrode plate NP to the separator S1 by pressurizing the heated negative electrode plate NP onto the separator S1 of the band shape on the bonding drum 18 by the pressing force at the pressing point, but the negative electrode heating drum 12 has a finite decentering and the bonding drum 18 also has a finite decentering. When the decentering exists, the amount of flexure of the coil spring 120 changes, and thus, the negative electrode plate NP cannot be pressed with a constant pressing force for adhesion.

In consideration of this, the amounts of decentering of the negative electrode heating drum 12 and the bonding drum 18 are combined, and the motor 124 is rotated at all times using the combined value according to the drum rotations to swing the negative electrode heating drum 12 around the rotation pivot 122, to thereby cancel the change of the pressing force at the pressing point. The negative electrode plate NP is thus pressed with an approximately constant pressing force and is adhered over the separator S1 of the band shape.

The amounts of decentering of the negative electrode heating drum 12 and the bonding drum 18 are determined in advance through measurements, and are stored as a table in a memory of a control apparatus. A drive signal based on a cancelling waveform which would cancel a combined waveform of the amounts of decentering of the two drums is supplied to the motor 124, the flexure of the coil spring 120 due to the decentering is suppressed, and a variation of the pressing force is thereby suppressed.

The control apparatus drives the motor 124 using the cancelling waveform as a drive signal waveform, to enable the decentering to be cancelled and the negative electrode heating drum 12 to be pressurized against the bonding drum 18 with a constant pressing force at all times.

However, when the negative electrode heating drum 12 is pressurized onto the bonding drum 18 with a constant pressing force to adhere the negative electrode plate NP over the separator S1 of the band shape, the negative electrode plate NP may be damaged by the pressing force, particularly at the end of the negative electrode plate NP; that is, at the end in the circumferential direction of the drum. Because of this, instead of adhering the negative electrode plate NP over the separator S1 with a constant pressing force, a configuration may be employed in which the pressing force between the negative electrode heating drum 12 and the bonding drum 18 is reduced or the pressing is interrupted (by setting the pressing force to zero) at respective ends of the negative electrode plate NP in the circumferential direction, so that the damages to the ends of the negative electrode plate NP can be prevented.

Figure 24:
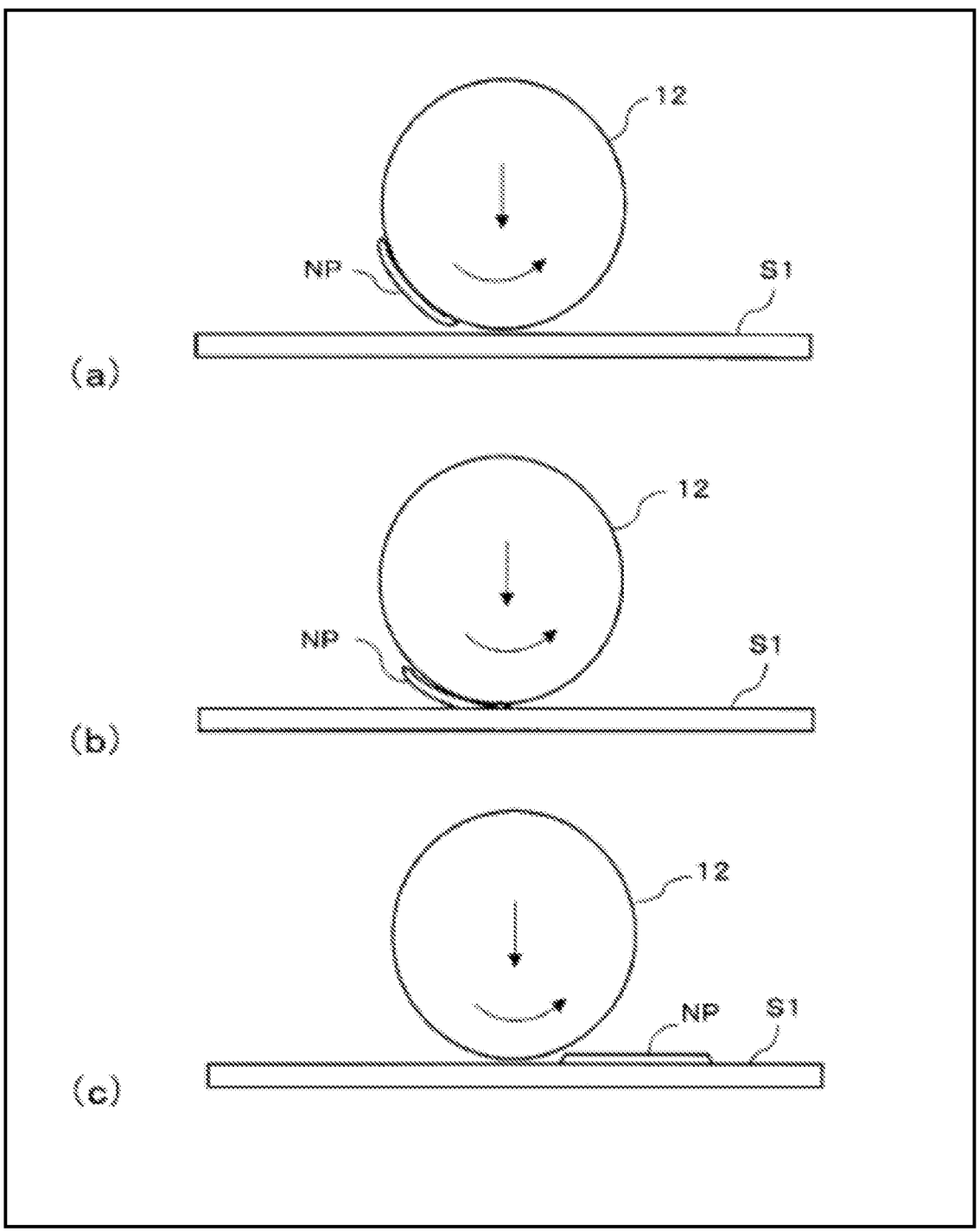
FIG. 24 is an explanatory diagram of adhesion of a negative electrode plate in a comparative example.

FIG. 24 shows adhesion of the negative electrode plate NP onto the separator S1 of the band shape with a constant pressing force. That is, FIG. 24 shows adhesion of the negative electrode plate NP over the separator S1 without reducing the pressing force between the negative electrode heating drum 12 and the bonding drum 18, or interrupting the pressing. In FIG. 24, the separator S1 is shown in a straight line shape, but in reality, the separator S1 is suctioned and held on the bonding drum 18, and is in a state of an arc shape along an outer shape of the arc shape of the bonding drum 18. In addition, in FIG. 24, one negative electrode plate NP is heated on the negative electrode heating drum 12, but a plurality of the negative electrode plates NP may be heated.

In FIG. 24(a), the negative electrode heating drum 12 is in direct contact with the separator S1 in regions where the negative electrode plate NP is not present, and pressurizes the separator S1 with a constant pressing force. When the negative electrode plate NP is rotated and transported in this state, as shown in FIG. 24(b), first, the negative electrode heating drum 12 is positioned over a tip of the negative electrode plate NP in the circumferential direction, and pressurizes the tip in the circumferential direction onto the separator S1 with the constant pressing force. In this process, the tip of the negative electrode plate NP is collapsed and deformed by the pressing force.

In the subsequent period, the negative electrode heating drum 12 continues to pressurize the negative electrode plate NP onto the separator S1 with the constant pressing force, to adhere the negative electrode plate NP to the separator S1. As shown in FIG. 24(c), at a rear end of the negative electrode plate NP in the circumferential direction also, the negative electrode heating drum 12 pressurizes the rear end onto the separator S1 with the constant pressing force, and thus, similar to the tip, the rear end also is collapsed and deformed by the pressing force.

As described, when the negative electrode heating drum 12 is pressurized to the bonding drum 18 with the constant pressing force at all times, because the separator S1 is pressurized even in portions where the negative electrode plate NP is not present, damages may be caused in the separator S1, and damages may also be caused at the tip in the circumferential direction and at the rear end in the circumferential direction of the negative electrode plate NP, due to the pressurization. In FIG. 24(c), collapses in the tip in the circumferential direction and the rear end in the circumferential direction are schematically shown as an inclined surface shape.

Figure 25:
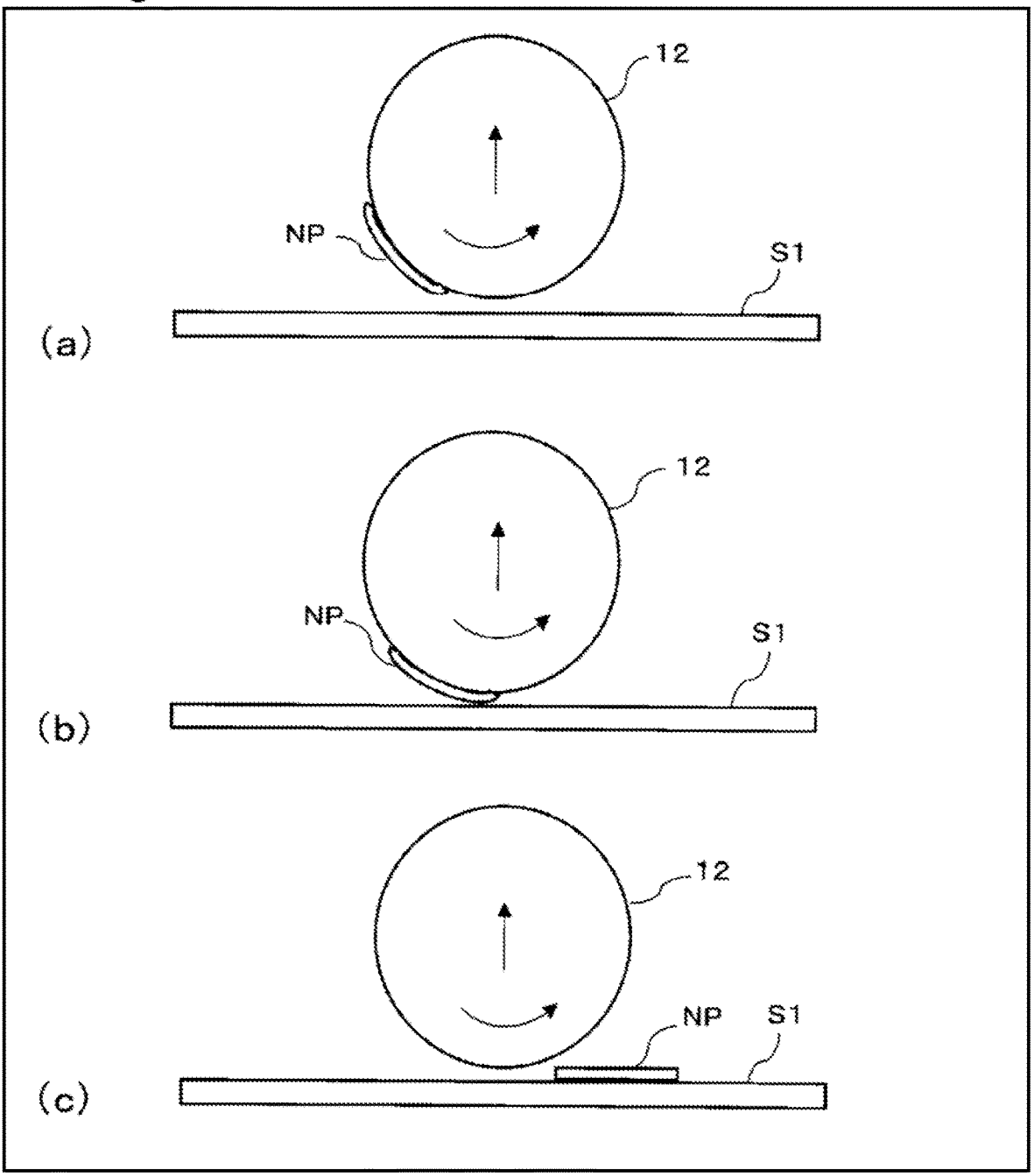
FIG. 25 is an explanatory diagram of adhesion of a negative electrode plate according to an embodiment of the present disclosure.

On the other hand, FIG. 25 shows adhesion of the negative electrode plate NP onto the separator S1 in the present embodiment. Specifically, FIG. 25 shows adhesion of the negative electrode plate NP over the separator S1 with a timing at which the pressing force between the negative electrode heating drum 12 and the bonding drum 18 is reduced or at which the pressing is interrupted. In FIG. 25, the separator S1 is shown in a straight line shape, but in reality, the separator S1 is suctioned and held on the bonding drum 18, and is in a state of an arc shape along an outer shape of the arc shape of the bonding drum 18. In addition, in FIG. 25 also, one negative electrode plate NP is heated on the negative electrode heating drum 12, but a plurality of the negative electrode plates NP may be heated.

In FIG. 25(a), in the negative electrode heating drum 12, the pressing force at the pressing point is restricted in regions where the negative electrode plate NP is not present, so that the negative electrode heating drum 12 is not pressurized against the bonding drum 18 in these regions. The negative electrode plate NP is rotated and transported in this state, and, when the tip in the circumferential direction of the negative electrode plate NP comes in contact with the separator S1, the restriction of the constant pressing force is maintained. Therefore, the tip in the circumferential direction of the negative electrode plate NP is not pressurized.

In FIG. 25(b), when the negative electrode plate NP is further rotated and transported, and the center portion other than the tip in the circumferential direction comes in contact with the separator S1, the negative electrode heating drum 12 is pressurized against the bonding drum 18 with the constant pressing force. With this process, the negative electrode plate NP is adhered to the separator S1.

In FIG. 25(c), when the negative electrode plate NP is further rotated and transported, and the rear end in the circumferential direction comes in contact with the separator S1, the pressing force is restricted, so that the negative electrode heating drum 12 is not pressurized against the bonding drum 18. Therefore, the rear end in the circumferential direction of the negative electrode plate NP is not pressurized.

As described, a configuration is employed in which only the center portion of the negative electrode plate NP is pressurized with the constant pressing force, and, at the ends of the negative electrode plate NP; that is, the tip in the circumferential direction and the rear end in the circumferential direction, the constant pressing force is restricted so that the ends are not pressurized. With this configuration, the damages to the ends of the negative electrode plate NP can be prevented. In addition, by restricting the constant pressing force also in regions where the negative electrode plate NP is not present, the damages to the separator S1 can also be prevented.

The control apparatus reduces the pressing force between the negative electrode heating drum 12 and the bonding drum 18 or interrupts the pressing at the ends of the negative electrode plate NP, separately from the cancelling of the amounts of decentering of the negative electrode heating drum 12 and the bonding drum 18. A mechanism for reducing the pressing force between the negative electrode heating drum 12 and the bonding drum 18 or for interrupting the pressing will now be described with reference to FIGS. 23B and 23C.

Figure 23B:
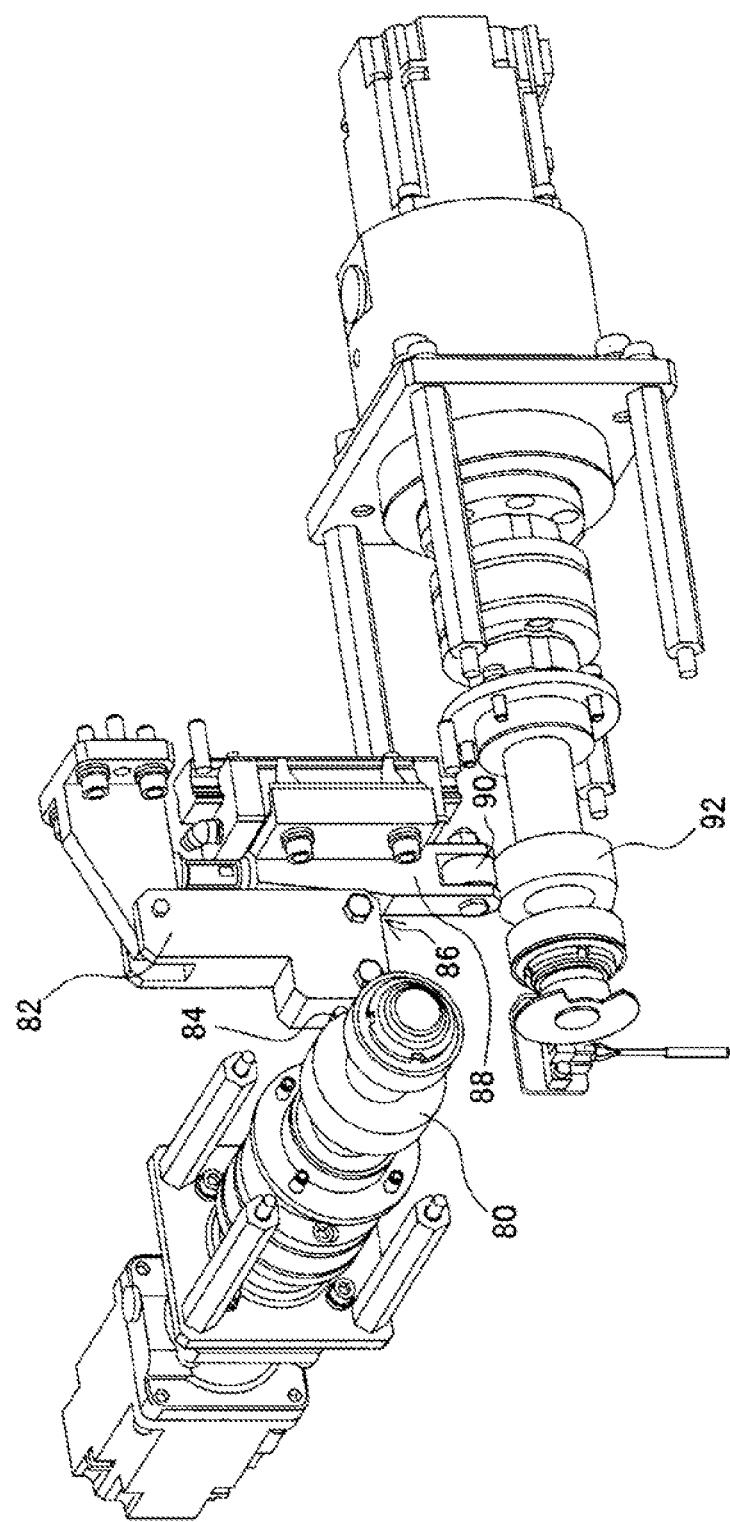
FIG. 23B is a perspective diagram of a pressing force adjusting mechanism according to an embodiment of the present disclosure.
Figure 23C:
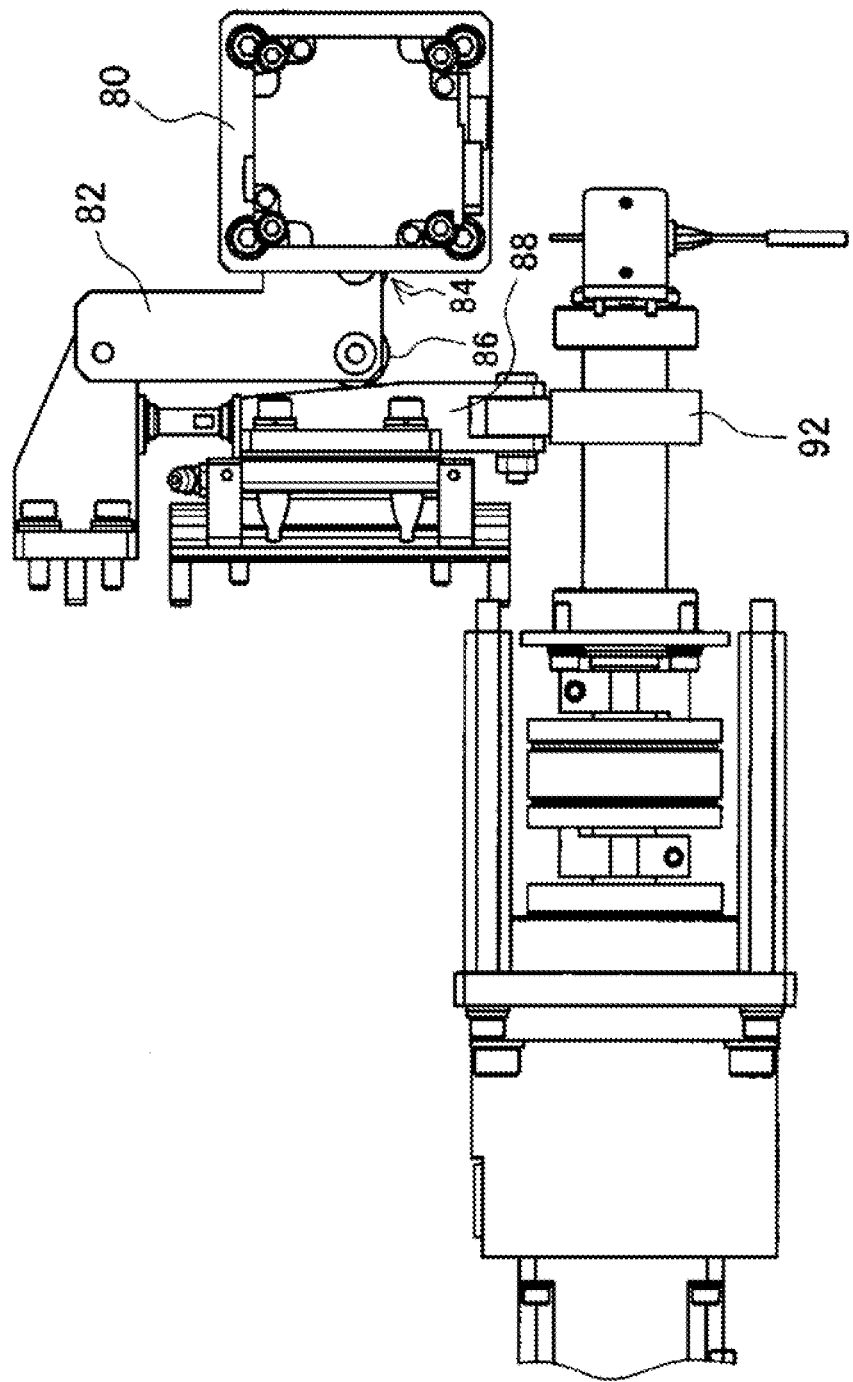
FIG. 23C is a back view of a pressing force adjusting mechanism according to an embodiment of the present disclosure.

FIGS. 23B and 23C are a perspective view and a back view of a pressing force adjusting mechanism. A cam mechanism 80 is provided on a support α of the bonding drum 18. On a support β of the negative electrode heating drum 12, a swing arm 82 is attached as an arm which engages with the cam mechanism 80. The swing arm 82 pivotally supports a roller 84. A surface of the cam mechanism 80 and the roller 84 contact each other. A surface shape of the cam mechanism 80 is a polygon or a shape with a projection at a predetermined interval. The cam mechanism 80 operates such that a corner portion of the polygon or the projection reduces the pressing force between the negative electrode heating drum 12 and the bonding drum 18 or interrupts the pressing. The cam mechanism 80 is driven by a motor which is independent from the driving of the motor 124. With the operation of the cam mechanism 80, a distance between the negative electrode heating drum 12 and the bonding drum 18 is controlled, and the pressing force to the negative electrode plate NP can be reduced or the pressing can be interrupted.

With the driving of the motor 124, the pressing force between the negative electrode heating drum 12 and the bonding drum 18 is maintained at a constant, but a distance between the support β on which the negative electrode heating drum 12 is attached and the support α on which the bonding drum 18 is attached varies. With the variation of the distance, a distance between the cam mechanism 80 and the roller 84 varies, and there may be cases in which the reduction of the pressing force between the negative electrode heating drum 12 and the bonding drum 18 or the interruption of the pressing at a predetermined timing cannot be realized.

In order to maintain the distance between the cam mechanism 80 and the roller 84 at a constant, a roller 86 is provided on the swing arm 82, and an inclination member 88, a roller 90, and a cam mechanism 92 which can be driven independently from the support β of the negative electrode heating drum 12 are provided on the side of the support β. The roller 86 contacts an inclined surface of the inclination member 88. The roller 90 is attached to the inclination member 88, and contacts the cam mechanism 92. With the inclination member 88 moving upward and downward by the cam mechanism 92 which is driven by the motor, the swing arm 82 swings via the roller 86 which is in contact with the inclined surface of the inclination member 88.

With the driving of the motor 124 according to the cancelling waveform, the support β and the inclination member 88 move to the left and to the right. By driving the motor (not shown) which moves the cam mechanism 92 upward and downward, according to the cancelling waveform, the inclined surface of the inclination member 88 can be moved upward and downward, and the variation of the position of the roller 86 can thus be suppressed. With the suppression of the variation of the position of the roller 86, the variation in the distance between the roller 84 and the cam mechanism 80 can consequently be suppressed.

In the above description, a method is described in which the negative electrode plate NP is adhered onto the separator S1 of the band shape by the constant pressing force by the driving of the motor 124, and the damages to the ends of the negative electrode plate NP are suppressed by the driving of the cam mechanism 80. Alternatively, it is also possible to adhere the negative electrode plate NP onto the separator S1 of the band shape with the constant pressing force and to suppress the damages to the ends of the negative electrode plate NP at the same time by driving the motor 124.

A position of the negative electrode plate NP on the negative electrode heating drum 12 and the interval between the negative electrode plates NP can be detected, for example, by a camera placed in proximity to the negative electrode heating drum 12. The control apparatus which monitors and controls the overall production apparatus may receive position data and interval data of the negative electrode plates NP detected by the camera, and may control allowance/restriction of the constant pressing force (or ON/OFF of the constant pressing force) using the received position data and interval data.

This is similarly applicable to the relationship between the positive electrode heating drum 16 and the bonding drum 18. The control apparatus applies a driving using, as a reference, a drive signal waveform for cancelling the amounts of decentering of the positive electrode heating drum 16 and the bonding drum 18 and for pressurizing the positive electrode heating drum 16 against the bonding drum 18 with the constant pressing force, and superposing over the reference waveform a drive signal waveform for restricting the constant pressing force in the ends of the positive electrode plate PP and in regions where the positive electrode plate PP is not present.

Further, the thermocompression bonding roller 19 is a roller for pressurizing and thermally compression-bonding the structure of (the band-shape separator S1)/(the negative electrode plate NP)/(the band-shape separator S2), and the control apparatus may also drive the thermocompression bonding roller with a drive signal waveform for restricting the constant pressing force in the ends of the negative electrode plate NP and in regions where the negative electrode plate NP is not present.

In the description with reference to FIG. 23A, a case has been described in which the drum rotation pivot 122, the motor 124, and the coil spring 120 are provided on the negative electrode heating drum 12, but alternatively, these members may be provided on the side of the bonding drum 18. In FIG. 23A, a state is shown in which the negative electrode heating drum 12 and the bonding drum 18 contact each other, but in other cases, it may be possible that the drum for supplying the positive electrode plate additionally contacts the bonding drum 18. In such cases, the drum rotation pivot, the motor, and the coil spring are desirably provided on the drum for supplying the positive electrode plate and the drum for supplying the negative electrode plate.

Figure 26:
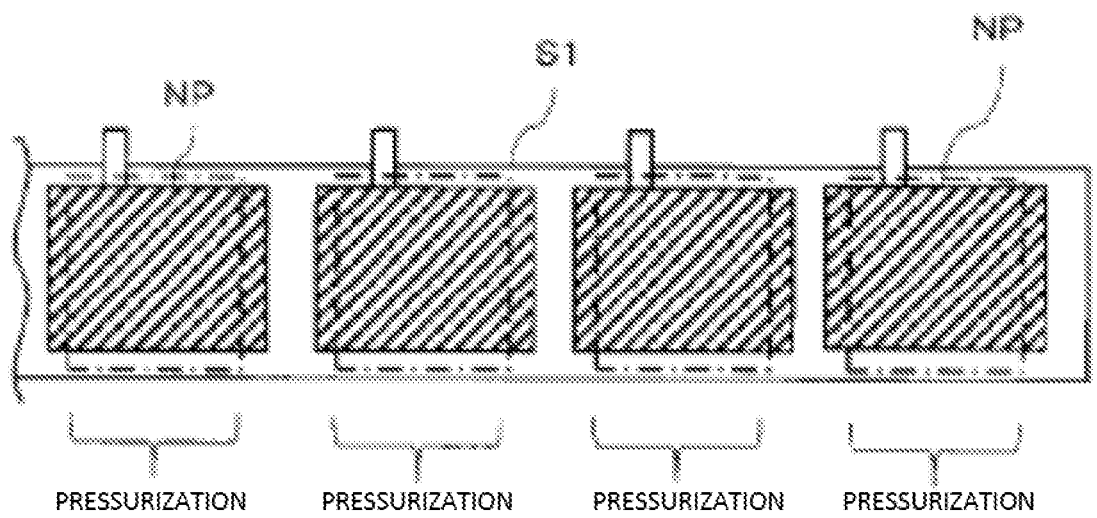
FIG. 26 is an explanatory diagram of a pressing range when a negative electrode plate is adhered, according to an embodiment of the present disclosure.
Figure 27:
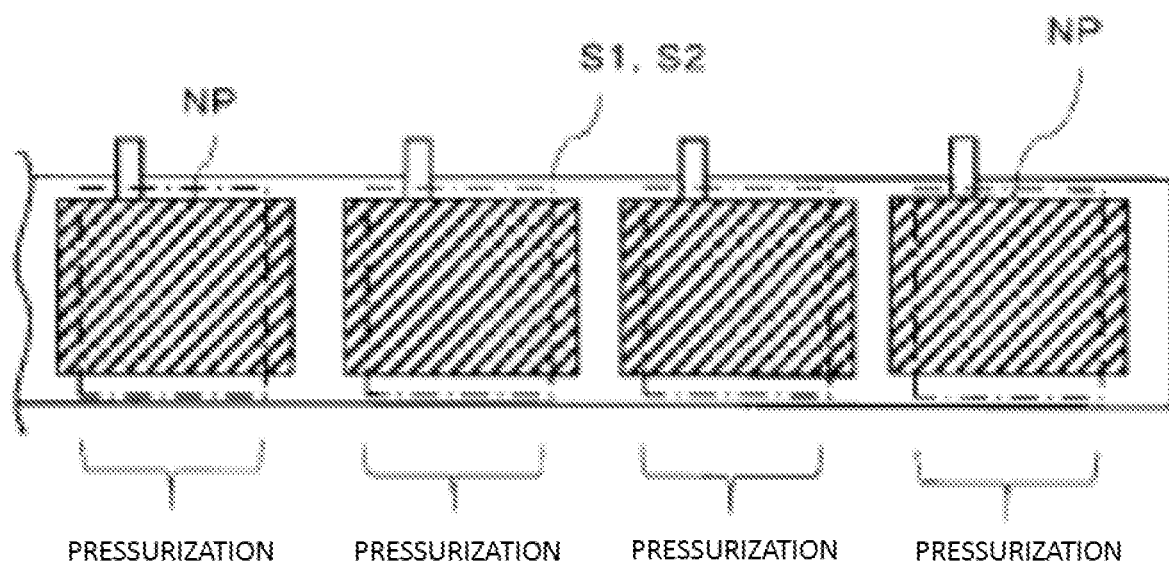
FIG. 27 is an explanatory diagram of a pressing range when a separator S2 is adhered, according to an embodiment of the present disclosure.
Figure 28:
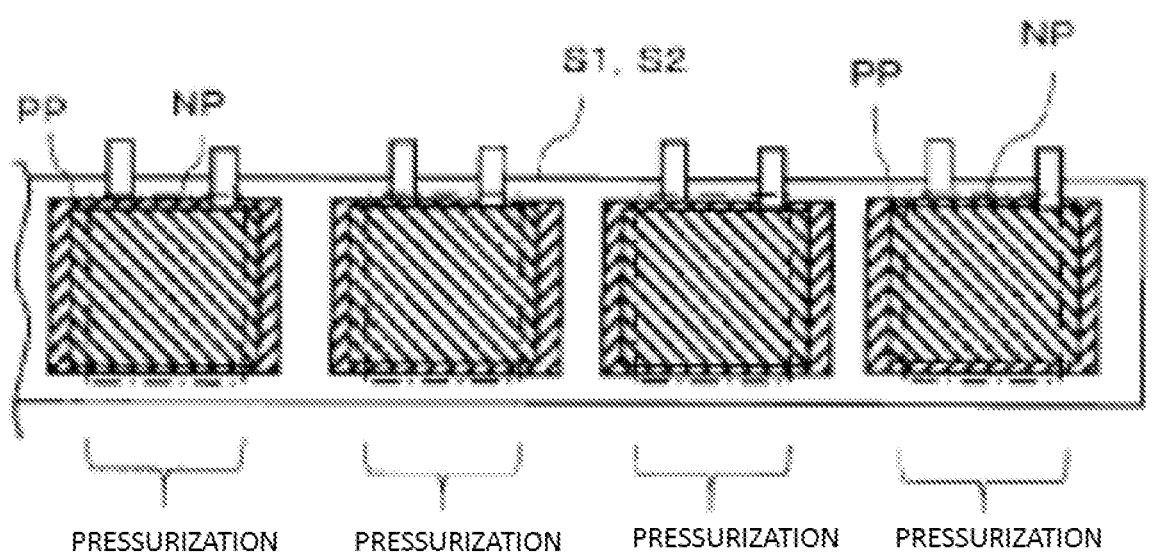
FIG. 28 is an explanatory diagram of a pressing range when a positive electrode plate is adhered, according to an embodiment of the present disclosure.

FIGS. 26 to 28 show pressing ranges at the negative electrode heating drum 12, the thermocompression bonding roller 19, and the positive electrode heating drum 16.

FIG. 26 shows, with a dot-and-chain line, a pressing range when the separator S1 of the band shape and the negative electrode plate NP are adhered by the negative electrode heating drum 12 and the bonding drum 18. Of the negative electrode plate NP, the ends in a longitudinal direction of the separator S1 of the band shape are not pressed, and the other regions are pressed and pressurized. In other words, of four sides of the negative electrode plate NP of the quadrangular shape, two opposing sides; that is, two sides opposing in the longitudinal direction of the separator S1 of the band shape, are not pressed, and two opposing sides in the direction orthogonal to the longitudinal direction are pressed. Of the four sides of the negative electrode plate NP of the quadrangular shape, the two pressed sides are adhered to the separator S1 at the pressed locations, and the two non-pressed sides are not adhered to the separator S1.

FIG. 27 shows, with a dot-and-chain line, a pressing range when the separator S1 of the band shape, the negative electrode plate NP, and the separator S2 of the band shape are adhered by the thermocompression bonding roller 19 and the bonding drum 18. Similar to the case of FIG. 26, of the negative electrode plate NP, the ends in the longitudinal direction of the separators S1 and S2 of the band shape are not pressed, and the other regions are pressed and pressurized. That is, of the four sides of the negative electrode plate NP having the quadrangular shape, two opposing sides; that is, two sides opposing in the longitudinal direction of the separators S1 and S2 of the band shape are not pressed, and two opposing sides in a direction orthogonal to the longitudinal direction are pressed. Of the four sides of the negative electrode plate NP having the quadrangular shape, the two pressed sides are adhered to the separator S2 at the pressed locations, and the two non-pressed sides are not adhered to the separator S1.

FIG. 28 shows, with a dot-and-chain line, a pressing range when the separator S1 of the band shape, the negative electrode plate NP, the separator S2 of the band shape, and the positive electrode plate PP are adhered by the positive electrode heating drum 16 and the bonding drum 18. Of the positive electrode plate PP, ends in the longitudinal direction of the separators S1 and S2 of the band shape are not pressed, and the other regions are pressed and pressurized. That is, of four sides of the positive electrode plate PP of the quadrangular shape, two opposing sides; that is, two sides opposing in the longitudinal direction of the separators S1 and S2 of the band shape are not pressed, and two opposing sides in a direction orthogonal to the longitudinal direction are pressed. Of the four sides of the positive electrode plate PP having the quadrangular shape, the two pressed sides are adhered to the separators S1 and S2 at the pressed locations, and the two non-pressed sides are not adhered to the separators S1 and S2.

Because the size of the positive electrode plate PP is smaller than the size of the negative electrode plate NP, the pressing range in FIG. 28 is smaller than the pressing range in FIG. 26. In this manner, the 3-layer laminated body 30 and the 4-layer laminated body 40 are produced while the pressing ranges are controlled.

Next, a layering process at the laminating drum 22 and the laminating stage 24 will be described in detail.

Figure 29:
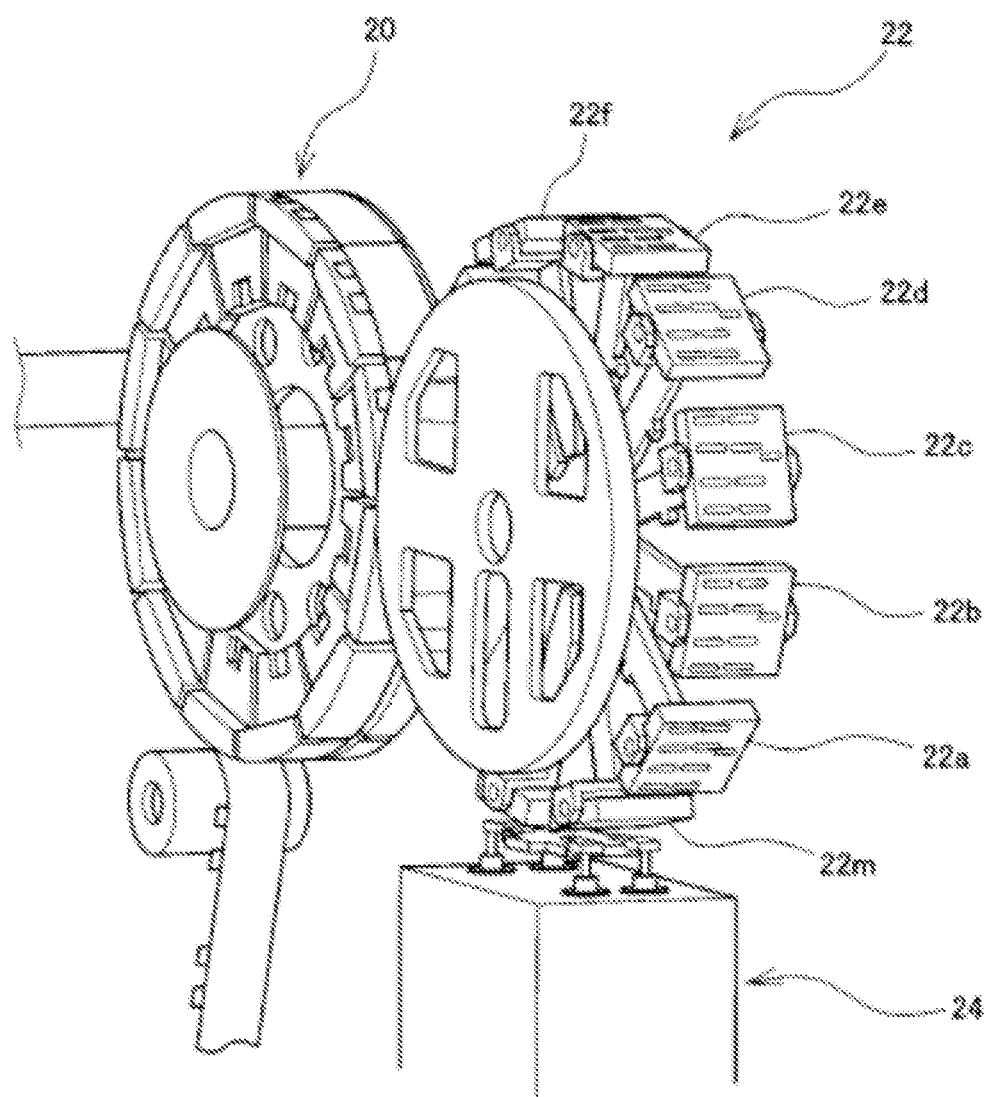
FIG. 29 is a perspective diagram of a structure of a laminating drum according to an embodiment of the present disclosure.

FIG. 29 is a perspective diagram of a structure of the laminating drum 22. The laminating drum 22 is placed in proximity to the separator cutting drum 20, and rotates with a velocity approximately the same as the linear velocity of the separator cutting drum 20. The laminating drum 22 comprises a plurality of laminating heads which rotate around a rotational center of the drum. A number of the laminating heads is arbitrary, and the laminating drum 22 may comprise, for example, 12 laminating heads 22a, 22b, 22c, 22d, 22e, 22f, 22g, 22h, 22i, 22j, 22k, and 22m. Each laminating head comprises an arm (spoke) having one end connected to a drum center shaft (hub), and a holding portion connected to the other end of the spoke. Each laminating head has a vertical cross sectional shape of an approximate T shape by the arm and the holding portion, and a suction holes for suctioning and holding the 3-layer laminated body 30 or the 4-layer laminated body 40 produced by being cut at the separator cutting drum 20 is formed on an outer peripheral surface of the holding portion. The holding portion is connected in a manner to allow swinging in a circumferential direction with respect to the arm.

Each of the plurality of laminating heads 22a to 22m rotates around the center axis of the laminating drum 22, and each individual laminating head is driven in a circumferential direction of the drum and also in a radial direction of the drum, independently from the other laminating heads. That is, the laminating head rotates and transports the 3-layer laminated body 30 or the 4-layer laminated body 40 to the proximate position with the laminating stage 24 while suctioning and holding the 3-layer laminated body 30 or the 4-layer laminated body 40. When the laminating head reaches the proximate position with the laminating stage 24, a relative velocity in the circumferential direction of the drum with respect to the laminating stage 24 is set to zero, and the laminating head moves in the radial direction of the drum, in a direction toward the laminating stage 24. The laminating head which has moved close to the laminating stage 24 causes the 3-layer laminated body 30 or the 4-layer laminated body 40 which is being suctioned and held to contact the laminating stage 24, or, when the 3-layer laminated body 30 or the 4-layer laminated body 40 is already layered over the laminating stage 24, causes the suctioned and held laminated body to contact the laminated body over the laminating stage 24. The suctioning and holding force is switched OFF, and the 3-layer laminated body 30 or the 4-layer laminated body 40 which is suctioned and held is layered. Then, the laminating head moves in the radial direction of the drum, in a direction away from the laminating stage 24.

FIGS. 30 to 33 show basic operations of the laminating heads 22a to 22m. In the following, in the description of the operation of the laminating head, the "radial direction of the drum" and the "radial direction of the laminating drum 22" will also simply be called the "radial direction".

Figure 30:
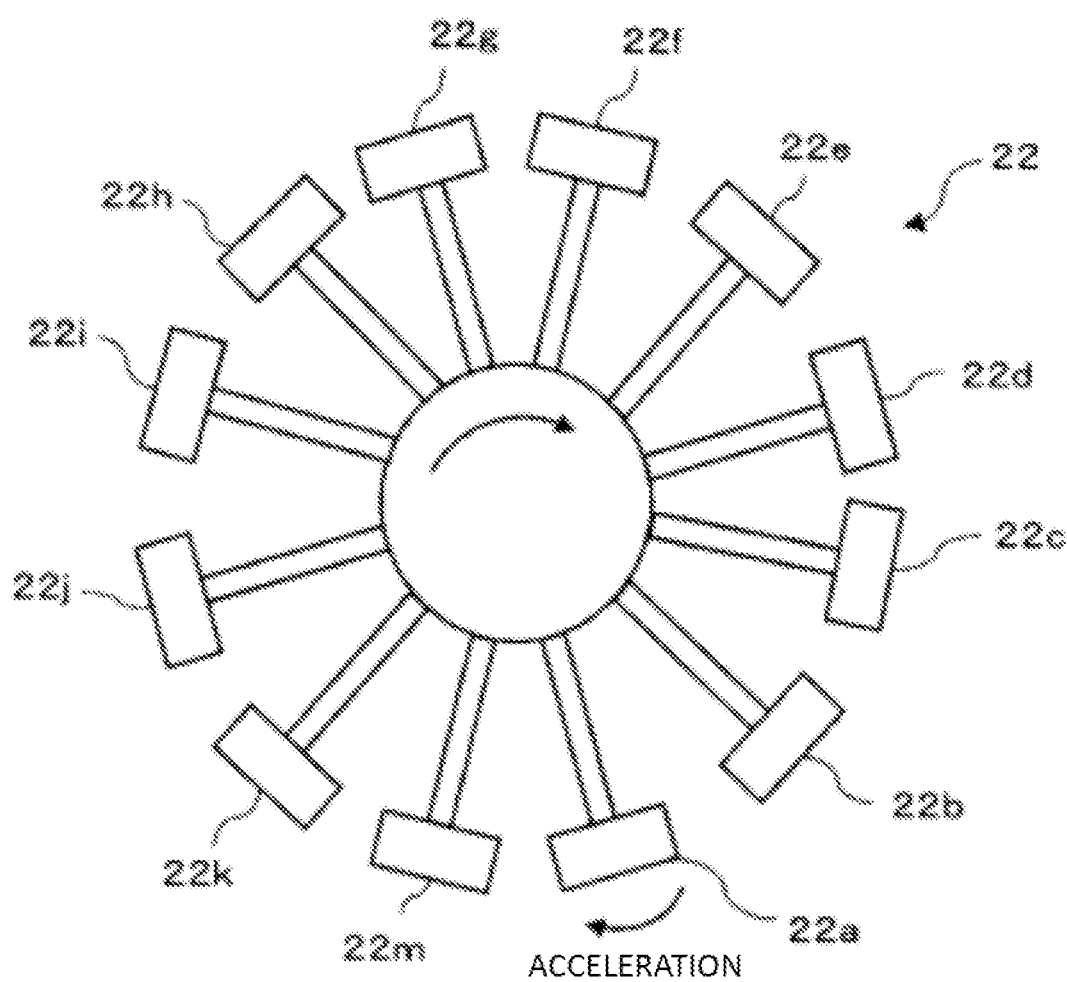
FIG. 30 is an explanatory diagram (part 1) of an operation of a laminating drum according to an embodiment of the present disclosure.

As shown in FIG. 30, the laminating heads 22a to 22m rotate at a constant angular velocity around the rotational center axis of the laminating drum 22, and, when a predetermined position is reached, the velocity of the laminating head is increased in the circumferential direction independently from the other laminating heads. For example, with regard to the laminating head 22a, when the laminating head 22a reaches a predetermined position in the circumferential direction, the velocity of the laminating head 22a increases, and the laminating head 22a moves close to an adjacent laminating head 22m at an upstream side in the rotational direction, and moves away from an adjacent laminating head 22b at a downstream side in the rotational direction.

Figure 31:
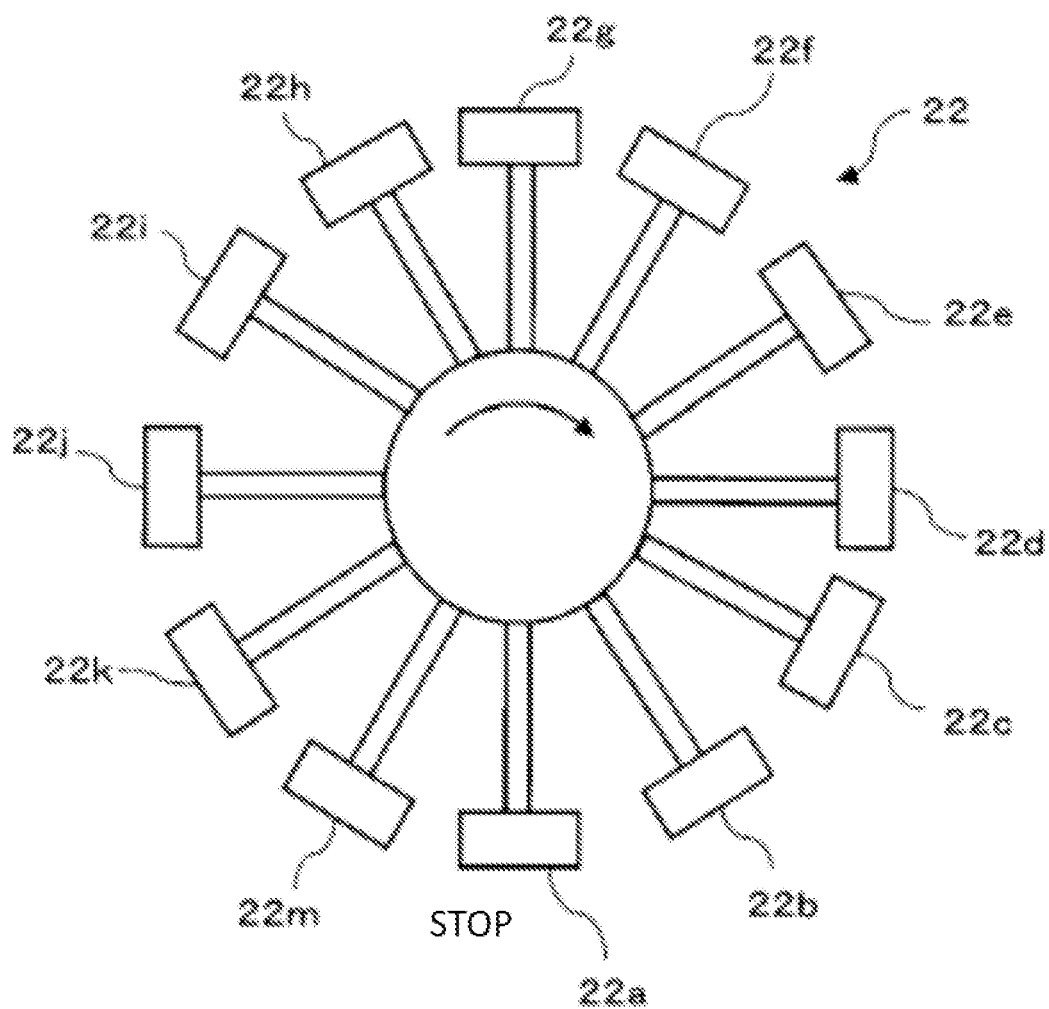
FIG. 31 is an explanatory diagram (part 2) of an operation of a laminating drum according to an embodiment of the present disclosure.

After the velocity increase, when the laminating head 22a reaches the proximate position with the laminating stage 24 as shown in FIG. 31, a relative velocity of the laminating head 22a in the circumferential direction of the drum with respect to the laminating stage 24 is set to zero. At the proximate position, the 3-layer laminated body 30 or the 4-layer laminated body 40 which has been suctioned and held on the outer peripheral surface is layered over the laminating stage 24. More specifically, when the laminating head 22a moves close to the proximate position with the laminating stage 24, the laminating head 22a swings to an angle where the outer peripheral surface of the holding portion of the laminating head 22a is approximately parallel to a stage surface of the laminating stage 24, and, while the state in which the outer peripheral surface of the holding portion is approximately parallel to the stage surface of the laminating stage 24 is maintained, the arm moves in the radial direction. With this process, the laminating head 22a moves in the direction of the laminating stage 24, the outer peripheral surface of the holding portion is moved closer to the stage surface of the laminating stage 24, and the 3-layer laminated body 30 or the 4-layer laminated body 40 which has been suctioned and held on the outer peripheral surface is layered over the laminating stage 24.

Figure 32:
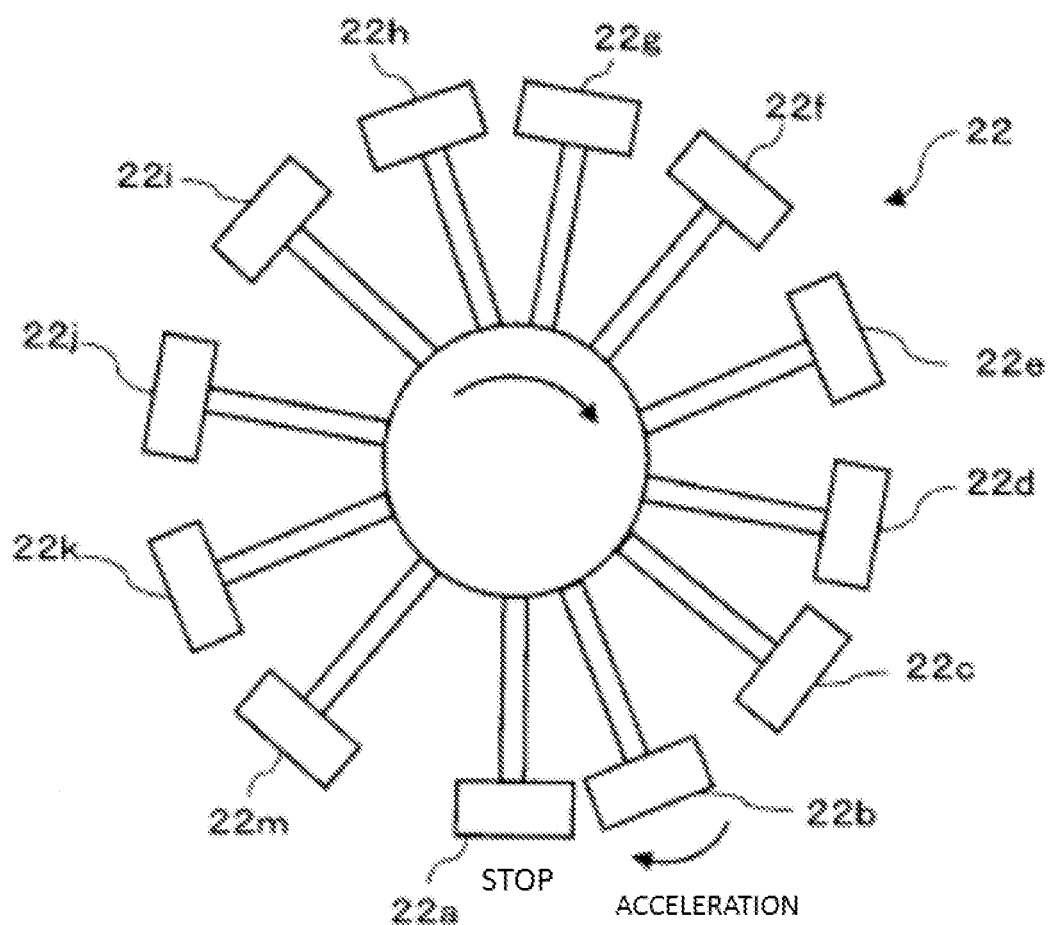
FIG. 32 is an explanatory diagram (part 3) of an operation of a laminating drum according to an embodiment of the present disclosure.
Figure 33:
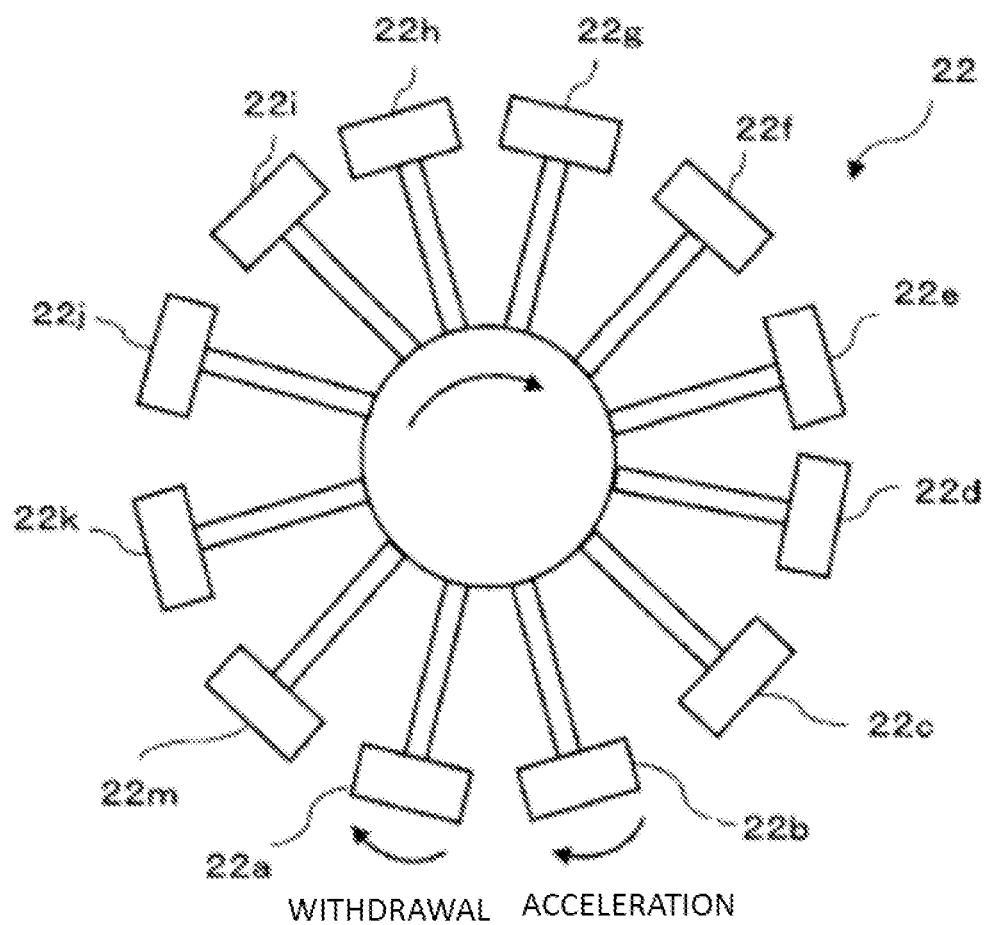
FIG. 33 is an explanatory diagram (part 4) of an operation of a laminating drum according to an embodiment of the present disclosure.

FIGS. 32 and 33 show states after the 3-layer laminated body 30 or the 4-layer laminated body 40 is layered over the laminating stage 24. Because the laminating head 22b adjacent to the laminating head 22a at the downstream side in the rotational direction reaches the predetermined position, the velocity thereof increases, and the laminating head 22b moves closer to the laminating head 22a. After the laminating head 22a layers the 3-layer laminated body 30 or the 4-layer laminated body 40 over the laminating stage 24, the laminating head 22a rotates in the circumferential direction, to retract from the proximate position with the laminating stage 24. More specifically, in the laminating head 22a, the arm moves in the radial direction so that the outer peripheral surface moves in a direction away from the proximate position with the stage surface of the laminating stage 24, and the laminating head 22a moves and retracts in the rotational direction so as to not interfere with the laminating head 22b. After the retraction from the proximate position, the outer peripheral surface of the holding portion swings in a reverse direction, and returns to the original state.

Figure 34:
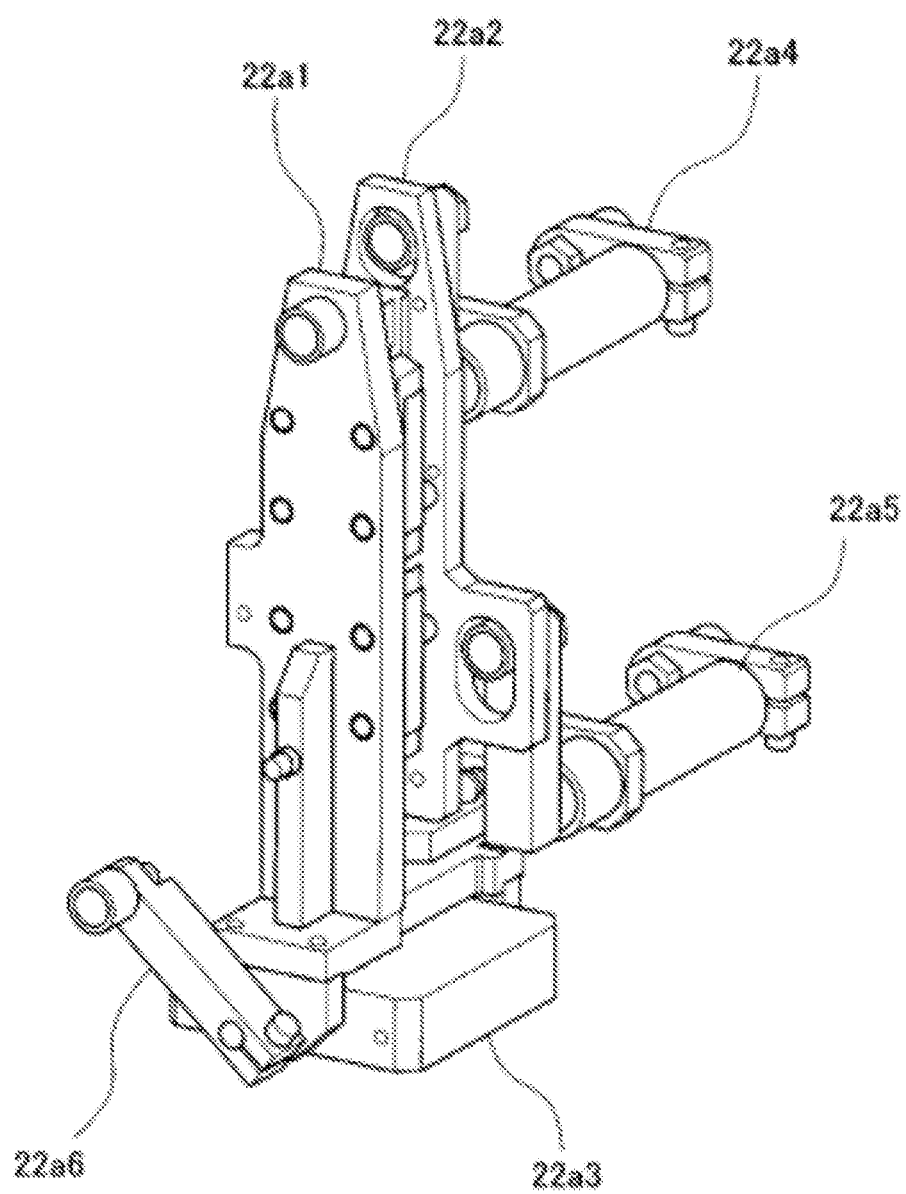
FIG. 34 is a perspective diagram of a structure of a laminating head according to an embodiment of the present disclosure.

FIG. 34 shows an example of a specific structure of the laminating head 22a. The structure is similarly applicable to the other laminating heads 22b to 22m.

The laminating head 22a comprises two arms 22a1 and 22a2, and a holding portion 22a3. The arms 22a1 and 22a2 extend in parallel to the radial direction of the laminating drum 22. The arms 22a1 and 22a2 are rotationally driven as an integral element in the circumferential direction of the drum by a cam mechanism 22a4, and are swing-driven in the circumferential direction by a cam mechanism 22a5. At ends in the radial direction of the arms 22a1 and 22a2, an outer peripheral surface 22a3 is provided in a manner to allow swinging. The outer peripheral surface 22a3 rotates with the rotation in the circumferential direction of the arms 22a1 and 22a2, and swings and moves with the swinging and movement in the radial direction of the arms 22a1 and 22a2. Further, the outer peripheral surface 22a3 swings with respect to the arms 22a1 and 22a2 by a cam mechanism 22a6.

Figure 35:
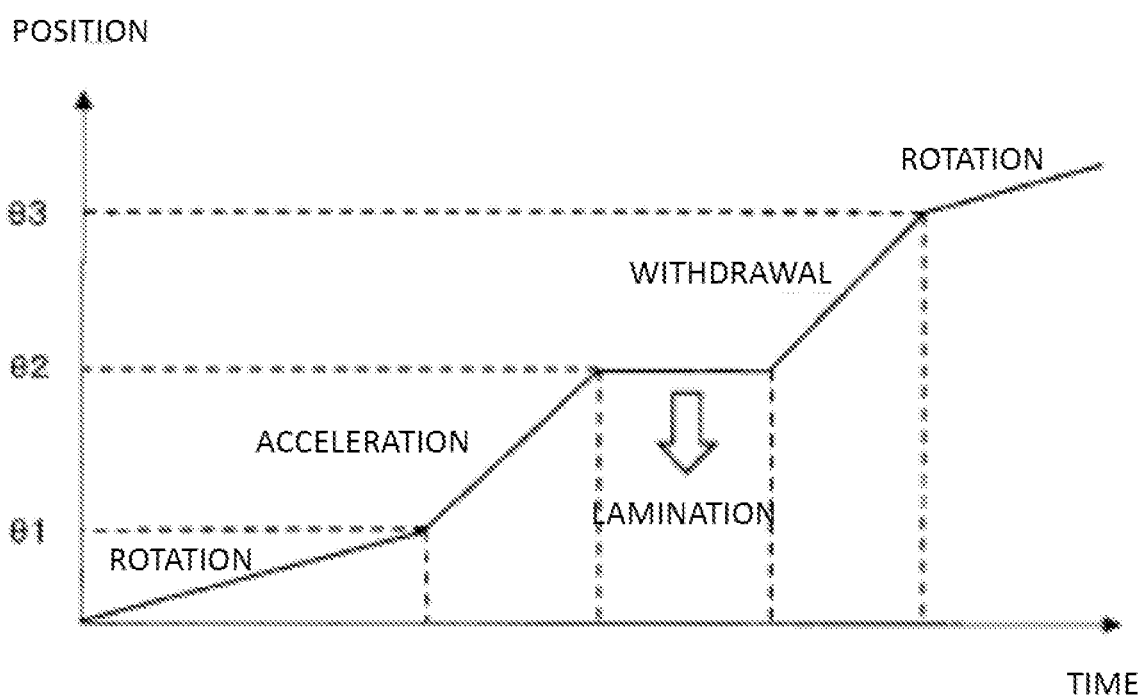
FIG. 35 is a diagram of a graph showing a change of a position of a laminating head according to an embodiment of the present disclosure.

FIG. 35 shows a change with respect to time of a position of the laminating head 22a. In the figure, a horizontal axis represents time, and a vertical axis represents a position (angle) in the circumferential direction of the drum.

From a certain reference position to a position $\theta 1$, the laminating head 22a rotates with a constant angular velocity. The outer peripheral surface 22a3 rotates while suctioning and holding the 3-layer laminated body 30 or the 4-layer laminated body 40.

Then, when the predetermined position $\theta 1$ is reached, the velocity of the laminating head 22a in the circumferential direction is increased, and the velocity of the outer peripheral surface 22a3 is also increased. During this period, the adjacent laminating head 22b at the downstream in the rotational direction continues to rotate at the constant angular velocity, and thus, a separation distance between the laminating head 22a and the laminating head 22b is increased. With the velocity increase, the laminating head 22a creates and secures a stopping time at the proximate position with the laminating stage 24; that is, a layering time of the 3-layer laminated body 30 or the 4-layer laminated body 40 over the laminating stage 24. In addition, during the velocity increase, the outer peripheral surface 22a3 swings with respect to the arms 22a1 and 22a2, and inclines such that the surface on which the 3-layer laminated body 30 or the 4-layer laminated body 40 is suctioned and held is approximately parallel to the stage surface of the laminating stage 24.

Then, when the proximate position $\theta 2$ with the laminating stage 24 is reached, the laminating head 22a stops at this position (a deceleration control is executed until the stopping, but this control will not be described herein), the arms 22a1 and 22a2 are moved in the radial direction so that the outer peripheral surface is moved closer to the stage surface of the laminating stage 24, the suctioning force of the outer circumferential force is switched OFF, and the 3-layer laminated body 30 or the 4-layer laminated body 40 is layered over the laminating stage 24. In this process, with claws provided on the laminating stage 24, corners of the 3-layer laminated body 30 or the 4-layer laminated body 40 supplied from the laminating head 22a are pressurized and the laminated body is held. Motions of the claws of the laminating stage 24 linked with the motion of the laminating head 22a will be described later.

After the 3-layer laminated body 30 or the 4-layer laminated body 40 is layered, the velocity of the laminating head 22a is increased and the laminating head 22a rotates, for retraction, until a predetermined position $\theta 3$ is reached. During the retraction, the outer peripheral surface 22a3 swings with respect to the arms 22a1 and 22a2, to incline the surface on which the 3-layer laminated body 30 or the 4-layer laminated body 40 is suctioned and held, to return the surface to the initial angle.

When the predetermined position $\theta 3$ is reached, the laminating head 22a again rotates at the constant angular velocity until the predetermined position $\theta 1$ is again reached. During this period, the laminating head 22a receives from the separator cutting drum 20 a new 3-layer laminated body 30 or a new 4-layer laminated body 40, suctions and holds the laminated body on the outer peripheral surface 22a3, and reaches the predetermined position $\theta 1$.

Next, an operation of the laminating stage 24 will be described in detail.

Figure 36:
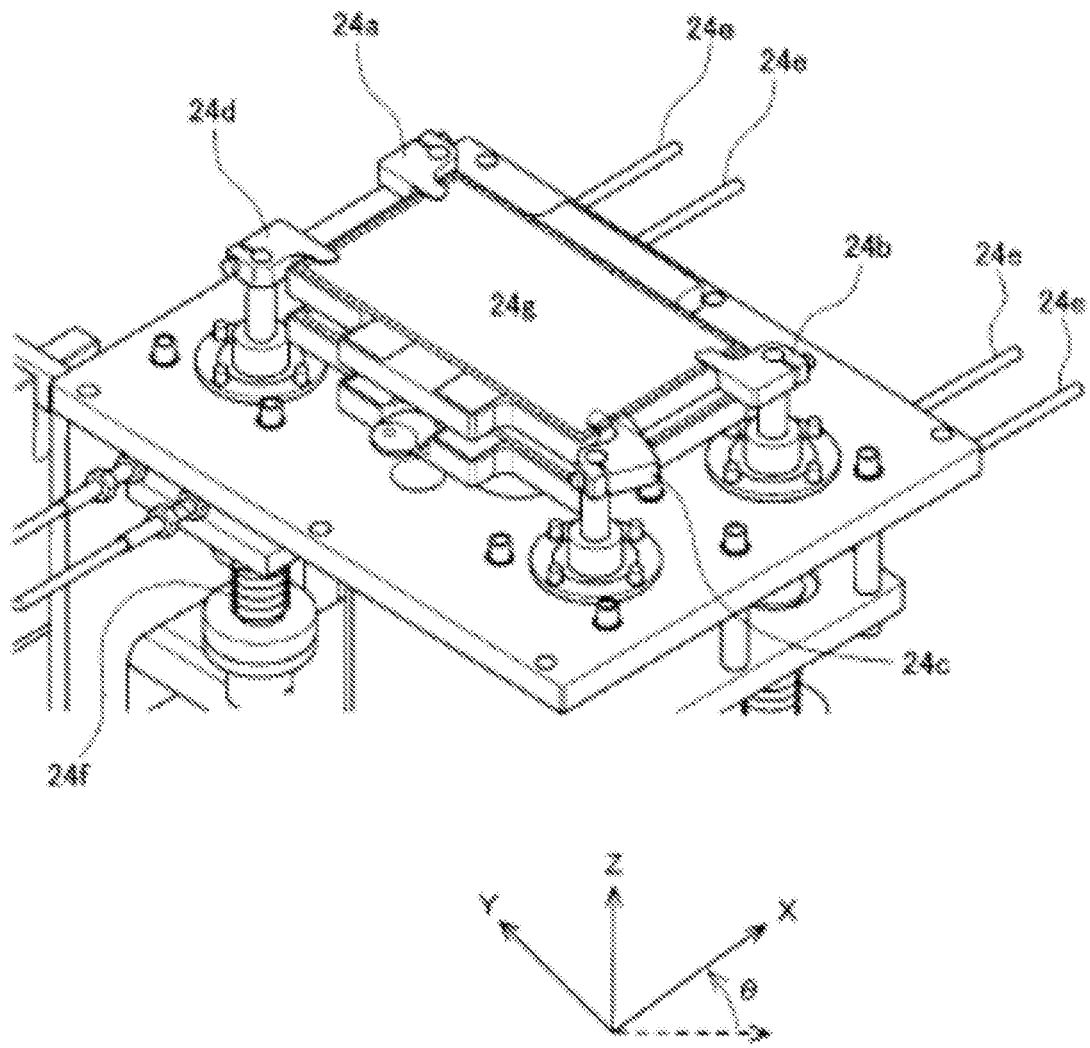
FIG. 36 is a perspective diagram of a structure of a laminating stage according to an embodiment of the present disclosure.

FIG. 36 is a perspective diagram of a structure of the laminating stage 24. The laminating stage 24 is placed at a position immediately below the laminating drum 22. The laminating stage 24 comprises a stage surface 24g over which the 3-layer laminated body 30 and the 4-layer laminated body 40 are layered, and claws 24a to 24d which pressurize, from above, the 3-layer laminated body 30 and the 4-layer laminated body 40 layered over the stage surface 24g, and hold the laminated body.

The stage surface 24g has an outer shape of a quadrangular shape corresponding to the quadrangular shape of the 3-layer laminated body 30 and the 4-layer laminated body 40, and is placed in an approximate horizontal plane. The 3-layer laminated body 30 or the 4-layer laminated body 40 suctioned and held on the outer peripheral surface of each of the laminating heads 22a to 22m of the laminating drum 22 is positioned and placed on the stage surface 24g of the quadrangular shape, and layered. Specifically, when two axes orthogonal in the horizontal plane are an X-axis and a Y-axis, and a rotational direction of the X-axis with reference to a certain direction in the horizontal plane is a $\theta$ direction, the stage surface 24g is driven in X-axis and Y-axis directions, and is driven in the $\theta$ direction. That is, the stage surface 24g is driven to move and rotate within the horizontal plane, to be positioned corresponding to the suctioning and holding orientation of the 3-layer laminated body 30 or the 4-layer laminated body 40 suctioned and held on the outer peripheral surface of each of the laminating heads 22a to 22m of the laminating drum 22. An order of layering is such that, for example, first, the 3-layer laminated body 30 is placed over the stage surface 24g, then, the 4-layer laminated body 40 is layered over the 3-layer laminated body 30, and then, a new 4-layer laminated body 40 is layered over the 4-layer laminated body 40 which is already layered.

The claws 24a to 24d are placed respectively at four corners of the stage surface 24g of the quadrangular shape. Each of the claws 24a to 24d has a planar shape of an approximate L shape, is supported in a manner to allow swinging in the $\theta$ direction around an axis, and is supported in a movable manner in a vertical direction (hereinafter, this direction will also be referred to as a vertically upward direction or a vertically downward direction). A drive source of the claws 24a to 24d may be equipped on the laminating stage 24 similar to a drive source for driving and positioning the stage surface 24g in the X-Y directions and the $\theta$ direction, or may be equipped outside of the laminating stage 24, in order to reduce a weight of the laminating stage 24. When the drive source for the claws 24a to 24d is equipped outside of the laminating stage 24, the external drive source and the claws 24a to 24d are connected to each other by a wire 24e via a cam mechanism, and drive forces from the external drive source are transmitted by the wire 24e to drive the claws 24a to 24d to swing and to move upward and downward. The claws 24a to 24d are pressed in the vertically downward direction by a spring 24f, and the 3-layer laminated body 30 and the 4-layer laminated body 40 over the stage surface 24g are pressurized and held by the pressing force.

Figure 37:
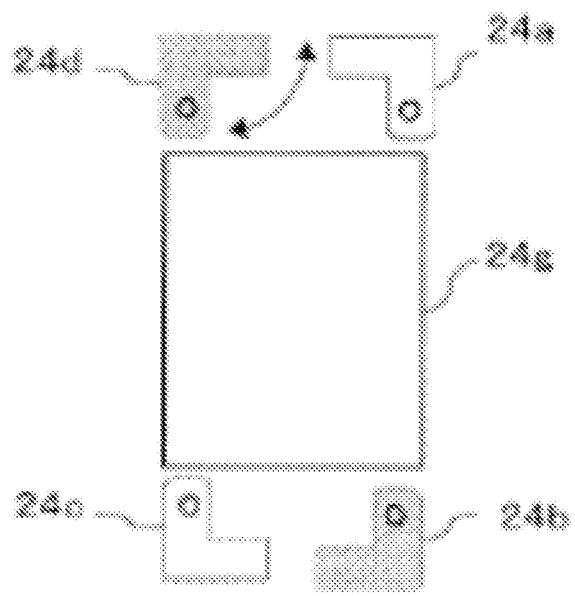
FIG. 37 is a diagram showing a claw placement on a laminating stage according to an embodiment of the present disclosure.

FIG. 37 shows a planar placement of the stage surface 24g and the claws 24a to 24d of the laminating stage 24. When the stage surface 24g has a rectangular shape, the claws 24a to 24d are placed at the four corners of the rectangular shape. The claw 24a and the claw 24c are placed on a diagonal line of the stage surface 24g, and the claw 24b and the claw 24d are placed on the other diagonal line of the stage surface 24g. The claws 24a and 24c are a pair, and form a first claw pair, and the claws 24b and 24d are a pair, and form a second claw pair. Each of the claws 24a to 24d can swing (rotatable) clockwise and counterclockwise around a rotating shaft. With regard to the claw 24d, the claw 24d is placed at an upper left corner of the stage surface 24g, and an axis thereof is positioned in a region defined by extended lines of two opposing long sides of the stage surface 24g. At an initial position, the claw 24d is retracted to an outside of a region of presence of the stage surface 24g (retracted position). By swinging clockwise, a part of the claw 24d is positioned within the region of presence of the stage surface 24g, and the claw 24d pressurizes the laminated body (the 3-layer laminated body 30 and the 4-layer laminated body 40) layered over the stage surface 24g, at a pressurization position. With regard to the claw 24a, the claw 24a is placed at an upper right corner of the stage surface 24g, and an axis thereof is positioned within a region defined by extended lines of two opposing long sides of the stage surface 24g. At an initial position, the claw 24a is retracted to an outside of the region of presence of the stage surface 24g (retracted position). By swinging counterclockwise, a part of the claw 24a is positioned within the region of presence of the stage surface 24g, and the claw 24a pressurizes and holds the laminated body layered over the stage surface 24g. The claw 24b operates in a manner similar to the claw 24d, and the claw 24c operates in a manner similar to the claw 24a.

When the laminated body is pressurized and held, the claws 24a and 24c, and the claws 24b and 24d positioned on the diagonal lines of the stage surface 24g respectively swing as a pair in the horizontal plane, and move upward and downward. Specifically, the first claw pair of the claws 24a and 24c swings, and pressurizes and holds the laminated body, but, at this point, the second claw pair of the claws 24b and 24d is pressurizing and holding a laminated body which is already layered, and, thus, the second claw pair does not hold the laminated body which is newly layered. Then, when a new laminated body is layered next, the second claw pair of the claws 24b and 24d swings, retracts from the stage surface 24g, moves upward, again swings, and pressurizes and holds the laminated body which is newly layered.

Figure 38:
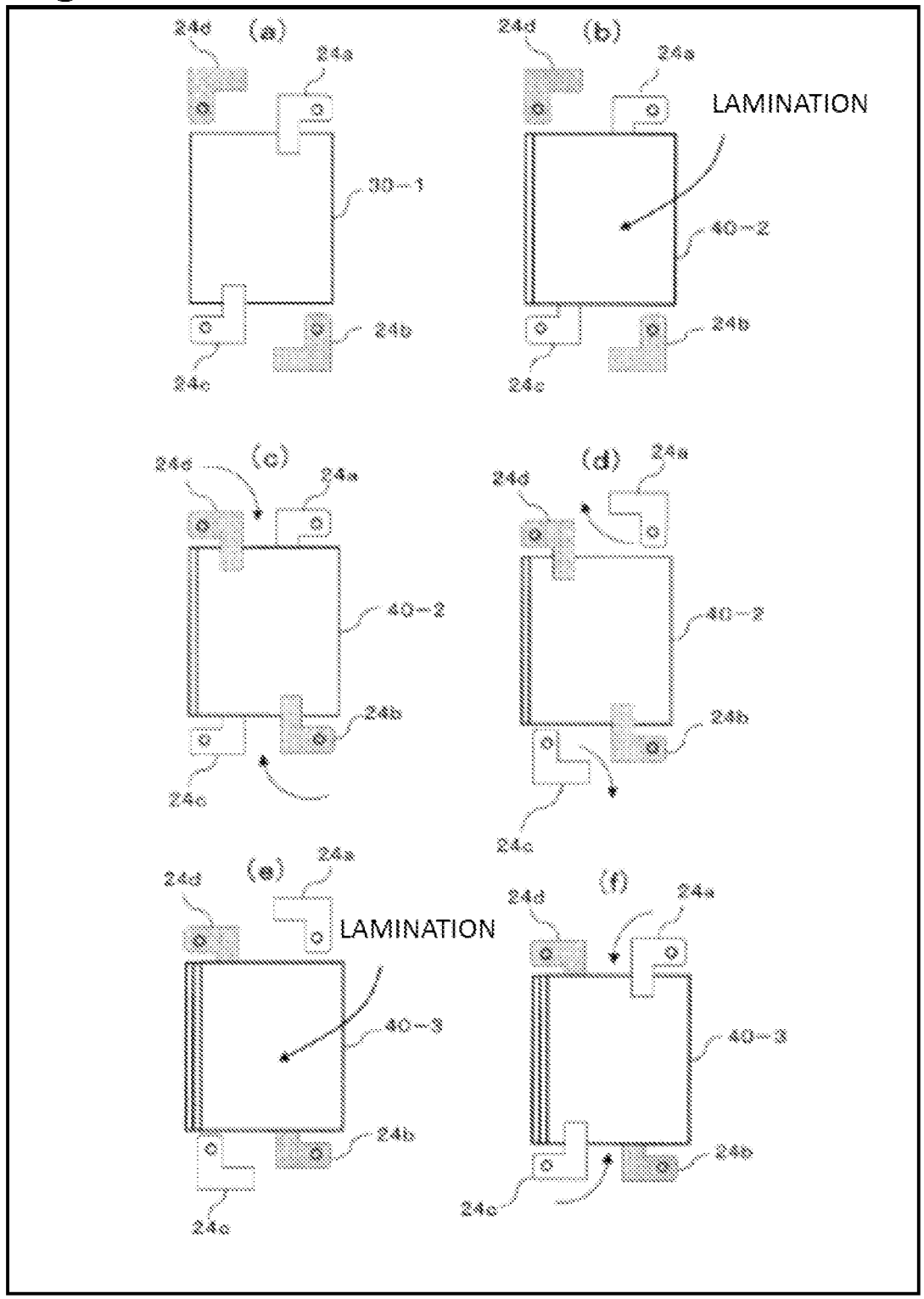
FIG. 38 is an explanatory diagram of an operation of a claw on a laminating stage according to an embodiment of the present disclosure.

FIG. 38 shows an operation of the pressurization and holding of the laminated body by the claws 24a to 24d.

FIG. 38(a) shows a state in which a 3-layer laminated body 30-1 layered over the stage surface 24g is pressurized and held. When the first 3-layer laminated body 30-1 is layered over the stage surface 24g, the claws 24a and 24c swing counterclockwise and are placed over the 3-layer laminated body 30-1. The claws 24a and 24c pressurize, from above, the 3-layer laminated body 30-1 in the vertically downward direction by a pressing force of the spring 24f, and hold the 3-layer laminated body 30-1.

FIG. 38(b) shows a state in which, from the state of FIG. 38(a), a 4-layer laminated body 40-2 is newly layered over the 3-layer laminated body 30-1. Because the 4-layer laminated body 40-2 is layered from above the claws 24a and 24c pressurizing and holding the 3-layer laminated body 30-1, the 4-layer laminated body 40-2 is layered covering a part of the claws 24a and 24c.

FIG. 38(c) shows a state in which the 4-layer laminated body 40-2 is pressurized and held. While the claws 24a and 24c pressurize and hold the 3-layer laminated body 30-1, the claws 24b and 24d move in the vertically upward direction, and further swing clockwise, so that the claws 24b and 24d are placed over the 4-layer laminated body 40-2. The claws 24b and 24d pressurize the 4-layer laminated body 40-2 from above the laminated body in the vertically downward direction by a pressing force of the spring 24f, and hold the laminated body.

FIG. 38(d) shows a state in which, from the state of FIG. 38(c), the claws 24a and 24c are retracted. After the 4-layer laminated body 40-2 is pressurized and held by the claws 24b and 24d, it becomes no longer necessary to pressurize and hold the 3-layer laminated body 30-1 with the claws 24a and 24c, and the claws 24a and 24c must be retracted from the stage surface 24g in order to not become an obstruction of the laminated body to be newly layered next. Thus, the claws 24a and 24c are moved in the vertically upward direction, and are swung clockwise, to retract the claws 24a and 24c from the stage surface 24g. During this process, because the 3-layer laminated body 30-1 and the 4-layer laminated body 40-2 are being pressurized and held by the claws 24b and 24d, the layering positions thereof are not shifted due to the swinging of the claws 24a and 24c.

FIG. 38(e) shows a state in which, from the state of FIG. 38(d), a next laminated body 40-3 is newly layered over the 4-layer laminated body 40-2. Because the 4-layer laminated body 40-3 is layered from above the claws 24b and 24d pressurizing and holding the 4-layer laminated body 40-2, the 4-layer laminated body 40-3 is layered covering a part of the claws 24b and 24d.

FIG. 38(f) shows a state in which the 4-layer laminated body 40-3 is pressurized and held. While the 4-layer laminated body 40-2 is being pressurized and held by the claws 24b and 24d, the claws 24a and 24c move in the vertically upward direction and swing counterclockwise, so that the claws 24a and 24c are positioned over the 4-layer laminated body 40-3. The claws 24a and 24c pressurize and hold the 4-layer laminated body 40-3 from above the laminated body in the vertically downward direction by a pressing force of the spring 24f By repeating the above-described operations, the 4-layer laminated bodies 40-2, 40-3, . . . , are sequentially layered over the 3-layer laminated body 30-1.

In the present embodiment, the claws 24a to 24d and the axes thereof are placed in a region defined by extended lines of two opposing long sides of the stage surface 24g, as shown in FIG. 37, but the present embodiment is not limited to such a configuration. Alternatively, the claws 24a to 24d and the axes thereof may be placed outside of the region defined by the extended lines of the two opposing long sides of the stage surface 24g. A region inside the region defined by the extended lines of the two opposing long sides of the stage surface 24g is also a region including the stage surface 24g. A region outside of the region defined by the extended lines of the two opposing long sides of the stage surface 24g is a region which does not include the stage surface 24g.

Figure 39:
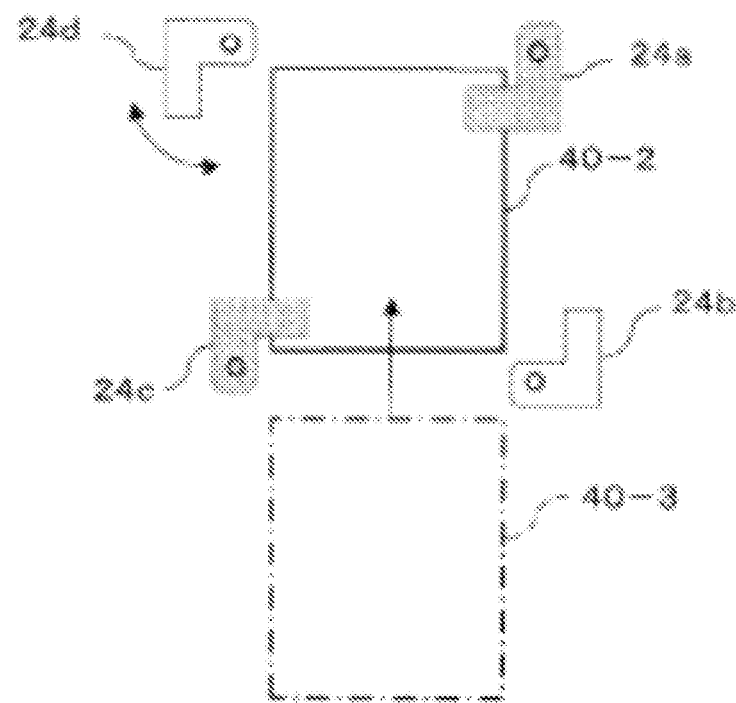
FIG. 39 is a plan view showing another claw placement on a laminating stage according to an embodiment of the present disclosure.

FIG. 39 is a plan view when the axes of the claws 24a to 24d are placed outside of the region defined by the extended lines of the two opposing long sides of the stage surface 24g. With regard to the claw 24d, the claw 24d is placed at the upper left corner of the stage surface 24g, and the axis thereof is positioned outside of the region defined by the extended lines of the two opposing long sides of the stage surface 24g. It should be noted that the position of the claw 24d in FIG. 37 and the position of the claw 24d in FIG. 39 differ from each other. This is similarly applicable to the other claws 24a to 24c. In FIG. 39, the axes of the claws 24a to 24d are positioned outside of a region defined by extended lines of two opposing short sides of the stage surface 24g. A region outside the region defined by the extended lines of the two opposing short sides of the stage surface 24g is a region which does not include the stage surface 24g.

When the axes of the claws 24a to 24d are placed outside of the region defined by the extended lines of the two opposing long sides of the stage surface 24g, when the laminated bodiesuctioned and held on the outer peripheral surface of each of the laminating heads 22a to 22m of the laminating drum 22 is layered over the stage surface 24g, the laminated body does not enter the stage surface 24g from immediately above the stage surface 24g, but rather, the laminated body enters the stage surface 24g from a slanted upward direction because the outer peripheral surface moves along the circumference. When a radius of the laminating drum 22 is sufficiently large relative to a size of the stage surface 24g, this configuration is approximately equivalent to a configuration in which the laminated body enters the stage surface 24g from a lateral direction.

FIG. 39 schematically shows such entrance of the laminated body from the lateral direction of the stage surface 24g. The 4-layer laminated body 40-2 is layered over the stage surface 24g, and is pressurized and held by the claws 24a and 24c. When the next 4-layer laminated body 40-3 is newly layered, the 4-layer laminated body 40-3 suctioned and held on the outer peripheral surface of the laminating drum 22 enters from a lateral direction (in the figure, from below) the stage surface 24g. The axes of the claws 24b and 24d are placed outside of the region defined by the extended lines of the two opposing long sides of the stage surface 24g. Even when the claws 24b and 24d move in the vertically upward direction and swing, to be positioned over the stage surface 24g, the claws 24b and 24d do not collide with the next 4-layer laminated body 40-3 which enters from the lateral direction. Thus, the claws 24b and 24d do not become an obstacle for the 4-layer laminated body 40-3. Therefore, it is not necessary to retract the claws 24b and 24d to the region (retracted position) outside of the region of presence of the stage surface 24g, when the 4-layer laminated body 40-3 is layered. The claws 24b and 24d may be positioned over the stage surface 24g (waiting position) and may be allowed to wait, and, after the 4-layer laminated body 40-3 is layered over the 4-layer laminated body 40-2, the claws 24b and 24d can quickly pressurize and hold the 4-layer laminated body 40-3 by the pressing force of the spring 24f.

FIGS. 40 to 44 show in more detail operations of the claws 24a to 24d of the laminating stage 24 in a linked manner with the motions of the laminating heads 22a to 22m. In the figures, a motion of the laminating head 22a among the laminating heads 22a to 22m is exemplified, but the motion is similarly applicable to the other laminating heads 22b to 22m.

Figure 40:
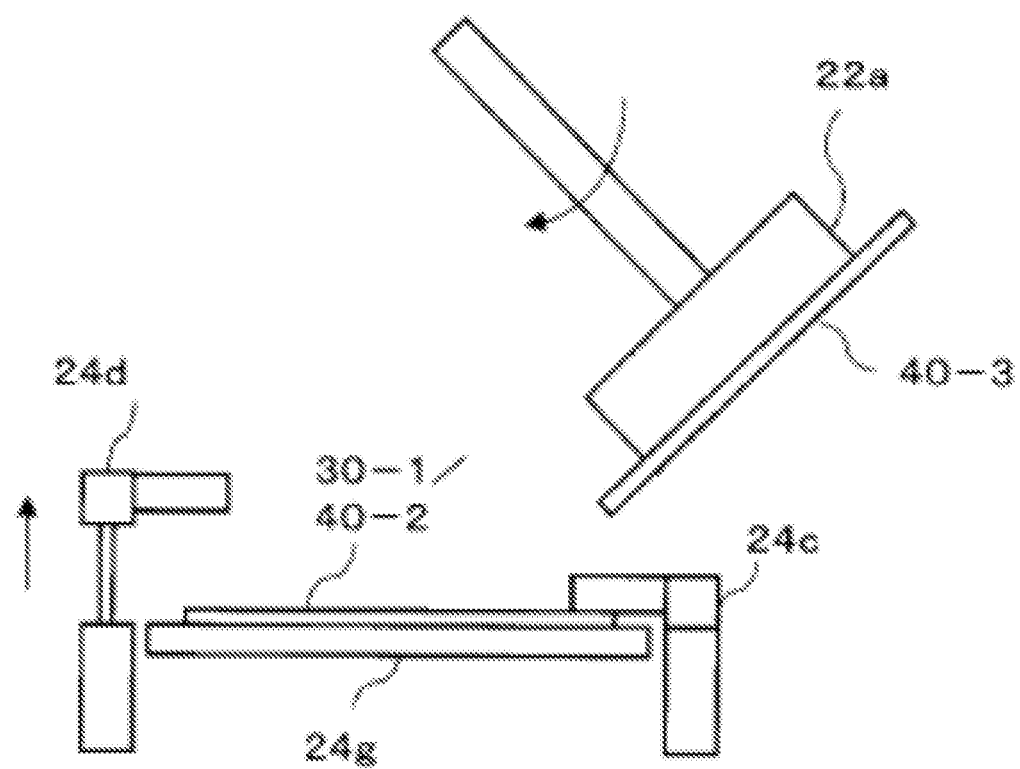
FIG. 40 is an explanatory diagram (part 1) of a linked operation of a laminating stage and a claw according to an embodiment of the present disclosure.

FIG. 40 is a side view when the 3-layer laminated body 30-1 and the 4-layer laminated body 40-2 are already layered over the stage surface 24g of the laminating stage 24, and the 4-layer laminated body 40-3 is to be newly layered next by the laminating head 22a. In the figure, claws 24c and 24d are shown as the claws, but the claw 24a operates in a similar manner as the claw 24c and the claw 24b operates in a similar manner as the claw 24d.

The claw 24c pressurizes and holds the 3-layer laminated body 30-1 and the 4-layer laminated body 40-2 over the stage surface 24g by the pressing force of the spring 24f. On the other hand, the claw 24d is moved in the vertically upward direction and swung around the axis, to be partially positioned above the stage surface 24g (retracted position), and is in the waiting state. The laminating head 22a rotates while suctioning and holding the 4-layer laminated body 40-3 on the outer peripheral surface thereof, and, when a particular position is reached, the velocity of the laminating head 22a is increased and the laminating head 22a moves close to a proximate position with the stage surface 24g. When the laminating head 22a moves close to the proximate position with the stage surface 24g, the holding portion 22a3 swings with respect to the arms 22a1 and 22a2 so that the outer peripheral surface is approximately parallel to the stage surface 24g, while avoiding collision with the stage surface 24g.

Figure 41:
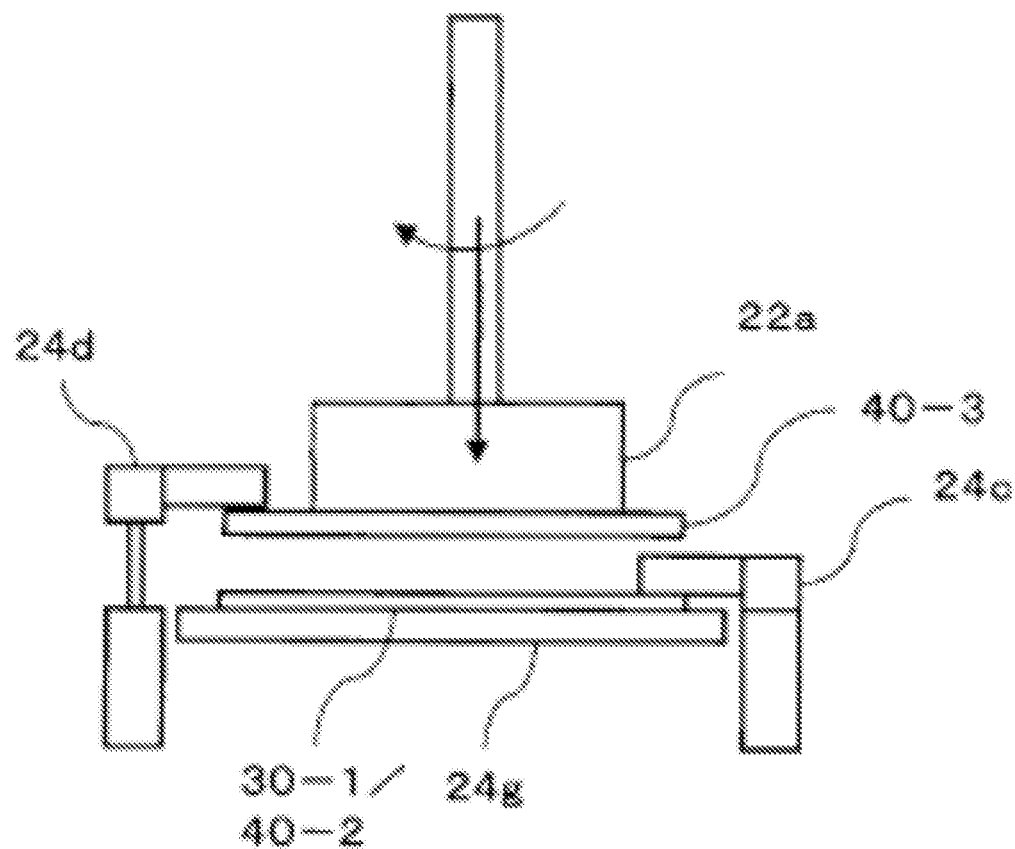
FIG. 41 is an explanatory diagram (part 2) of a linked operation of a laminating head and a claw according to an embodiment of the present disclosure.

FIG. 41 shows a case in which the laminating head 22a has reached the proximate position with the stage surface 24g.

Figure 42:
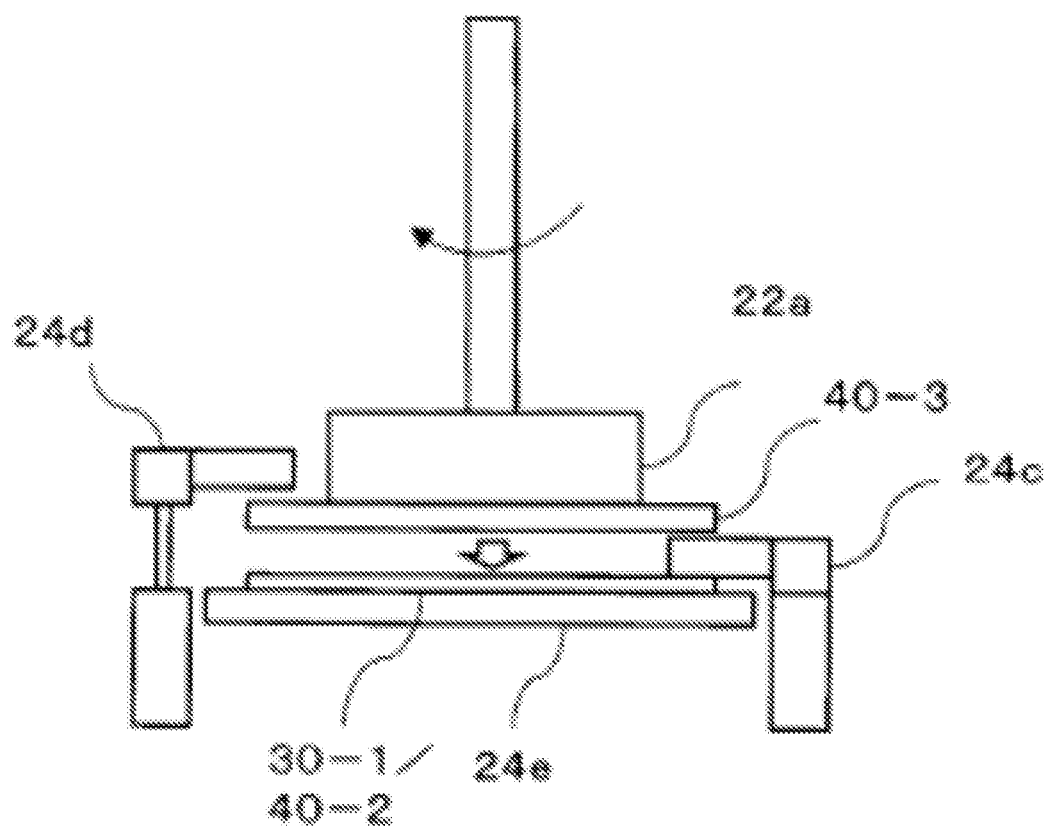
FIG. 42 is an explanatory diagram (part 3) of a linked operation of a laminating head and a claw according to an embodiment of the present disclosure.

The arms 22a1 and 22a2 of the laminating head 22a move in the radial direction of the laminating drum 22, and the holding portion 22a3 moves in the vertically downward direction so that the outer peripheral surface of the holding portion 22a3 further becomes closer to the stage surface 24g. At this point, the claw 24d is in the waiting state at a position above the stage surface 24g (retracted position), and the state in which the claw 24c pressurizes and holds the 3-layer laminated body 30-1 and the 4-layer laminated body 40-2 is maintained. From this state, as shown in FIG. 42, the laminating head 22a layers the 4-layer laminated body 40-3 over the 3-layer laminated body 30-1 and the 4-layer laminated body 40-2 over the stage surface 24g, and switches the suctioning force of the holding portion 22a3 OFF. Alternatively, a configuration may be employed in which, during a period after the movement of the holding portion 22a3 in the vertically downward direction is started and until the 4-layer laminated body 40-3 is layered over the 3-layer laminated body 30-1 and the 4-layer laminated body 40-2 over the stage surface 24g, the movement of the holding portion 22a3 in the vertically downward direction is temporarily stopped. With the temporary stopping, an impact which occurs when the 4-layer laminated body 40-3 is layered over the 3-layer laminated body 30-1 and the 4-layer laminated body 40-2 over the stage surface 24g can be reduced.

Figure 43:
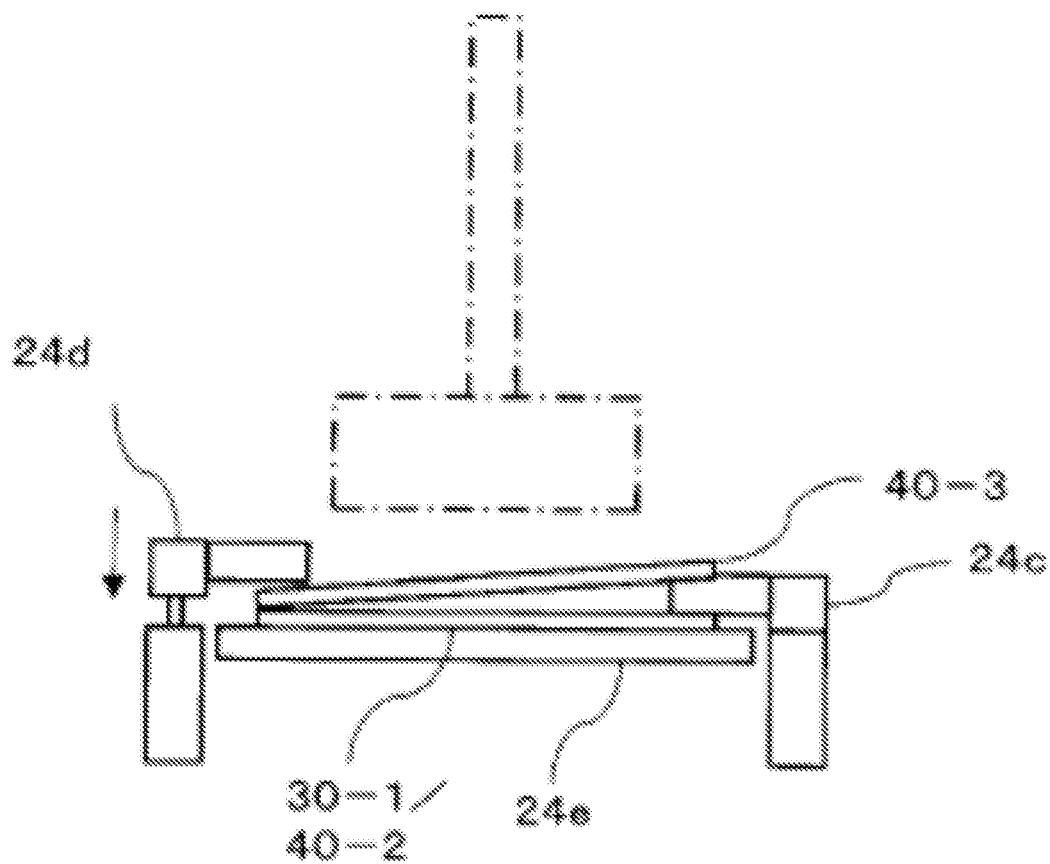
FIG. 43 is an explanatory diagram (part 4) of a linked operation of a laminating head and a claw according to an embodiment of the present disclosure.

FIG. 43 shows a state in which the 4-layer laminated body 40-3 is layered over the 3-layer laminated body 30-1 and the 4-layer laminated body 40-2. Because the claw 24c (and the claw 24a) is pressurizing and holding the 3-layer laminated body 30-1 and the 4-layer laminated body 40-2, the 4-layer laminated body 40-3 is layered over the claw 24c (and the claw 24a). In addition, the claw 24d (and the claw 24b) are in the waiting state at a position above the stage surface 24g. When the 4-layer laminated body 40-3 is layered, the claw 24d (and the claw 24b) quickly moves in the vertically downward direction, and pressurizes and holds the 4-layer laminated body 40-3 which is newly layered. When the 4-layer laminated body 40-3 is pressurized and held by the claw 24d (and the claw 24b), it becomes no longer necessary to pressurize and hold the 3-layer laminated body 30-1 and the 4-layer laminated body 40-2 with the claw 24c (and the claw 24a). Thus, the claw 24c (and the claw 24a) moves in the vertically upward direction and swings around the axis, to retract from the stage surface 24g, and waits at a position above the stage surface 24g (retracted position).

Figure 44:
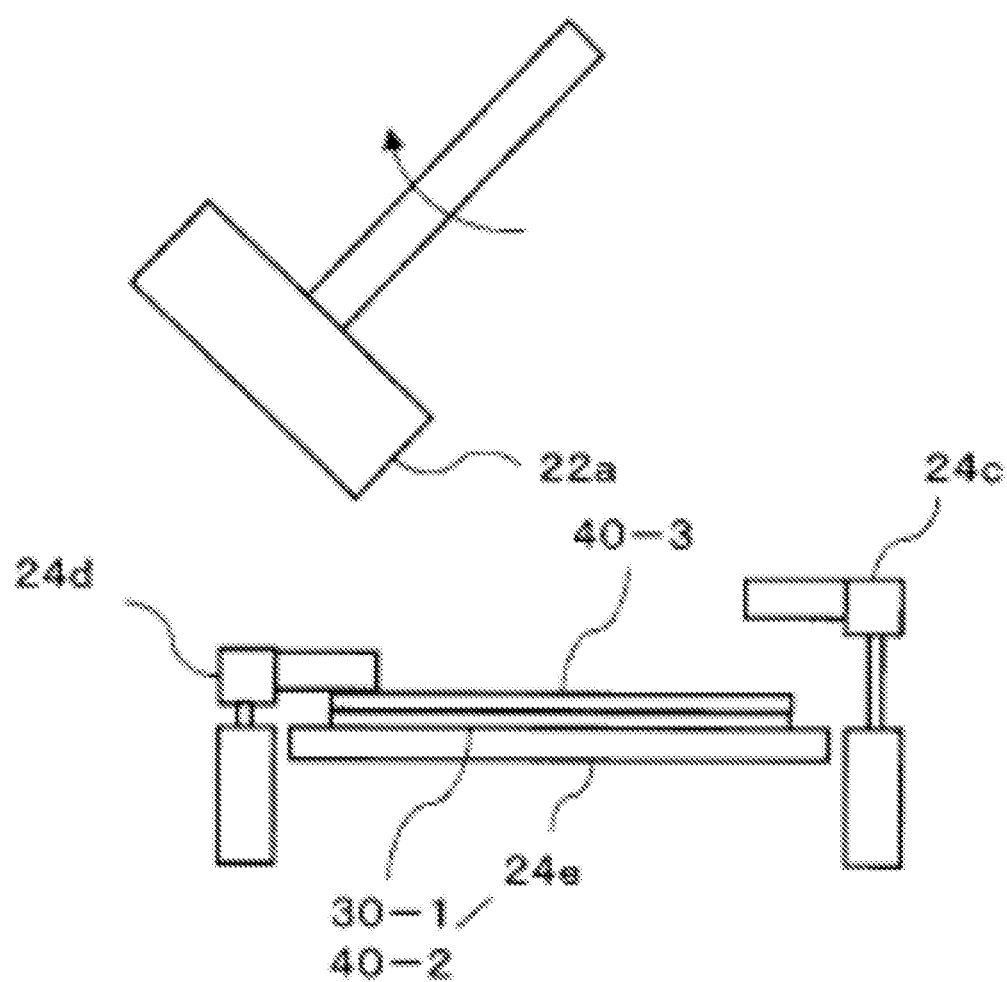
FIG. 44 is an explanatory diagram (part 5) of a linked operation of a laminating head and a claw according to an embodiment of the present disclosure.

FIG. 44 shows a state in which the layering of the 4-layer laminated body 40-3 is completed. The 3-layer laminated body 30-1, the 4-layer laminated body 40-2, and the 4-layer laminated body 40-3 are pressurized and held by the claw 24d (and the claw 24b). In addition, the claw 24c (and the claw 24a) is positioned above the stage surface 24g (retracted position) and is in the waiting state, to prepare for layering of the 4-layer laminated body to be newly layered next; that is, a 4-layer laminated bodiesuctioned and held on the outer peripheral surface of the laminating head 22b.

In this manner, according to the placement of the claws 24a to 24d shown in FIG. 39, it becomes unnecessary for the two claws other than the claws pressurizing and holding the laminated body to be retracted to avoid being an obstacle when the next laminated body enters, and the two claws may be waited at the position above the stage surface 24g (retracted position). Thus, after the layering of the laminated body, the laminated body can be quickly pressurized and held, so that a total layering time can be shortened.

Alternatively, a configuration may be employed in which a cross section of the outer peripheral surface (holding portion 22a3) of the laminating head 22a viewed from the circumferential direction of the laminating drum 22 is not flat, and is curved in a concave shape or a convex shape, and the 3-layer laminated body or the 4-layer laminated body is suctioned and held on the concave surface or the convex surface. This configuration is for suppressing flapping of a portion of the 3-layer laminated body or the 4-layer laminated body extending beyond an end of the laminating head 22a even when a size of the outer peripheral surface of the laminating head 22a is set slightly smaller than a size of the 3-layer laminated body or the 4-layer laminated body. When the holding portion 22a3 of the laminating head 22a is curved in the convex shape, the proximate position between the laminating head 22a and the stage surface 24g means a position where a distance between a most-protruding location on the holding portion 22a3 and the stage surface 24g is a minimum. When the outer peripheral surface of the laminating head 22a is curved in the concave shape, the proximate position between the laminating head 22a and the stage surface 24g means a position where a distance between a location positioned at an outermost circumference of the laminating head 22a and the stage surface 24g is a minimum.

An embodiment of the present disclosure has been described. The present disclosure, however, is not limited to the embodiment, and various modifications may be made. Alternative configurations will now be described.

First Alternative Configuration

In the embodiment described above, only one set of the laminating drum 22 and the laminating stage 24 is provided, but alternatively, a plurality of sets of the laminating drums 22 and the laminating stages 24 may be provided.

Figure 45:
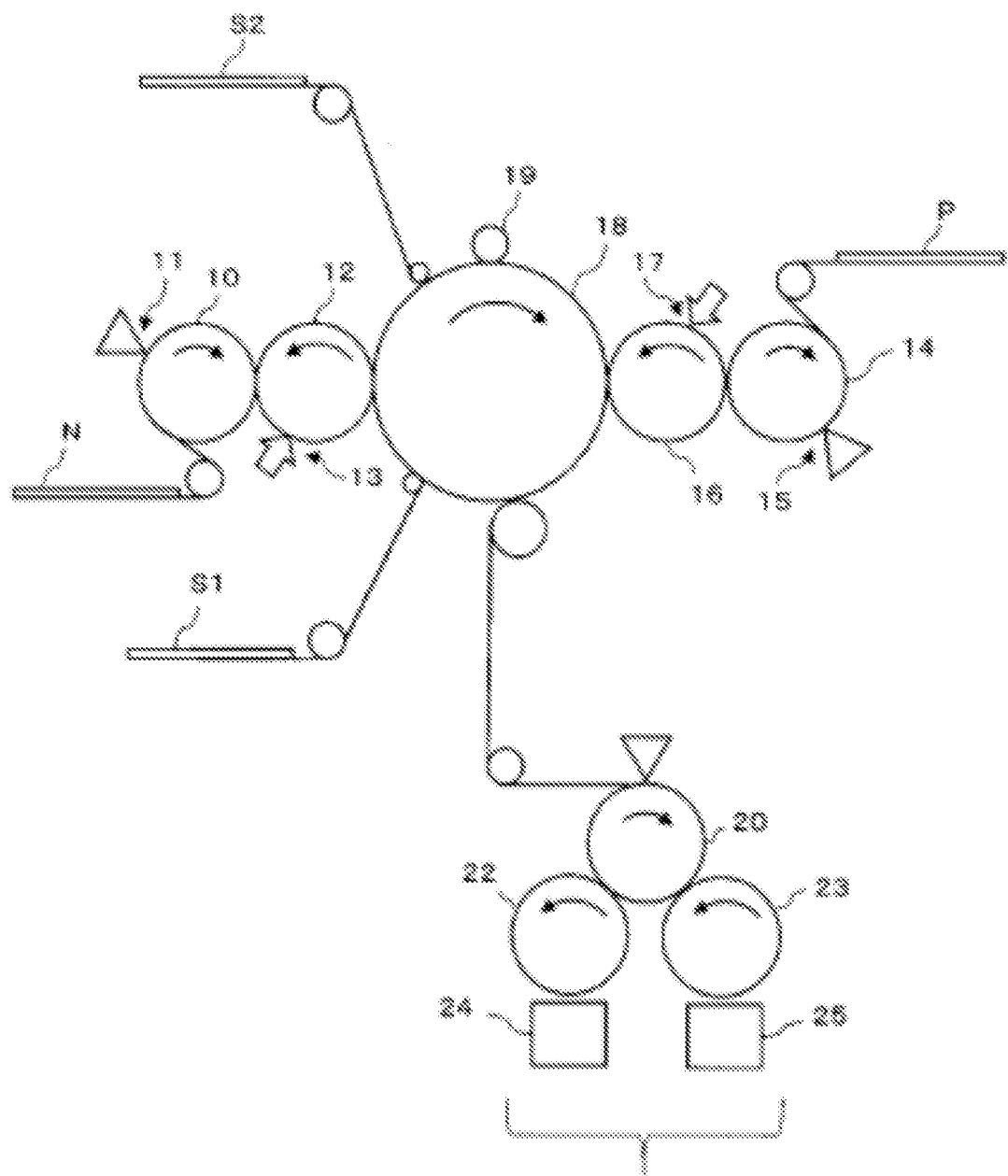
FIG. 45 is a conceptual structural diagram of a first alternative configuration.

FIG. 45 shows a structure when a laminating drum 23 and a laminating stage 25 are placed in addition to the laminating drum 22 and the laminating stage 24.

The 3-layer laminated body 30 and the 4-layer laminated body 40 produced by the cutting at the separator cutting drum 20 are supplied to the laminating drum 22 or the laminating drum 23. The 3-layer laminated body 30 and the 4-layer laminated body 40 supplied to the laminating drum 22 are sequentially layered over the laminating stage 24 placed adjacent to the laminating drum 22. Further, the 3-layer laminated body 30 and the 4-layer laminated body 40 supplied to the laminating drum 23 are sequentially layered over the laminating stage 25 placed adjacent to the laminating drum 23.

The laminating drum 22 and the laminating drum 23 respectively contact the separator cutting drum 20, and rotate in the same direction with respect to the rotational direction of the separator cutting drum 20. A placement as described, in which a plurality of laminating drums 22 and 23 rotate in the same direction with respect to the transporting directions of the 3-layer laminated body 30 and the 4-layer laminated body 40 transported from the separator cutting drum 20 is called a parallel placement. In the parallel placement, the structures of the laminated bodies layered over the laminating stages 24 and 25 are identical to each other.

Figure 46:
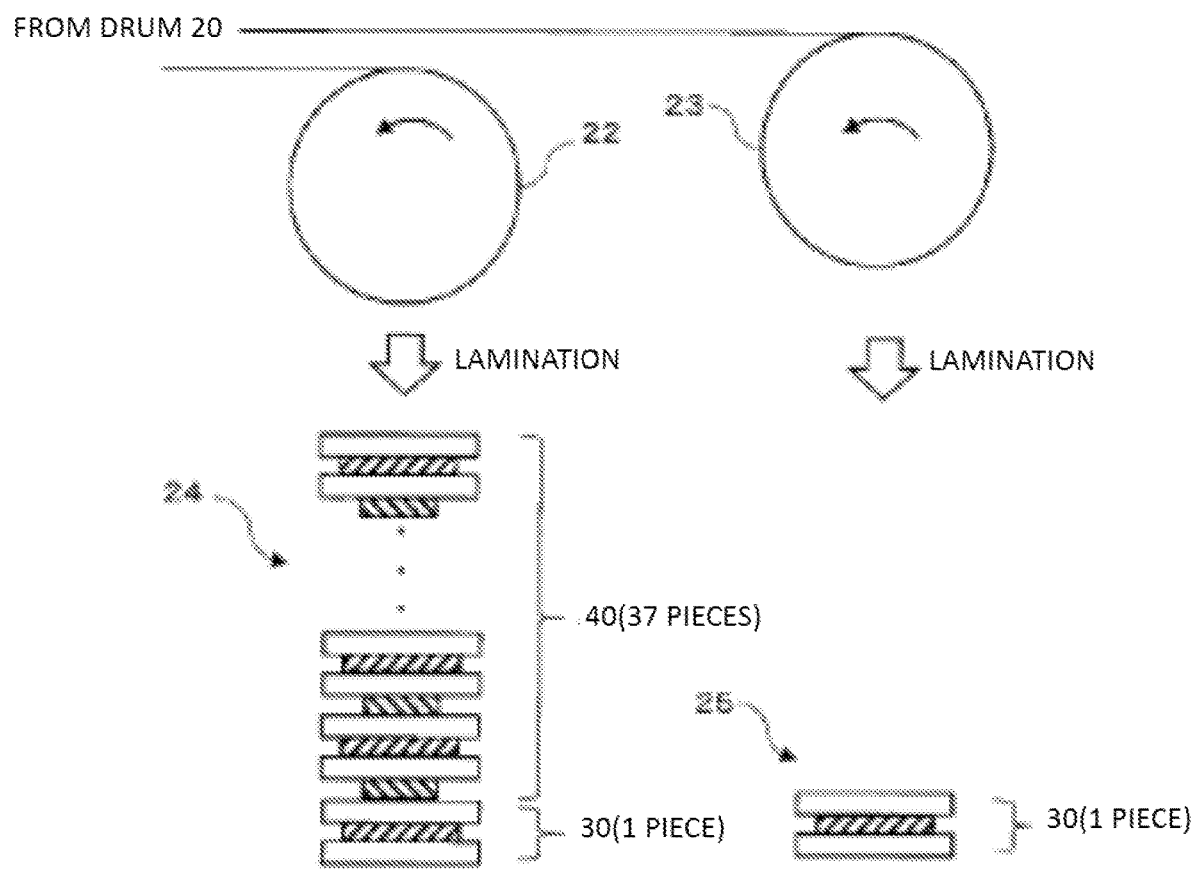
FIG. 46 is an explanatory diagram of layering in the first alternative configuration.

FIG. 46 shows the layering process using the set of the laminating drum 22 and the laminating stage 24, and a set of the laminating drum 23 and the laminating stage 25.

The control apparatus which controls the overall production apparatus selectively supplies the 3-layer laminated body 30 and the 4-layer laminated body 40 produced by the cutting at the separator cutting drum 20 to one of the laminating drum 22 or the laminating drum 23. For example, when the layering is performed first over the laminating stage 24 to produce the layered electrode assembly, and the layering is then performed at the laminating stage 25 to produce the layered electrode assembly, the control apparatus first supplies the 3-layer laminated body 30 and the 4-layer laminated body 40 from the separator cutting drum 20 to the laminating drum 22.

The laminating drum 22 receives the 3-layer laminated body 30 supplied from the separator cutting drum 20, and layers the 3-layer laminated body 30 over the laminating stage 24. Then, over the 3-layer laminated body 30, for example, a total of 37 4-layer laminated bodies 40 are layered, to produce one layered electrode assembly. After the 37th 4-layer laminated body 40 which is the last element is supplied to the laminating drum 22, the control apparatus switches an output destination of the separator cutting drum 20 from the laminating drum 22 to the laminating drum 23.

The laminating drum 23 receives the 3-layer laminated body 30 supplied from the separator cutting drum 20, and layers the 3-layer laminated body 30 over the laminating stage 25. Then, for example, a total of 37 4-layer laminated bodies 40 are layered over the 3-layer laminated body 30, to produce another layered electrode assembly. After the 37th 4-layer laminated body 40 which is the last element is supplied to the laminating drum 23, the control apparatus switches the output destination of the separator cutting drum 20 from the laminating drum 23 again to the laminating drum 22.

While there is no problem if the elements are normally supplied from the separator cutting drum 20 in the order of the 3-layer laminated body 30, the 4-layer laminated body 40, the 4-layer laminated body 40, . . . the 3-layer laminated body 30, the 4-layer laminated body 40, . . . , there may be cases in which an abnormality occurs in at least one of the negative electrode cutting drum 10, the negative electrode heating drum 12, the positive electrode cutting drum 14, the positive electrode heating drum 16, the bonding drum 18, or the separator cutting drum 20, and the 3-layer laminated body 30 and the 4-layer laminated body 40 are not normally produced. In such a case, when abnormality is detected by a detection sensor provided on each drum, the 3-layer laminated body 30 or the 4-layer laminated body 40 is removed as a deficient element before being supplied to the laminating drums 22 and 23, and the normal flow of the laminated bodies in which 37 4-layer laminated bodies 40 follow one 3-layer laminated body 30 is not maintained. For example, when, in the production of the 37th 4-layer laminated body 40, adhesion deficiency of the positive electrode plate PP occurs in the bonding drum 18, and the 37th 4-layer laminated body 40 is judged as a deficient element and is removed in an inspection process of the bonding drum 18, from the separator cutting drum 20, as the 37th element, instead of the 4-layer laminated body 40, a subsequent 3-layer laminated body 30 is supplied. If this 3-layer laminated body 30 is layered over the laminating stage 24 from the laminating drum 22, a normal layered electrode assembly is not produced.

In such a case, the 3-layer laminated body 30 supplied in place of the 37th 4-layer laminated body 40 may be supplied to the laminating drum 23, and not to the laminating drum 22, and the laminating drum 23 may layer the 3-layer laminated body 30 over the laminating stage 25. The 4-layer laminated body 40 supplied from the separator cutting drum 20 following the 3-layer laminated body may be supplied to the laminating drum 22, and layered over the laminating stage 24, so that, over the laminating stage 24, a laminated body is formed in which 37 4-layer laminated bodies 40 are layered over the 3-layer laminated body 30.

The laminated body in which a predetermined number of 4-layer laminated bodies 40 are layered over the 3-layer laminated body 30 is pressed and/or heated so that the laminated bodies are adhered with each other, and a layered electrode assembly is formed.

Figure 47:
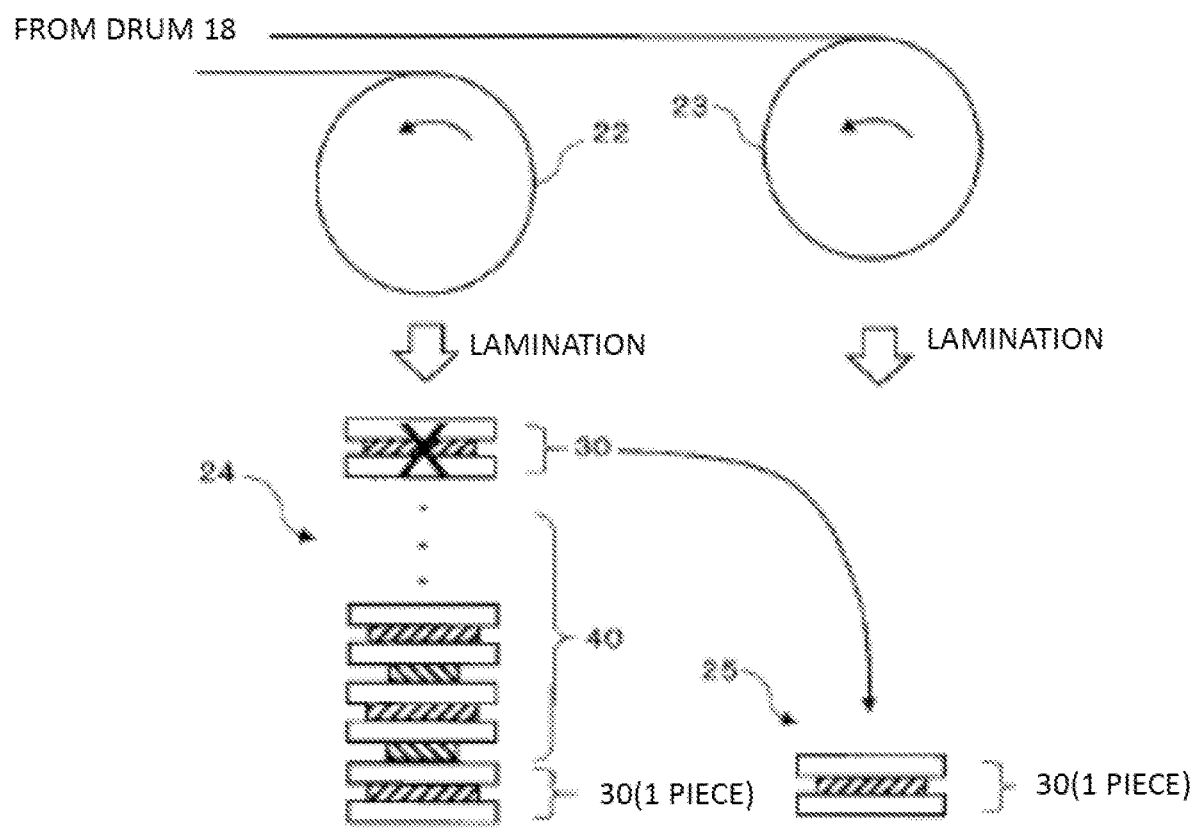
FIG. 47 is an explanatory diagram of another layering in the first alternative configuration.

FIG. 47 schematically shows a layering method in this case.

The control apparatus monitors the laminated body produced by the cutting at the separator cutting drum 20, identifies whether the laminated body is the 3-layer laminated body 30 or the 4-layer laminated body 40, and sequentially counts the number of the laminated bodies. When abnormality occurs in the 37th 4-layer laminated body 40 and the 4-layer laminated body 40 is removed as a deficient element, the 3-layer laminated body 30 becomes the 37th laminated body, in place of the 4-layer laminated body 40.

When the 37th laminated body is the 4-layer laminated body 40, the control apparatus supplies the laminated body to the laminating drum 22, but when the control apparatus detects that the 37th laminated body is the 3-layer laminated body 30 instead of the 4-layer laminated body 40, the control apparatus changes the output destination of the separator cutting drum 20 from the laminating drum 22 to the laminating drum 23, and the 3-layer laminated body 30 is layered over the laminating stage 25, in place of the laminating stage 24. In the figure, an X mark attached to the 3-layer laminated body 30 indicates that the 3-layer laminated body 30 is not layered over the laminating stage 24, and is layered over the laminating stage 25. After this process, the 4-layer laminated bodies 40 are sequentially supplied. Thus, the control apparatus maintains the output destination of the separator cutting drum 20 at the laminating drum 23, so that 37 4-layer laminated bodies 40 are sequentially layered over the laminating stage 25. With regard to the laminating stage 24, one 4-layer laminated body 40, which is missing, may be layered at an appropriate timing, to complete the layered electrode assembly.

As described, by placing a plurality of sets of the laminating drums and the laminating stages and suitably distributing the laminated bodies, it becomes possible to effectively produce the layered electrode assembly without stopping the production process even when deficiency occurs in the laminated body.

The deficiency of the laminated body may be detected at any drum. In particular, in order to detect a deficiency of the negative electrode plate NP and a deficiency of the positive electrode plate PP, a detection sensor such as, for example, a camera, may be placed on the negative electrode heating drum 12 and the positive electrode heating drum 16, and the deficiency detected on these drums may be removed. In this case, the negative electrode heating drum 12 has, in addition to the function to heat the negative electrode plate NP, a function to judge normal/deficient, and a function to remove the deficient plate. Similarly, the positive electrode heating drum 16 has, in addition to the function to heat the positive electrode plate PP, a function to judge normal/deficient, and a function to remove the deficient plate.

When the deficiency is to be detected on the negative electrode cutting drum 10 and the positive electrode cutting drum 14, the function to judge normal/deficient and the function to remove the deficient plate are provided after the negative electrode single plate or the positive electrode single plate is cut. Alternatively, the negative electrode cutting drum 10 and the positive electrode cutting drum 14 may have the function to judge normal/deficient, and the negative electrode heating drum 12 and the positive electrode heating drum 16 may have the function to remove the deficient plate.

When the deficiency is to be detected on the separator cutting drum 20, the function to judge normal/deficient and the function to remove the deficient plate are provided after the separator is cut and before the laminated body which is cut is supplied to the laminating drum. Thus, in addition to the function to cut the separator, the separator cutting drum 20 has the function to judge normal/deficient and the function to remove the deficient plate.

Second Alternative Configuration

In FIG. 45, the laminating drums 22 and 23 are placed in the parallel placement. Alternatively, the laminating drums 22 and 23 may be placed in a series placement with respect to the separator cutting drum 20.

Figure 48:
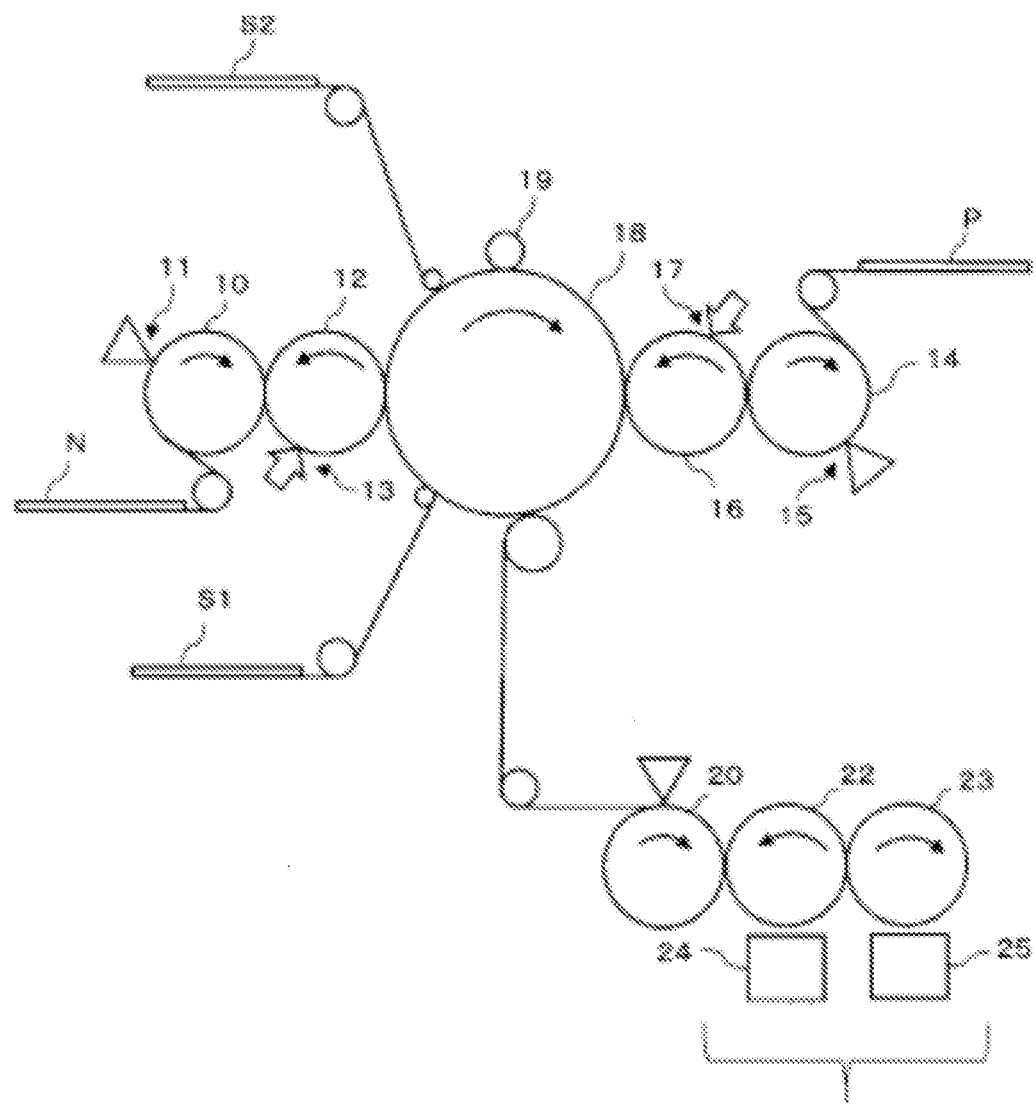
FIG. 48 is a conceptual structural diagram of a second alternative configuration.

FIG. 48 shows a structure in this case. The 3-layer laminated body 30 and the 4-layer laminated body 40 produced by the cutting at the separator cutting drum 20 are supplied to the laminating drum 22. The laminating drum 23 is placed in contact with the laminating drum 22, and not with the separator cutting drum 20. The 3-layer laminated body 30 and the 4-layer laminated body 40 are supplied to the laminating drum 23 via the laminating drum 22. The 3-layer laminated body 30 and the 4-layer laminated body 40 supplied to the laminating drum 22 are sequentially layered over the laminating stage 24 placed adjacent to the laminating drum 22. In addition, the 3-layer laminated body 30 and the 4-layer laminated body 40 supplied to the laminating drum 23 are sequentially layered over the laminating stage 25 placed adjacent to the laminating drum 23.

The laminating drum 22 and the laminating drum 23 rotate in directions different from each other. A placement in which the laminating drums 22 and 23 in contact with each other rotate in directions different from each other in this manner is called a series placement. The rotation in directions different from each other means that one drum rotates clockwise while the other drum rotates counterclockwise. In the series placement, the structures of the laminated bodies layered over the laminating stages 24 and 25 may differ from each other.

Specifically, to the laminating drum 23, the 3-layer laminated body 30 and the 4-layer laminated body 40 are supplied via the laminating drum 22 in contact with the laminating drum 23, but the direction of rotation of the laminating drum 23 is opposite from the direction of rotation of the laminating drum 22. The 3-layer laminated body 30 and the 4-layer laminated body 40 supplied from the laminating drum 23 to the laminating stage 25 are in an inverted placement with respect to the placement of the 3-layer laminated body 30 and the 4-layer laminated body 40 supplied from the laminating drum 22 to the laminating stage 24. Thus, for example, over the laminating stage 24, first, the 3-layer laminated body is layered, and 4-layer laminated bodies are sequentially layered over the 3-layer laminated body 30, but, over the laminating stage 25, the 4-layer laminated bodies are first sequentially layered, and the 3-layer laminated body is then layered over the 4-layer laminated bodies. In this manner, in the series placement, the structures of the laminated bodies layered over the laminating stages 24 and 25 may differ from each other.

Figure 49:
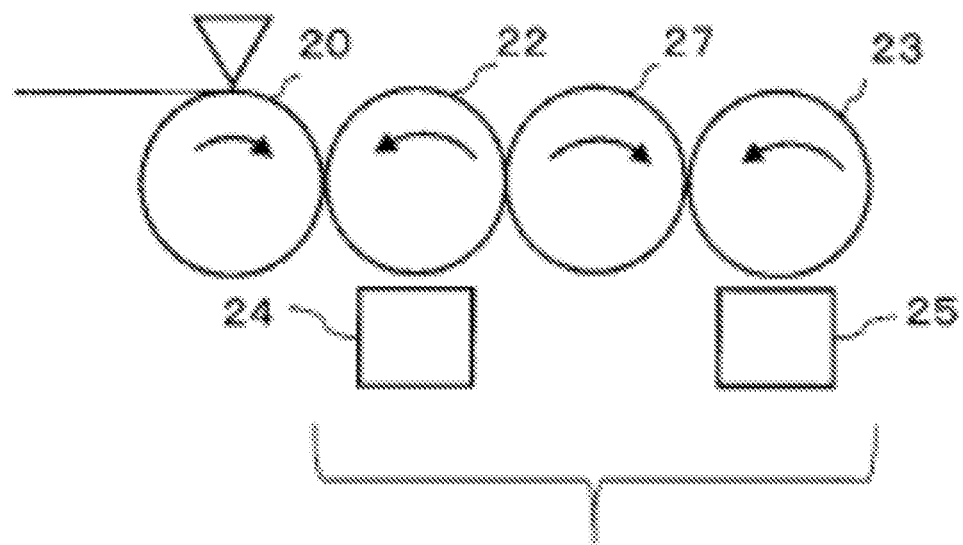
FIG. 49 is another conceptual structural diagram of the second alternative configuration.

When a structure is employed as shown in FIG. 49 in which an intermediate drum 27 is interposed on the laminating drum 22 and the laminating drum 23 is placed to contact the intermediate drum 27, in place of the structure in which the laminating drum 23 contacts the laminating drum 22, the laminating drums 22 and 23 would rotate in the same direction with respect to the separator cutting drum 20, and thus, this configuration results in the parallel placement.

Third Alternative Configuration

In the embodiment described above, a structure is employed having the negative electrode cutting drum 10, the negative electrode heating drum 12, the positive electrode cutting drum 14, the positive electrode heating drum 16, the bonding drum 18, the separator cutting drum 20, and the laminating drum 22, but alternatively, the negative electrode heating drum 12 may be omitted so that the negative electrode cutting drum 10 and the bonding drum 18 are placed adjacent to each other, and the positive electrode heating drum 16 may be omitted so that the positive electrode cutting drum 14 and the bonding drum 18 are placed adjacent to each other.

Figure 50:
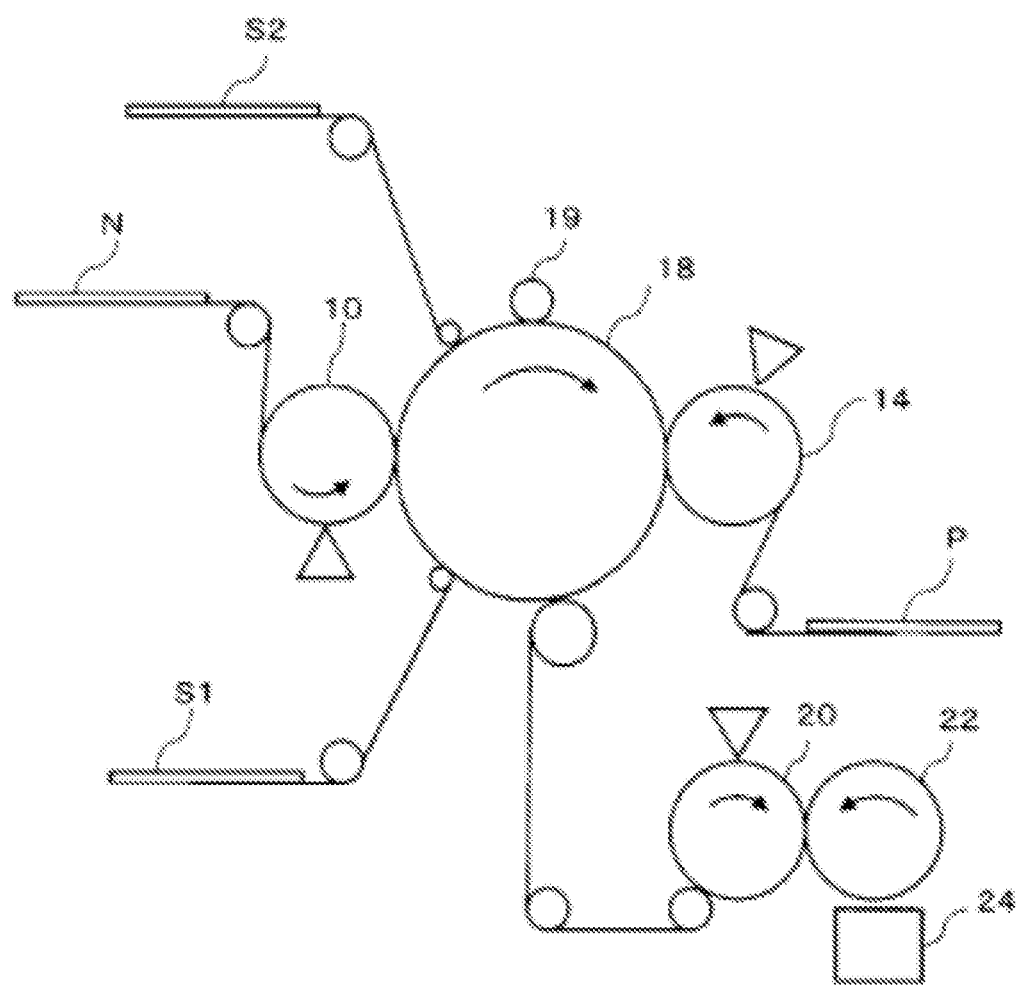
FIG. 50 is a conceptual structural diagram of a third alternative configuration.

FIG. 50 shows a structure in this case. Unlike FIG. 1, the negative electrode heating drum 12 and the positive electrode heating drum 16 are not provided, the negative electrode cutting drum 10 and the bonding drum 18 are adjacent to each other, and the positive electrode cutting drum 14 and the bonding drum 18 are adjacent to each other.

The negative electrode cutting drum 10 cuts the negative electrode single plate N of the band shape to produce the negative electrode plate NP, heats the negative electrode plate NP, and supplies the negative electrode plate NP to the bonding drum 18. Thus, the negative electrode cutting drum 10 also has the function of the negative electrode heating drum 12 shown in FIG. 1.

Similarly, the positive electrode cutting drum 14 cuts the positive electrode single plate P of the band shape to produce the positive electrode plate PP, heats the positive electrode plate PP, and supplies the positive electrode plate PP to the bonding drum 18. The positive electrode cutting drum 14 also has the function of the positive electrode heating drum 16 shown in FIG. 1.

In FIG. 50, the negative electrode cutting drum 10 and the bonding drum 18 are adjacent to each other. Alternatively, the negative electrode cutting drum 10 and the bonding drum 18 may be spatially distanced from each other, and the heated negative electrode plate NP from the negative electrode cutting drum 10 may be transported to the bonding drum 18 by a transport mechanism such as a belt conveyer. Similarly, the positive electrode cutting drum 14 and the bonding drum 18 may be spatially distanced from each other, and the heated positive electrode plate PP from the positive electrode cutting drum 14 may be transported to the bonding drum 18 by a transport mechanism such as the belt conveyer.

Fourth Alternative Configuration

In the embodiment described above, the separators S1 and S2 of the band shape are cut at the separator cutting drum 20. Alternatively, the separator cutting drum 20 may be omitted, and the separators S1 and S2 of the band shape may be cut at the bonding drum 18.

Figure 51:
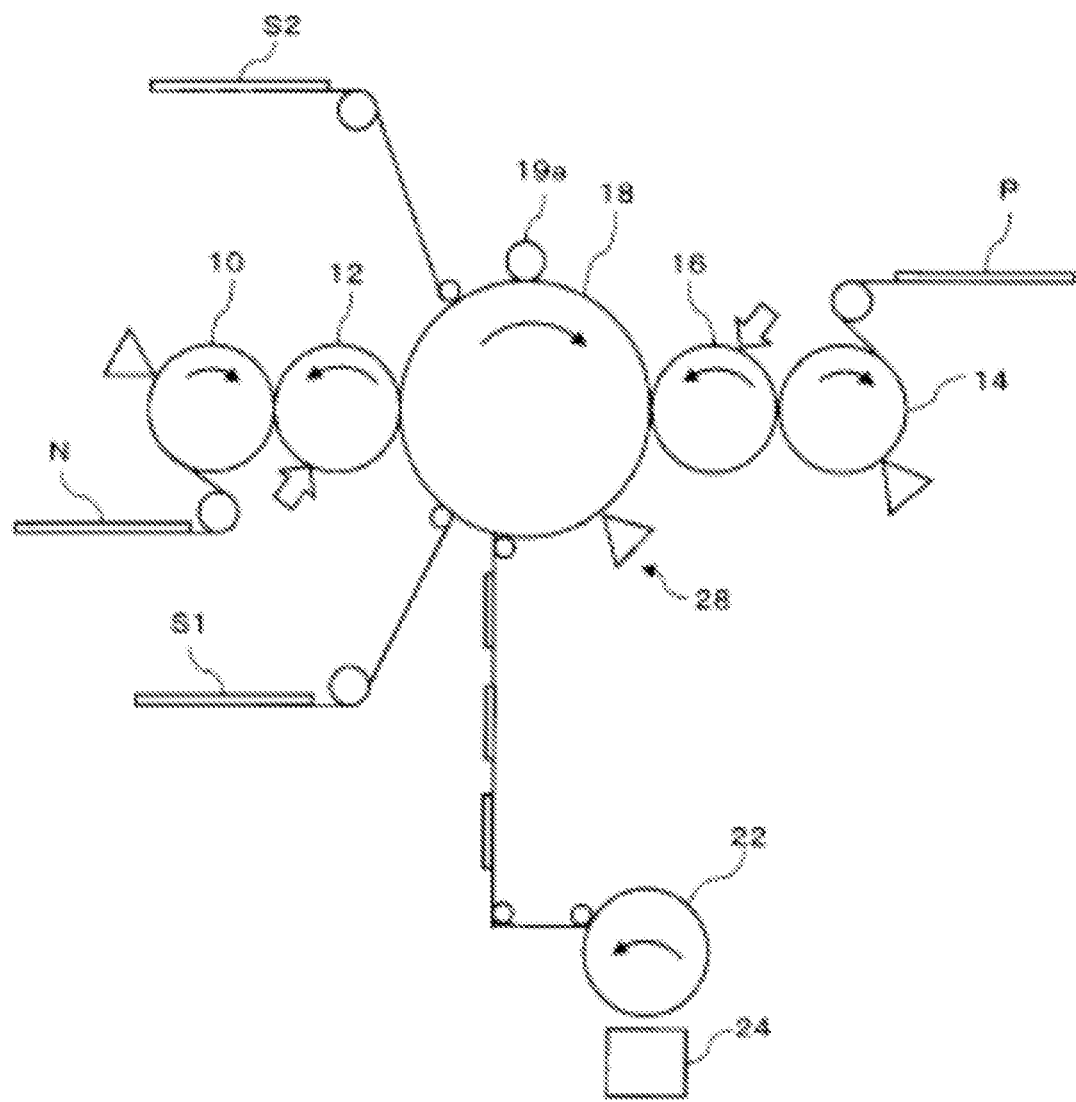
FIG. 51 is a conceptual structural diagram of a fourth alternative configuration.

FIG. 51 shows a structure in this case. Unlike FIG. 1, the separator cutting drum 20 is not provided, and the 3-layer laminated body 30 and the 4-layer laminated body 40 produced by the cutting at the bonding drum 18 is supplied to the laminating drum 22 via a transport mechanism.

The bonding drum 18 comprises an adhesion head having a round blade, and cuts the separators S1 and S2 of the band shape at a predetermined cutting position 28. The adhesion head may comprise, for example, a round blade and a cutting function.

Fifth Alternative Configuration

In the embodiment described above, the 3-layer laminated body and the 4-layer laminated body are produced. The structure is not limited to such a configuration, and, alternatively, a 2-layer laminated body or a laminated body of a number of layers of 4 or more may be produced. For example, in FIG. 1, the positive electrode cutting drum 14 and the positive electrode heating drum 16 may be omitted or stopped, the negative electrode plate NP may be supplied over the separator S1 and adhered thereto at the bonding drum 18, to supply the laminated body as a 2-layer laminated body to the separator cutting drum 20. Alternatively, the separator S2 may be supplied over the negative electrode plate NP and adhered thereto at the bonding drum 18, and the laminated body may be supplied as a 2-layer laminated body to the separator cutting drum 20. Alternatively, the separator S2 may be supplied over the negative electrode plate NP and adhered thereto at the bonding drum 18, the positive electrode plate PP may be supplied over the separator S2 and adhered thereto at the bonding drum 18, and the laminated body may be supplied as a 3-layer laminated body to the separator cutting drum 20. Alternatively, the adhesion at the bonding drum 18 may be repeatedly executed, to produce a laminated body of the number of layers of 4 or more, and the produced laminated body may be supplied to the separator cutting drum 20.

Sixth Alternative Configuration

The separator cutting drum 20 and the laminating drum 22 do not need to be placed in proximity to the bonding drum 18. Thus, a laminated body may be produced by layering the band-shape separator, the positive electrode, and the negative electrode by a method and an apparatus different from the bonding drum 18, the band-shape separator may be cut, and the resulting laminated body may be layered at the laminating drum 22. Alternatively, a laminated body in which the band-shape separator, the positive electrode, and the negative electrode are layered may be produced at the bonding drum 18, and the layered electrode assembly may then be produced by a method and an apparatus different from the separator cutting drum 20 and the laminating drum 22.

REFERENCE SIGNS LIST 10 negative electrode cutting drum
12 negative electrode heating drum
14 positive electrode cutting drum
16 positive electrode heating drum
18 bonding drum
20 separator cutting drum
22 laminating drum
24 laminating stage
N negative electrode single plate
P positive electrode single plate
NP negative electrode plate
PP positive electrode plate

The invention claimed is:

1. A layered electrode assembly in which a positive electrode of a quadrangular shape and a negative electrode of a quadrangular shape are layered with a separator of a quadrangular shape therebetween, wherein
at least a part of two sides among four sides of an outer edge portion of the negative electrode is adhered to the separator,
the other two sides among the four sides of the outer edge portion of the negative electrode are not adhered to the separator,
at least a part of two sides among four sides of an outer edge portion of the positive electrode is adhered to the separator, and
the other two sides among the four sides of the outer edge portion of the positive electrode are not adhered to the separator.

2. The layered electrode assembly according to claim 1, wherein
the positive electrode is placed at an inner side of a region of presence of the negative electrode.

3. The layered electrode assembly according to claim 1, wherein
the separator comprises thermoplastic layers over respective surfaces of a base member layer.

4. An adhesion device for a layered electrode assembly, the adhesion device comprising:
a holding unit, being a first rotational drum directly supported on a first support, configured to hold a separator single plate while rotating; and
an electrode plate adhesion unit, directly supported on a second support and disposed opposite the first rotational drum, configured to sequentially press and adhere an electrode plate of a quadrangular shape over the separator single plate, wherein
the electrode plate adhesion unit presses the electrode plate of the quadrangular shape over the separator single plate while compensating for a variation in distance between the first support and the second support.

5. The adhesion device for the layered electrode assembly according to claim 4, wherein
the electrode plate adhesion unit is a second rotational drum,
one of the first support and the second support comprises a coil spring, a drum rotation pivot, and a motor, and
flexure of the coil spring caused by swinging around the drum rotation pivot due to a rotation of the first rotational drum or of the second rotational drum is suppressed by driving of the motor.

6. The adhesion device for the layered electrode assembly according to claim 4, wherein
the electrode plate adhesion unit reduces or interrupts the pressing at respective ends of the electrode plate of the quadrangular shape along a longitudinal direction of the separator single plate, so as to not adhere the respective ends of the electrode plate of the quadrangular shape to the separator single plate.

7. The adhesion device for the layered electrode assembly according to claim 6, wherein
the electrode plate adhesion unit is a second rotational drum,
a cam mechanism is provided on one support of the first support and the second support,
an arm which engages with the cam mechanism is provided on the other support of the first support and the second support, and
a surface shape of the cam mechanism is a polygon or a shape with a projection at a predetermined interval.

8. The adhesion device for the layered electrode assembly according to claim 7, wherein
an inclination member which can move upward and downward independently with respect to the other support is provided on the other support,
the arm is a swing arm, and
the swing arm moves upward and downward on an inclined surface of the inclination member.

9. The adhesion device for the layered electrode assembly according to claim 4, wherein
the electrode plate adhesion unit comprises a heating unit which heats the electrode plate of the quadrangular shape.

10. An adhesion device for a layered electrode assembly, the adhesion device comprising:
a holding unit that holds a separator single plate and that rotates; and
an electrode plate adhesion unit that sequentially presses and adheres an electrode plate of a quadrangular shape over the separator single plate, wherein
the electrode plate adhesion unit presses the electrode plate of the quadrangular shape over the separator single plate while compensating for a distance variation caused between the electrode plate adhesion unit and the holding unit,
wherein
the holding unit is a first rotational drum,
the electrode plate adhesion unit is a second rotational drum,
one of a support of the first rotational drum or a support of the second rotational drum comprises a coil spring, a drum rotation pivot, and a motor, and
flexure of the coil spring caused by swinging around the drum rotation pivot due to a rotation of the first rotational drum or of the second rotational drum is suppressed by driving of the motor.

11. The adhesion device for the layered electrode assembly according to claim 10, wherein
the electrode plate adhesion unit comprises a heating unit which heats the electrode plate of the quadrangular shape.

12. An adhesion device for a layered electrode assembly, the adhesion device comprising:
a holding unit that holds a separator single plate and that rotates; and
an electrode plate adhesion unit that sequentially presses and adheres an electrode plate of a quadrangular shape over the separator single plate, wherein
the electrode plate adhesion unit presses the electrode plate of the quadrangular shape over the separator single plate while compensating for a distance variation caused between the electrode plate adhesion unit and the holding unit,
wherein
the electrode plate adhesion unit reduces or interrupts the pressing at respective ends of the electrode plate of the quadrangular shape along a longitudinal direction of the separator single plate, so as to not adhere the respective ends of the electrode plate of the quadrangular shape to the separator single plate.

13. The adhesion device for the layered electrode assembly according to claim 12, wherein
the holding unit is a first rotational drum,
the electrode plate adhesion unit is a second rotational drum,
a cam mechanism is provided on a support of one of the first rotational drum and the second rotational drum,
an arm which engages with the cam mechanism is provided on a support of the other of the first rotational drum and the second rotational drum, and
a surface shape of the cam mechanism is a polygon or a shape with a projection at a predetermined interval.

14. The adhesion device for the layered electrode assembly according to claim 13, wherein
an inclination member which can move upward and downward independently with respect to the other support is provided on the other support,
the arm is a swing arm, and
the swing arm moves upward and downward on an inclined surface of the inclination member.

15. The adhesion device for the layered electrode assembly according to claim 12, wherein
the electrode plate adhesion unit comprises a heating unit which heats the electrode plate of the quadrangular shape.

* * * * *